INVENTORS.
ROBERT A. HAVEMANN.
LARRY N. BROWN.
BY
ATTORNEYS.

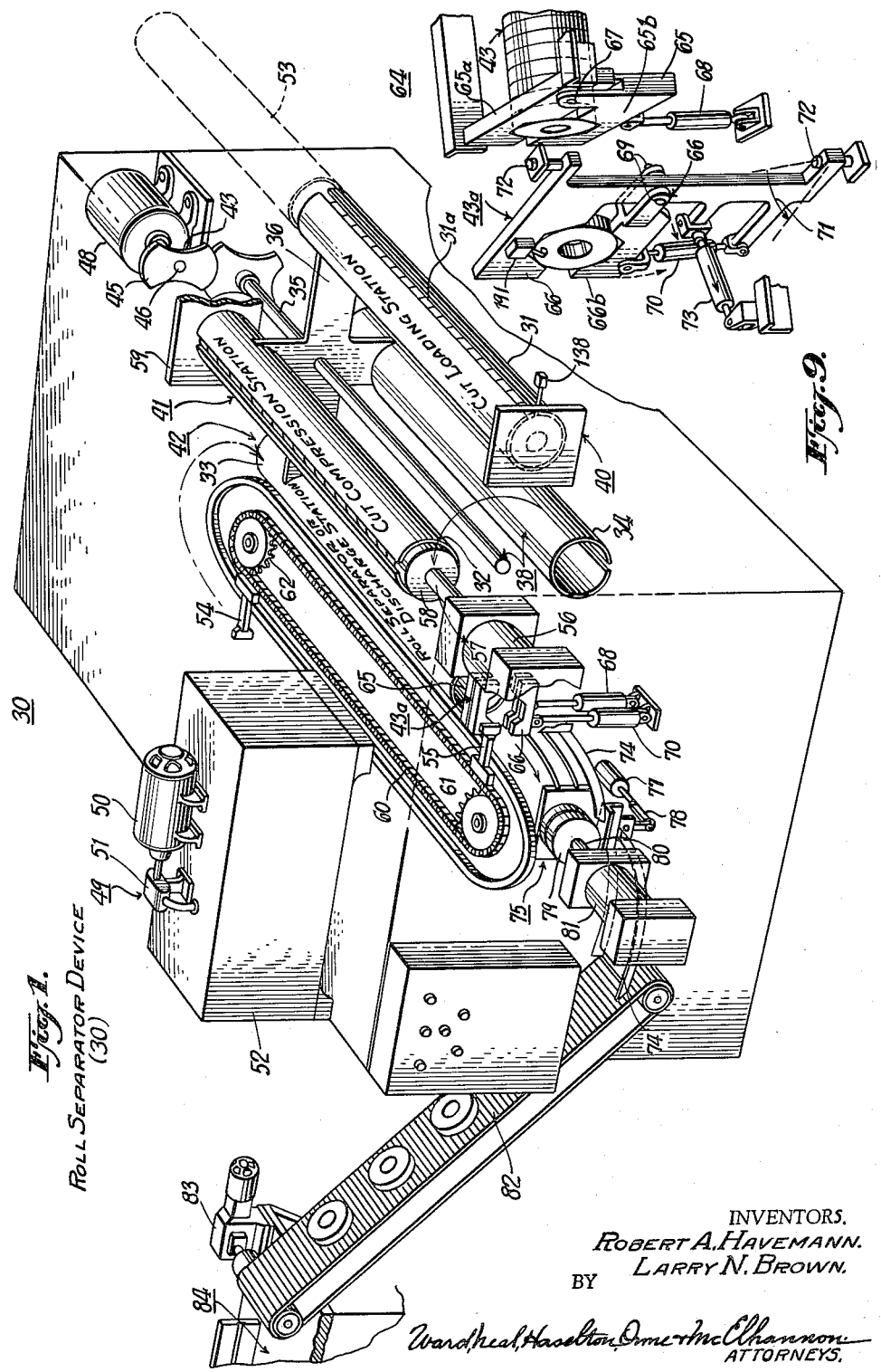

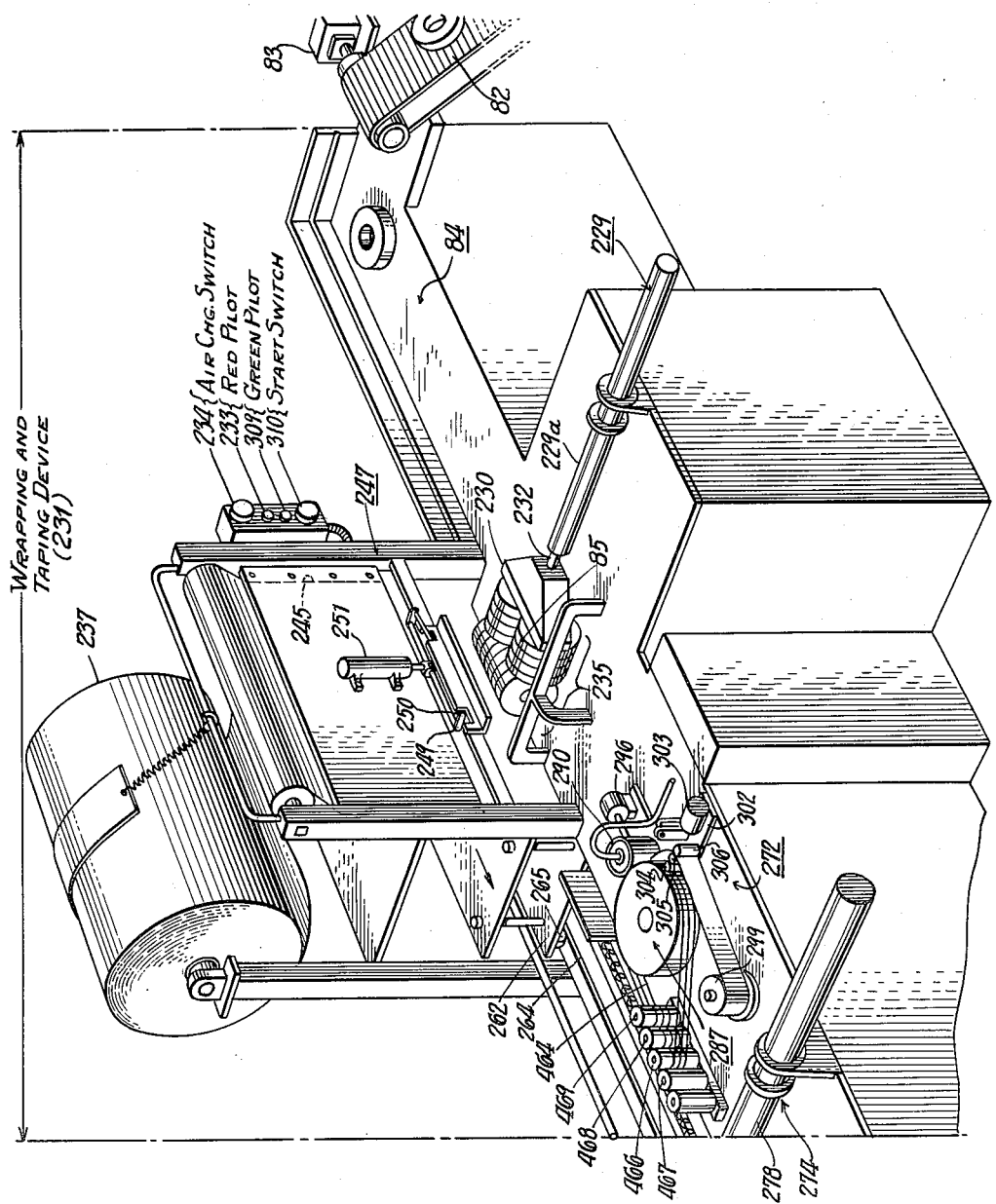

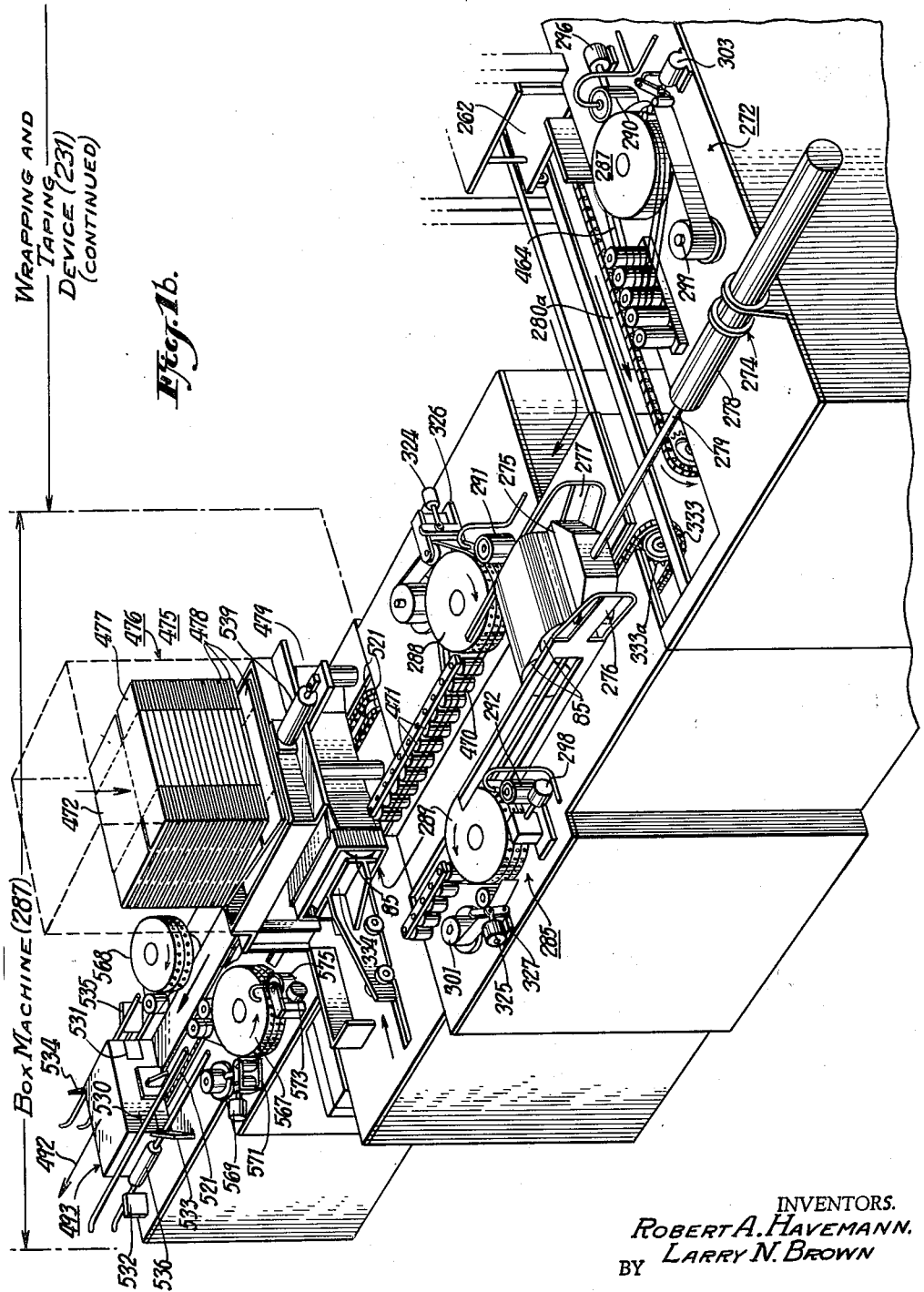

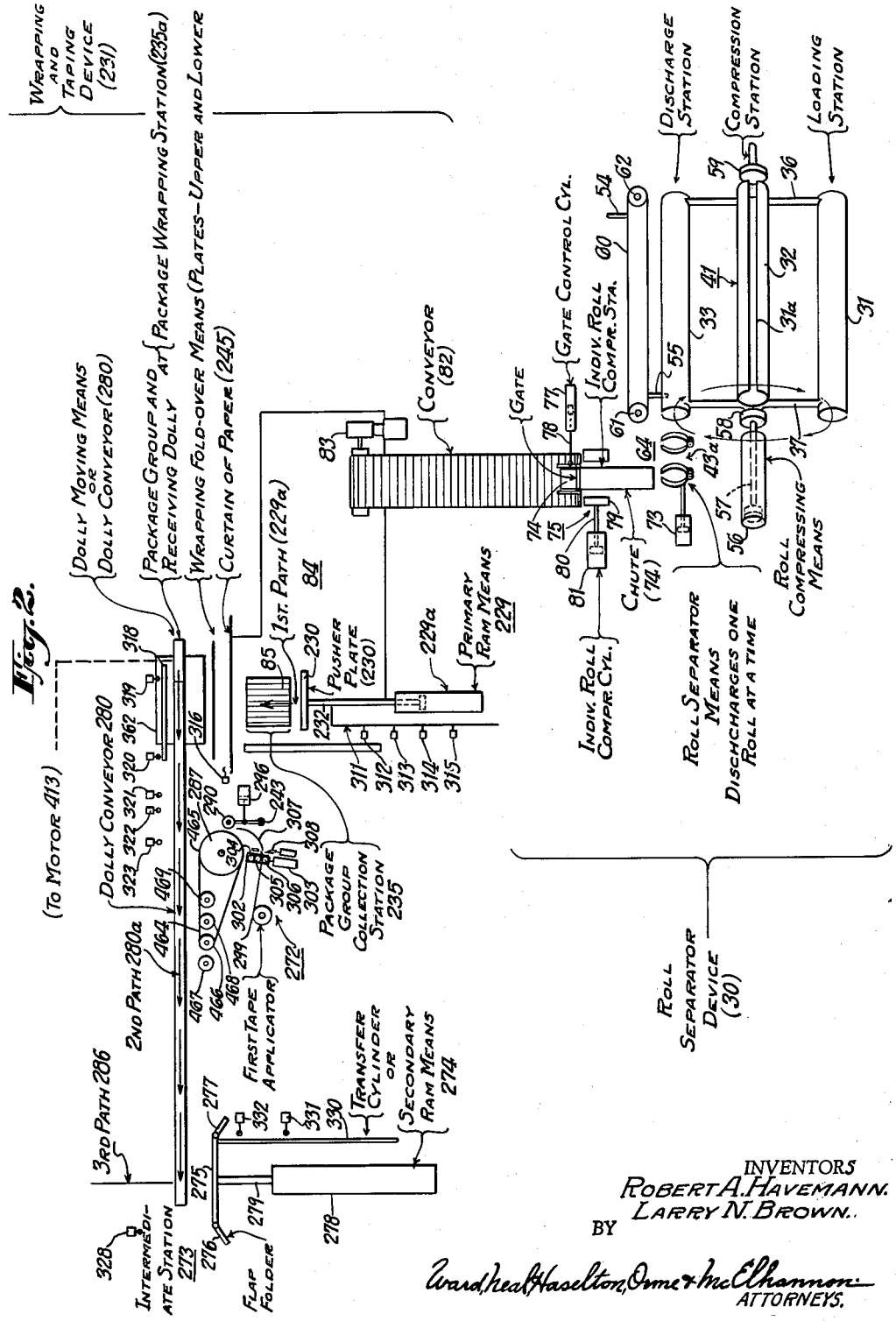

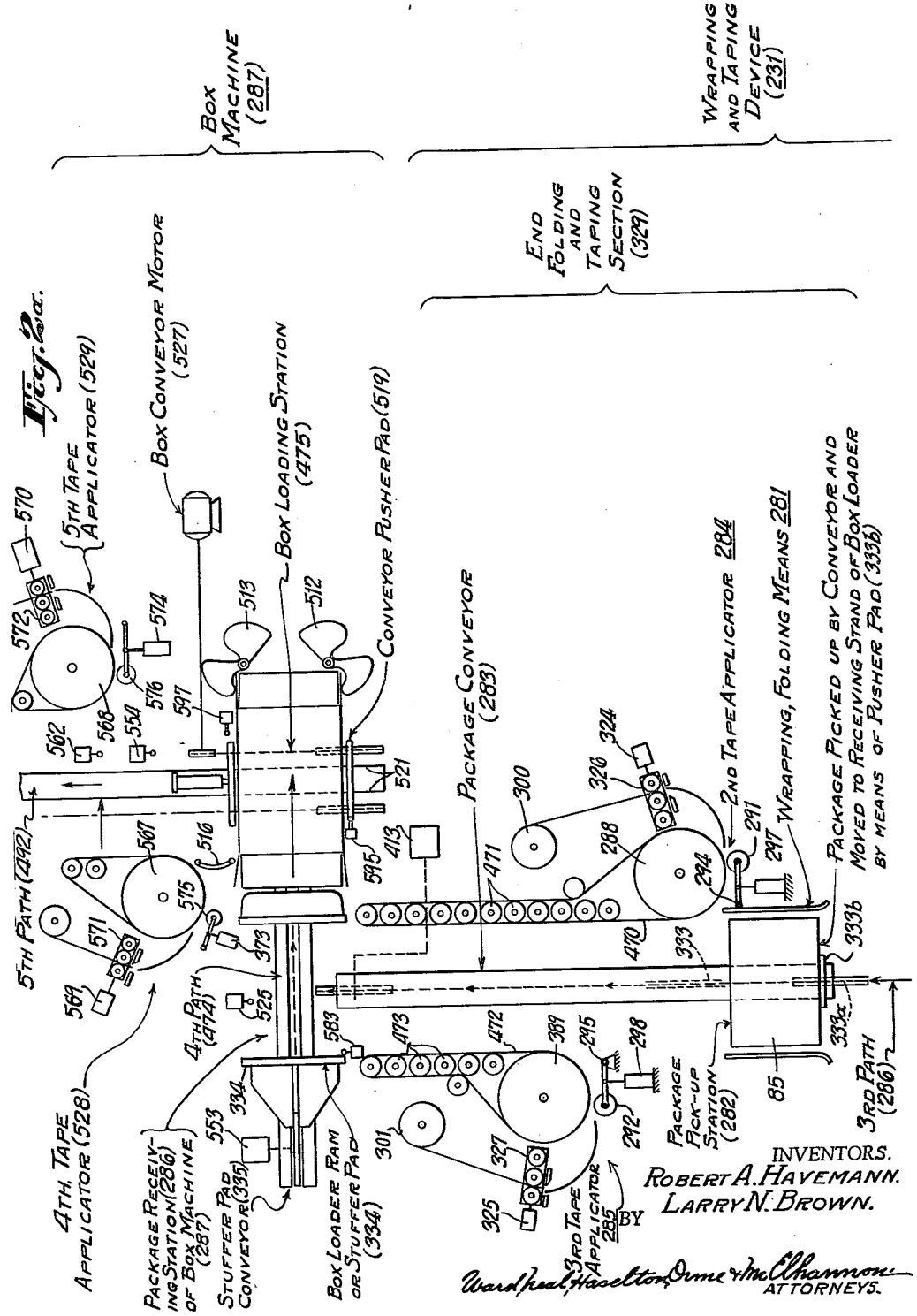

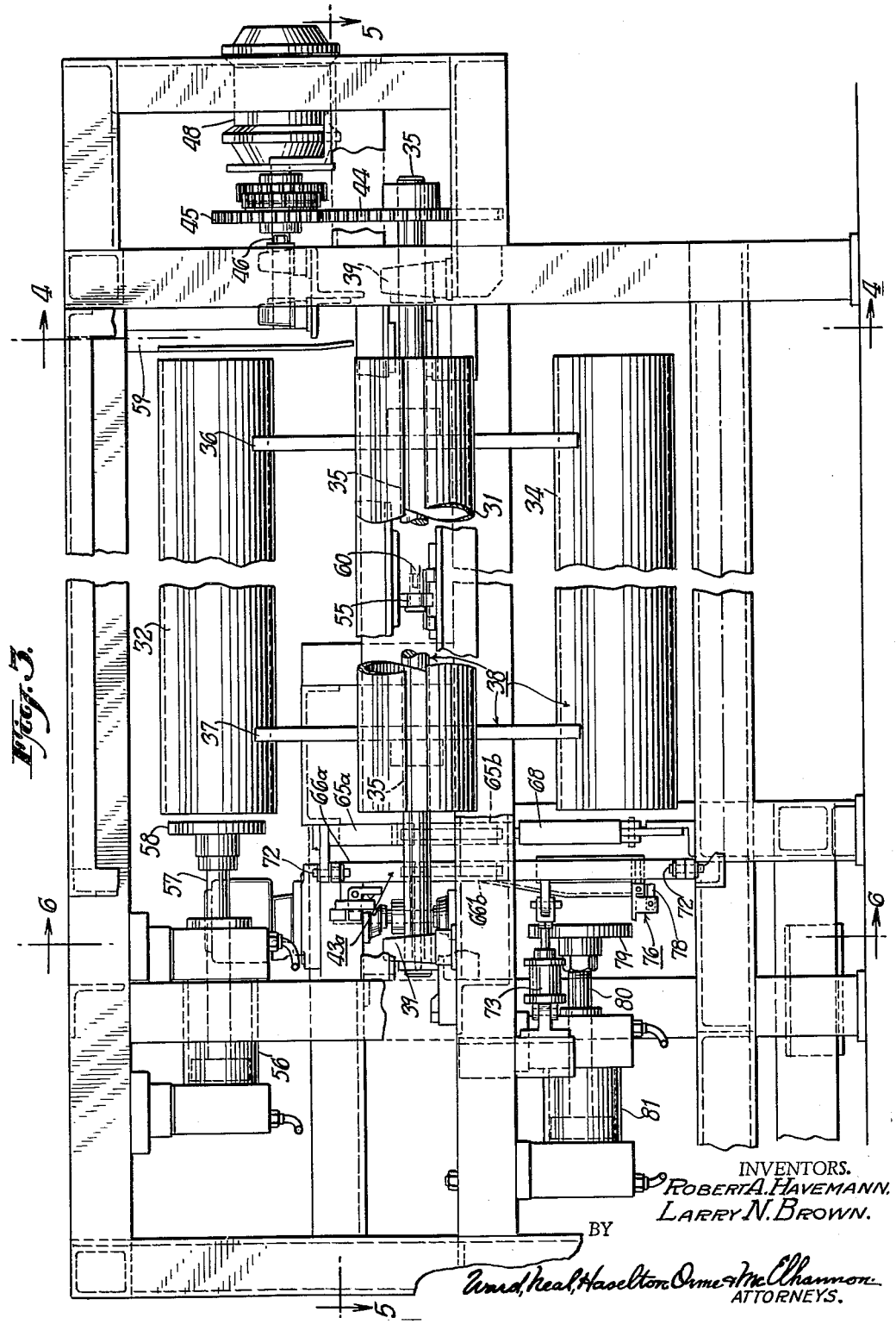

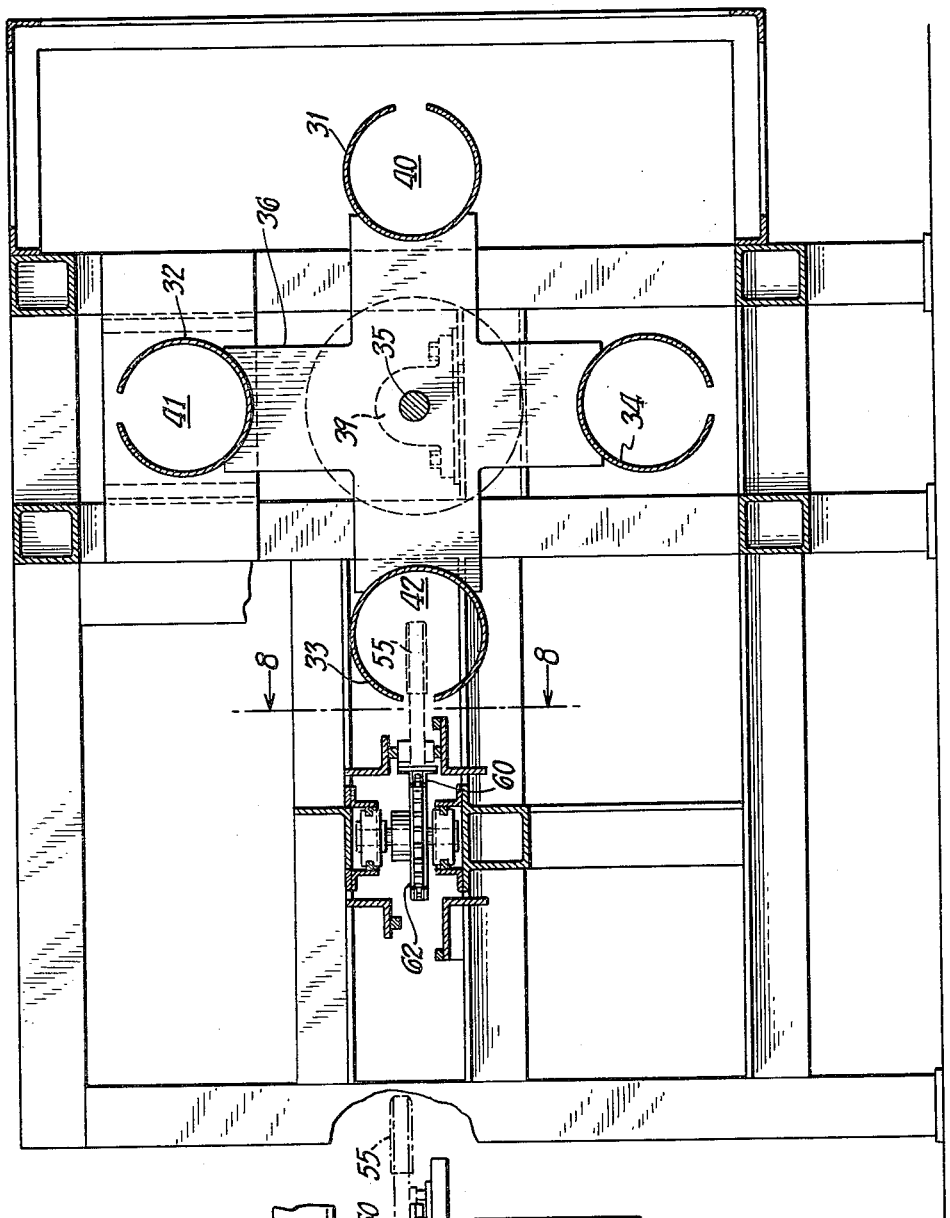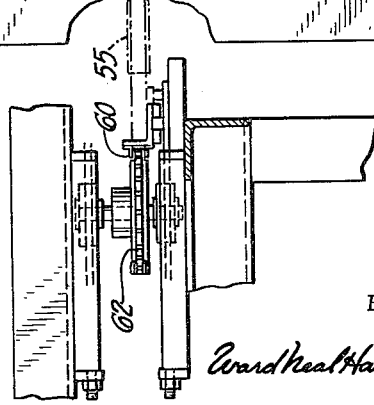

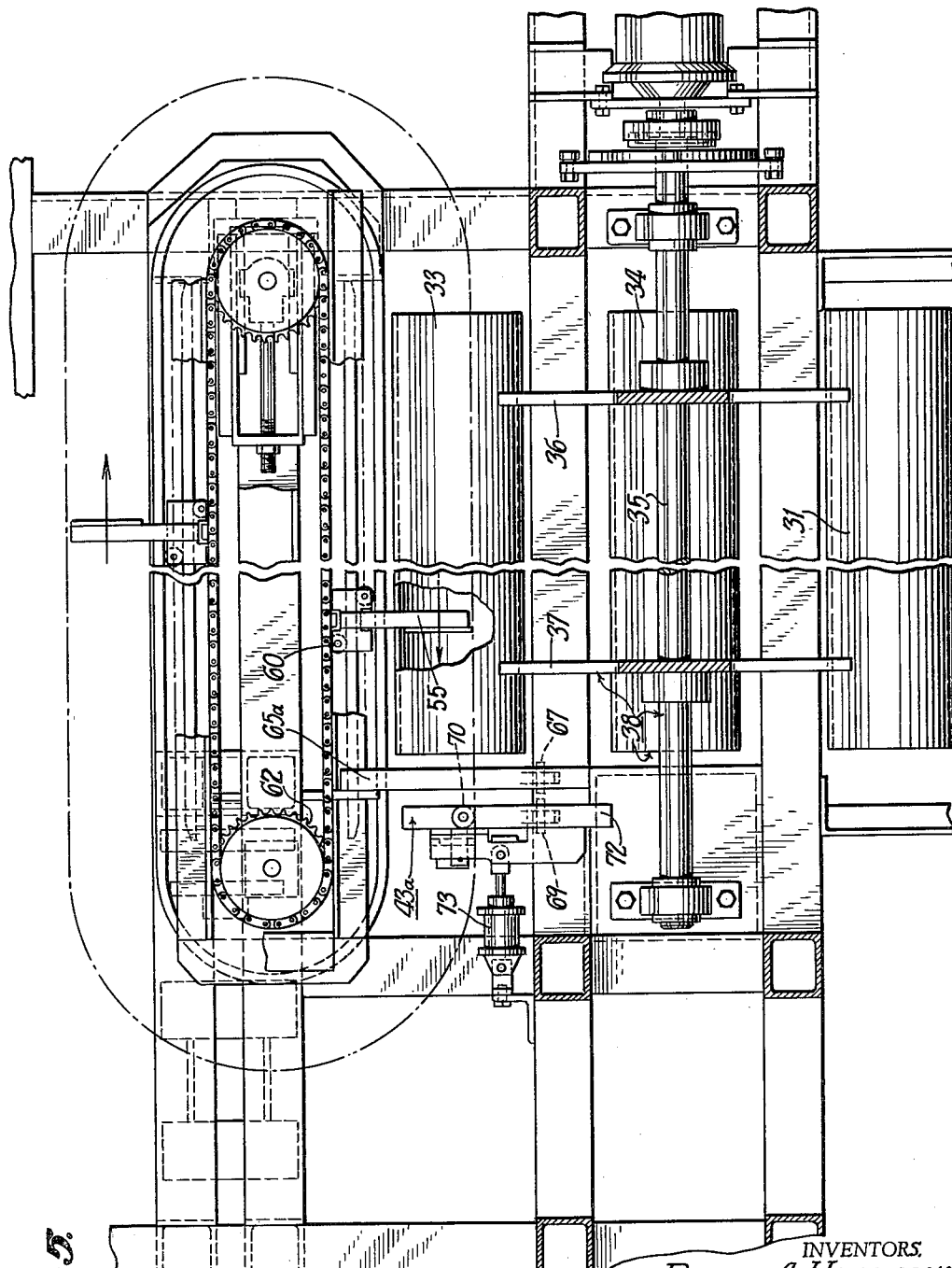

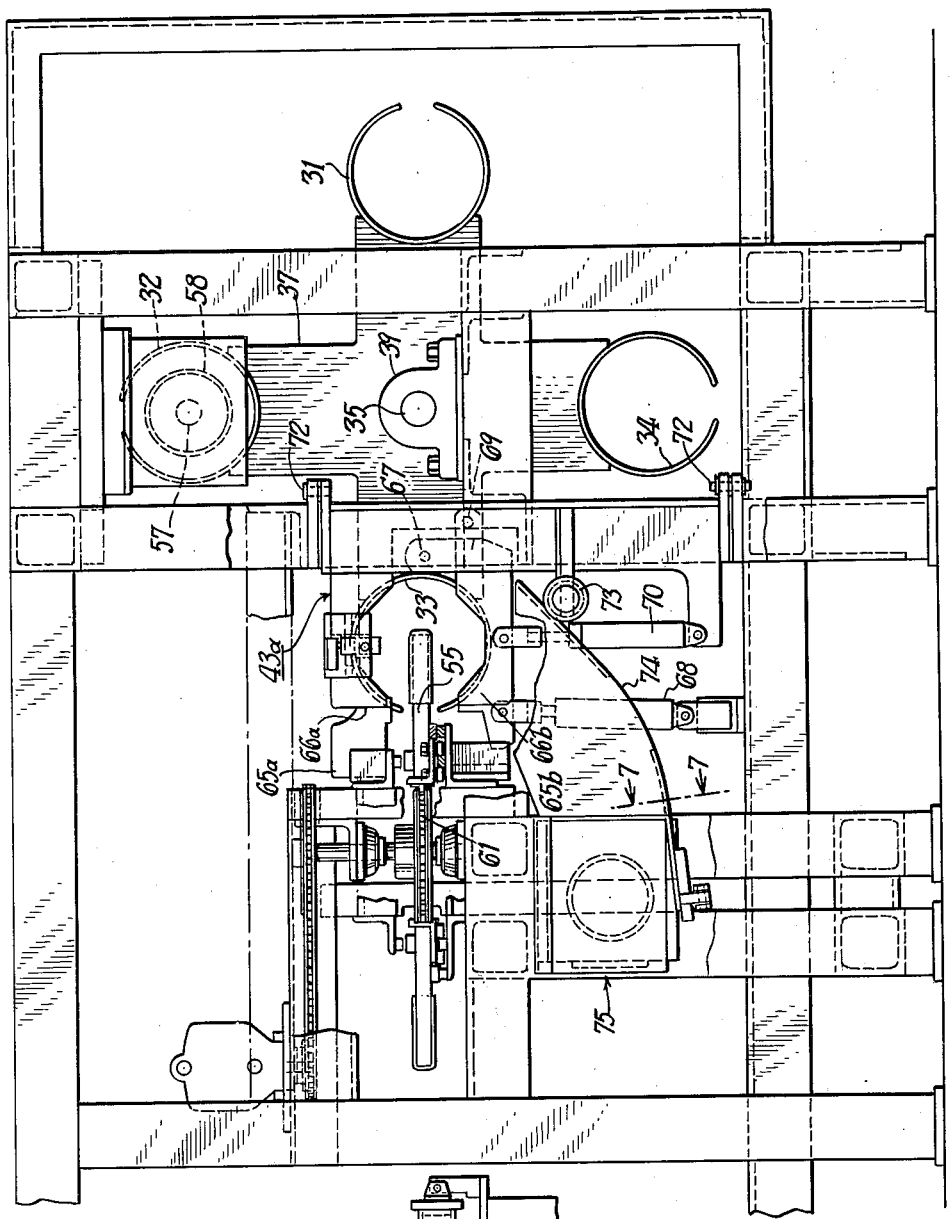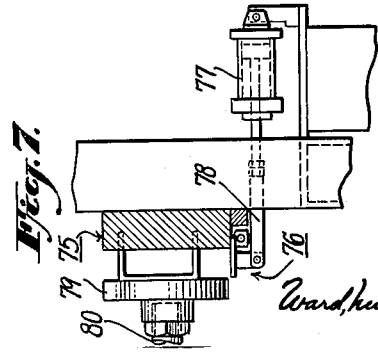
INVENTORS.
ROBERT A. HAVEMANN.
LARRY N. BROWN.
BY
Ward, Neal, Haselton, Orme & McChannon
ATTORNEYS.

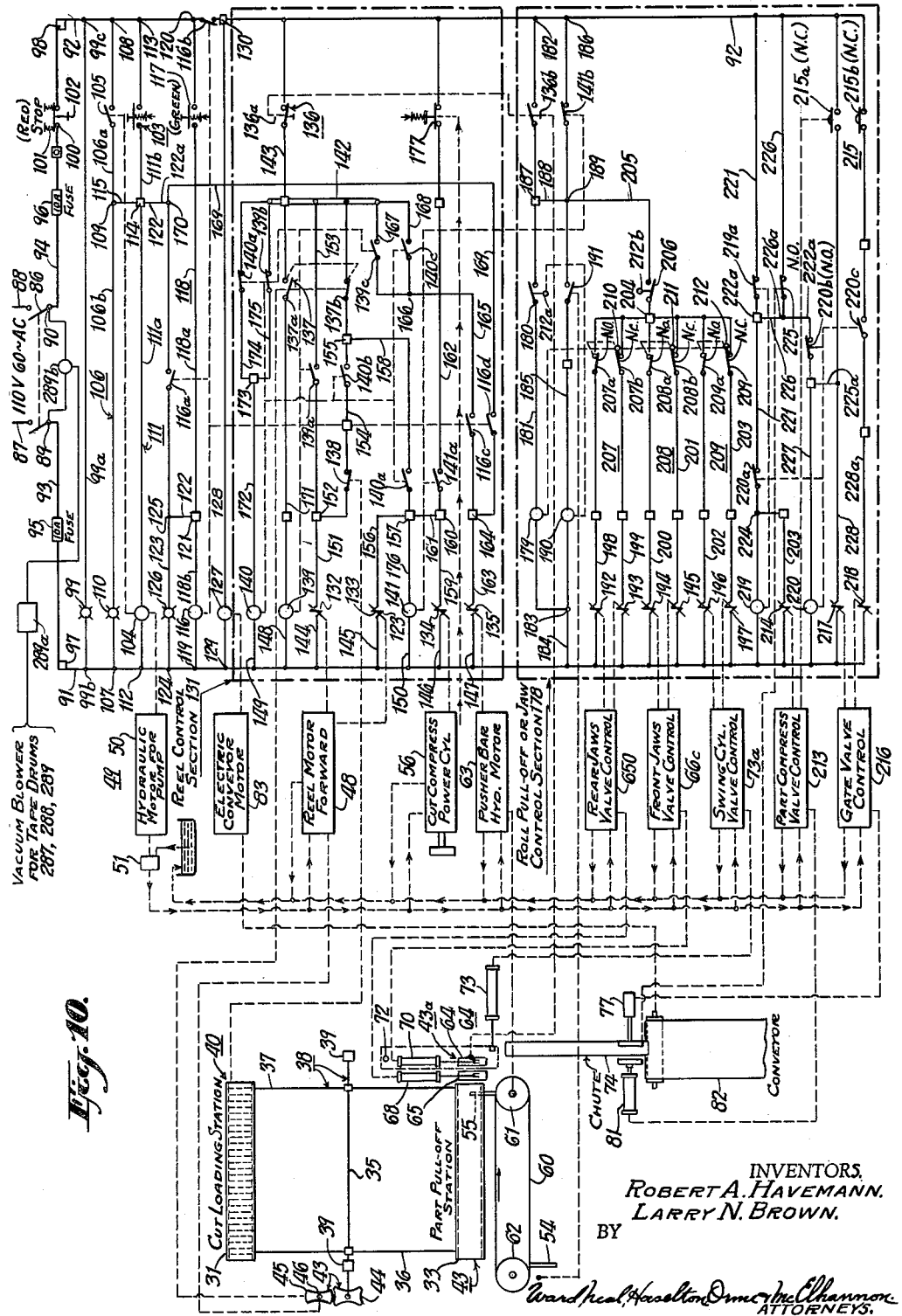

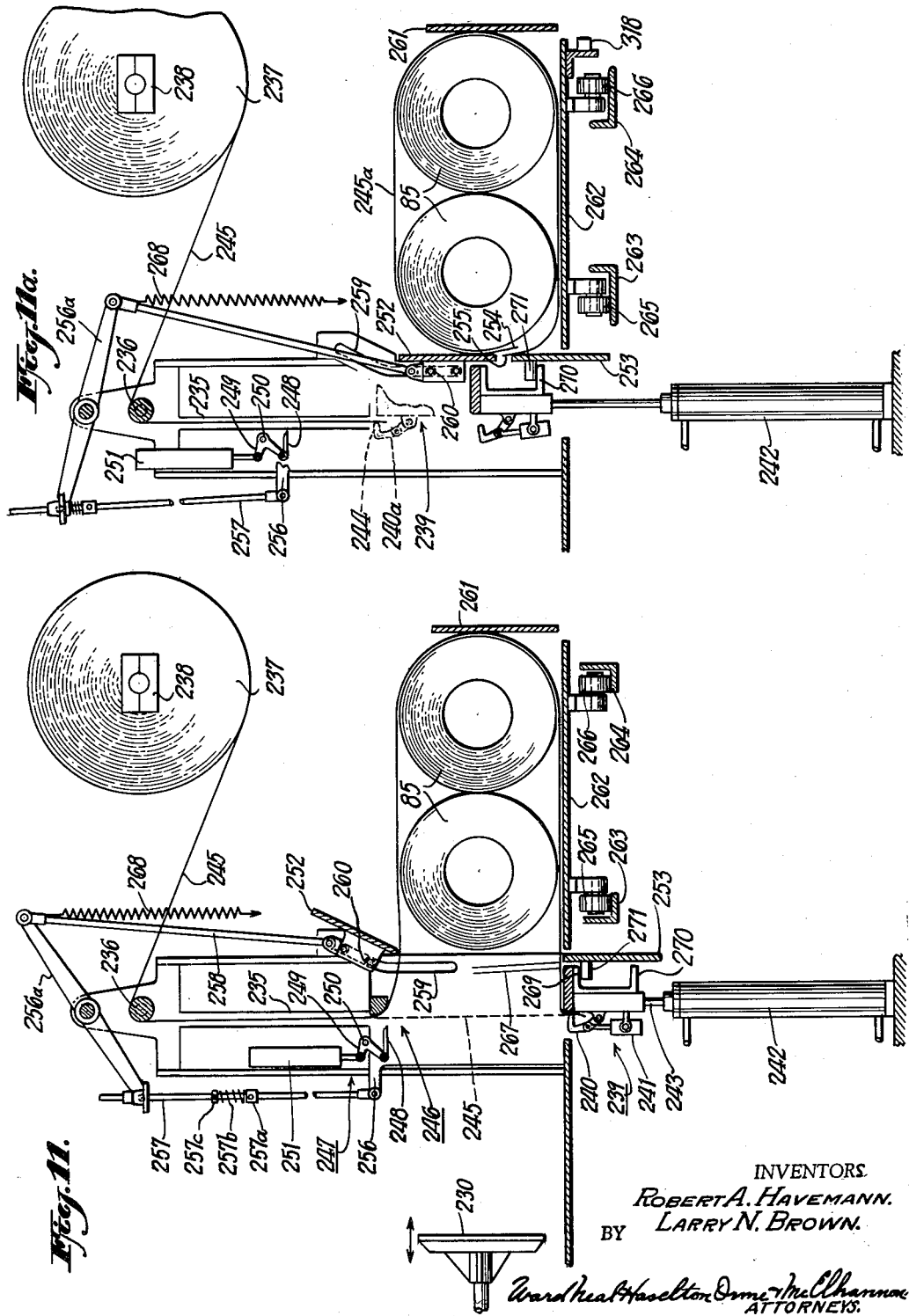

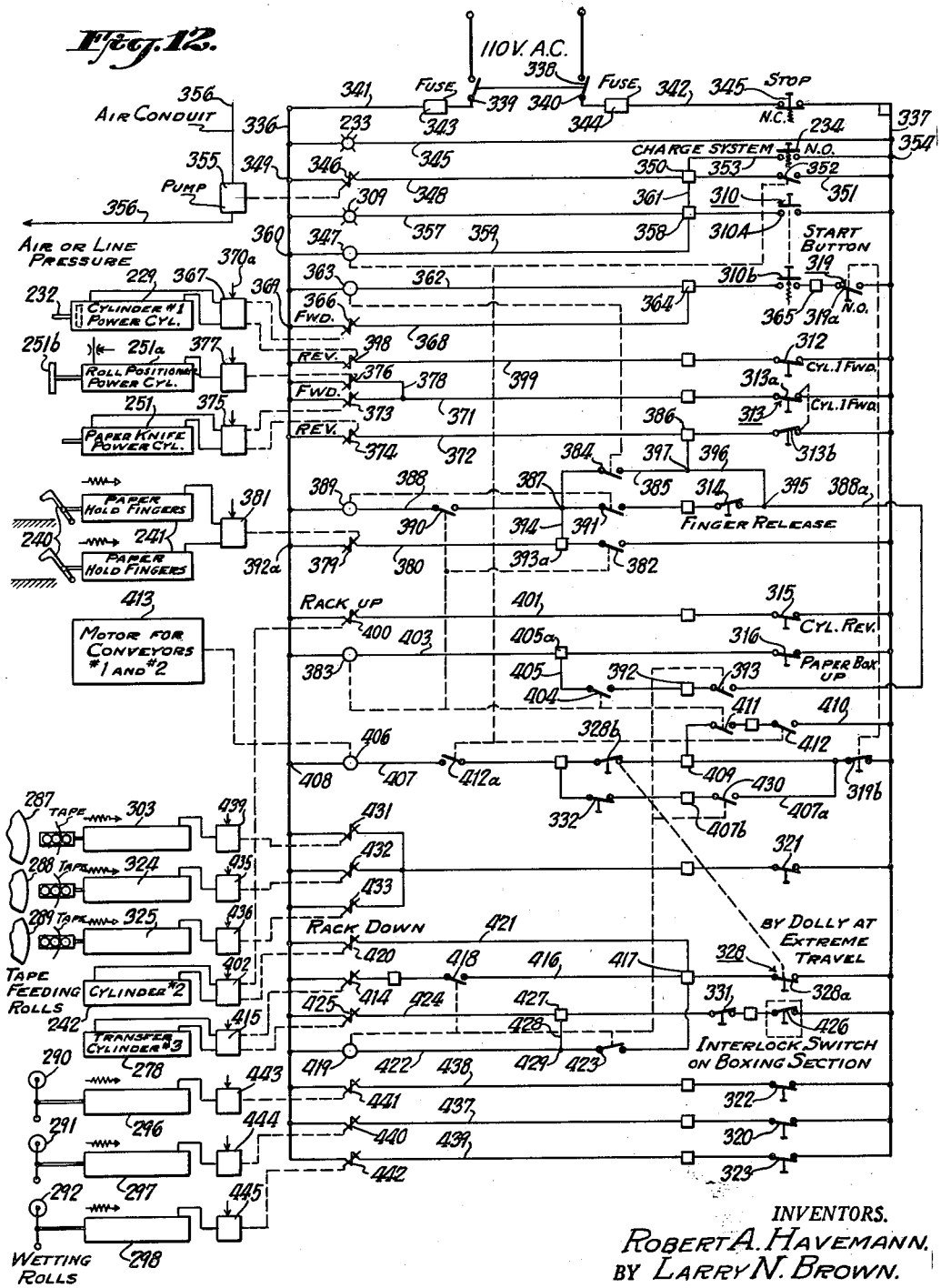

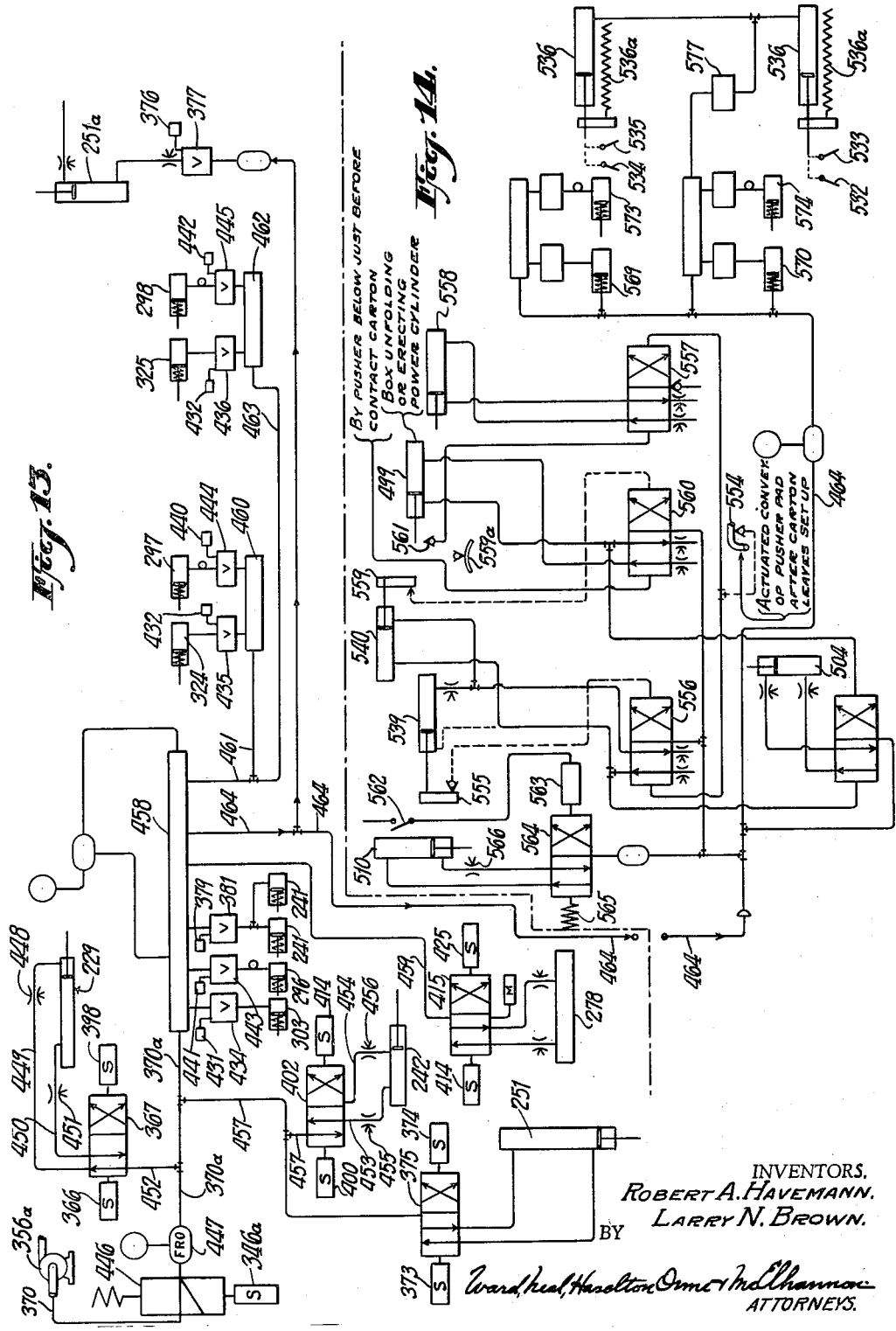

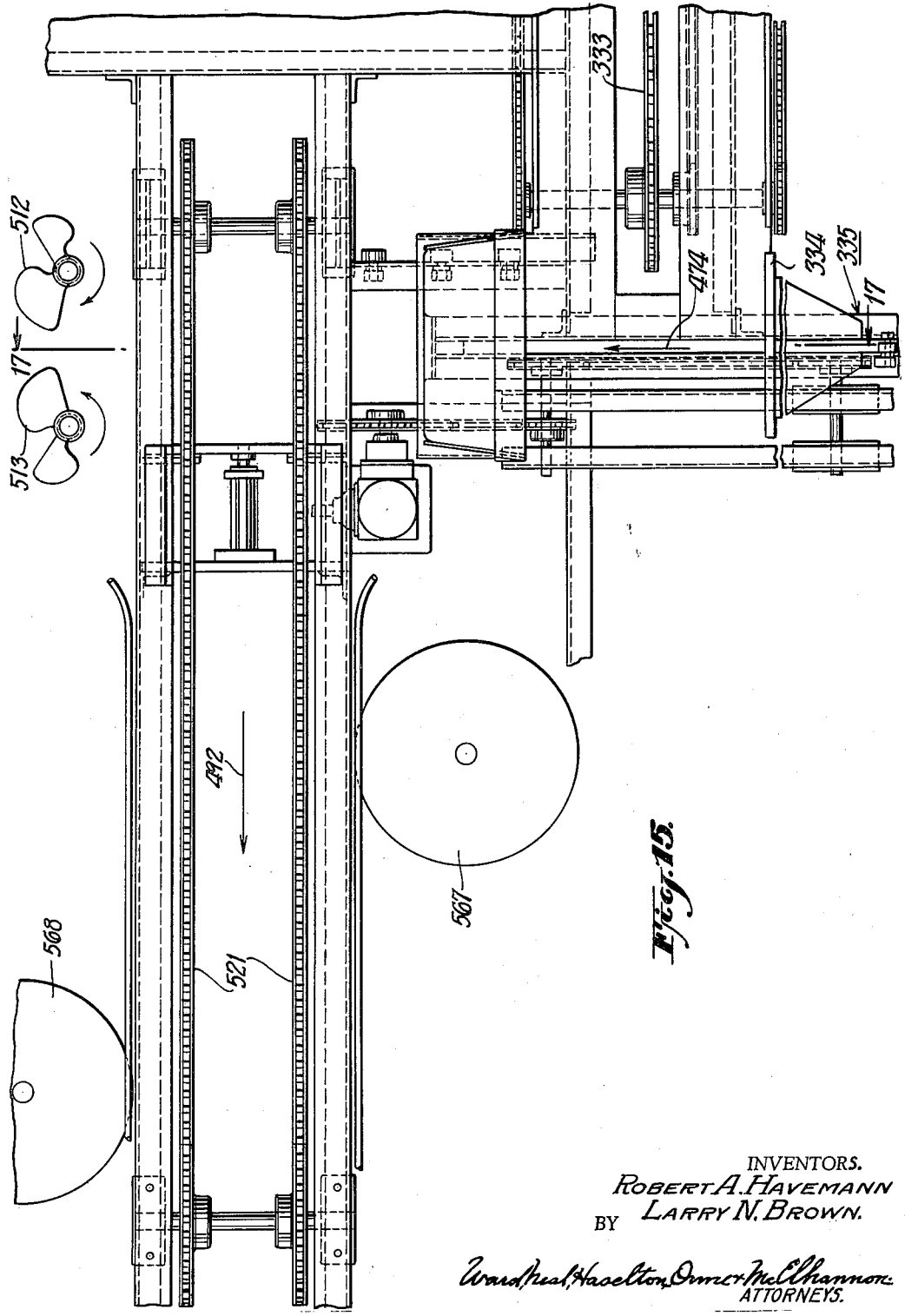

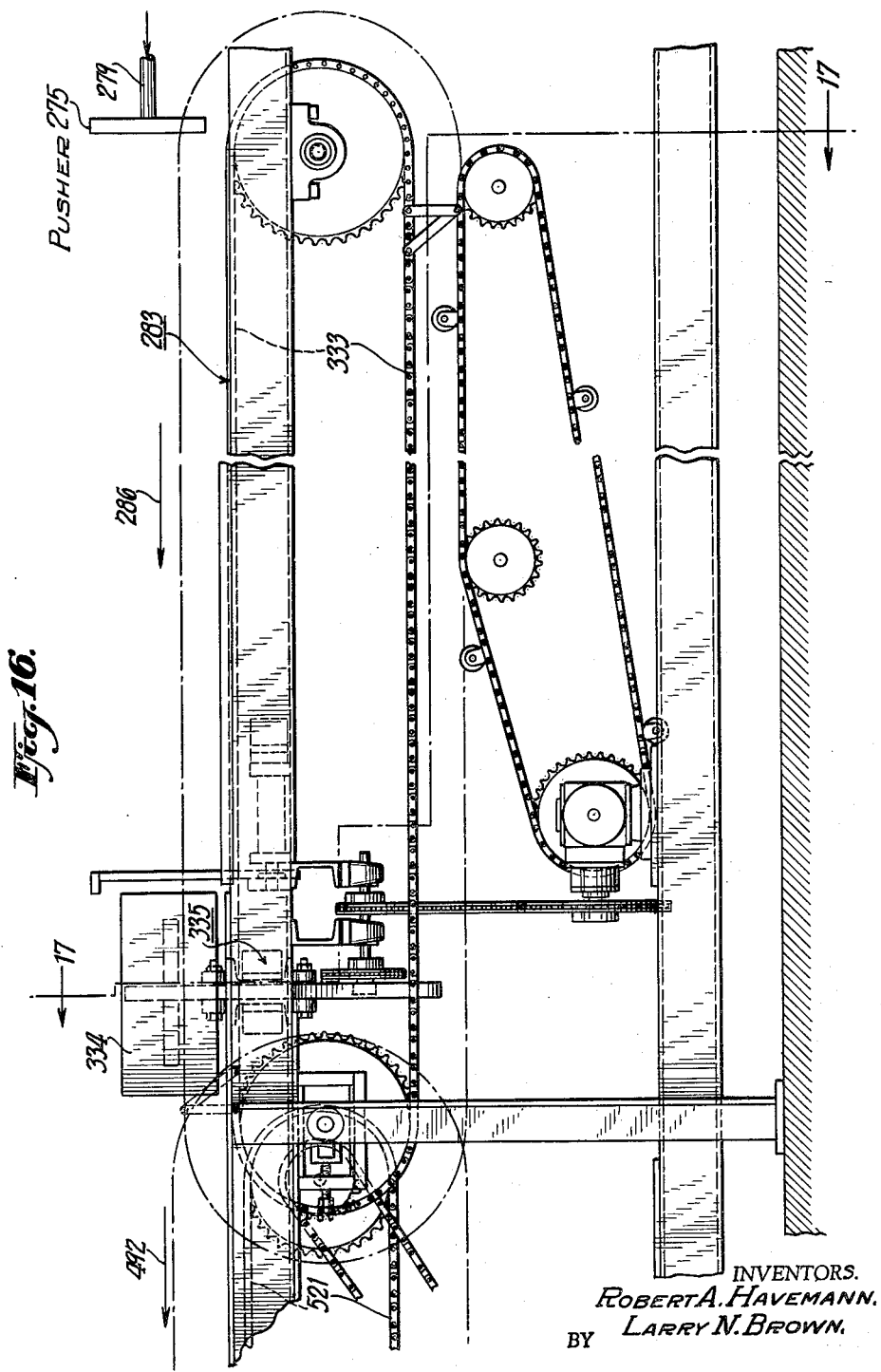

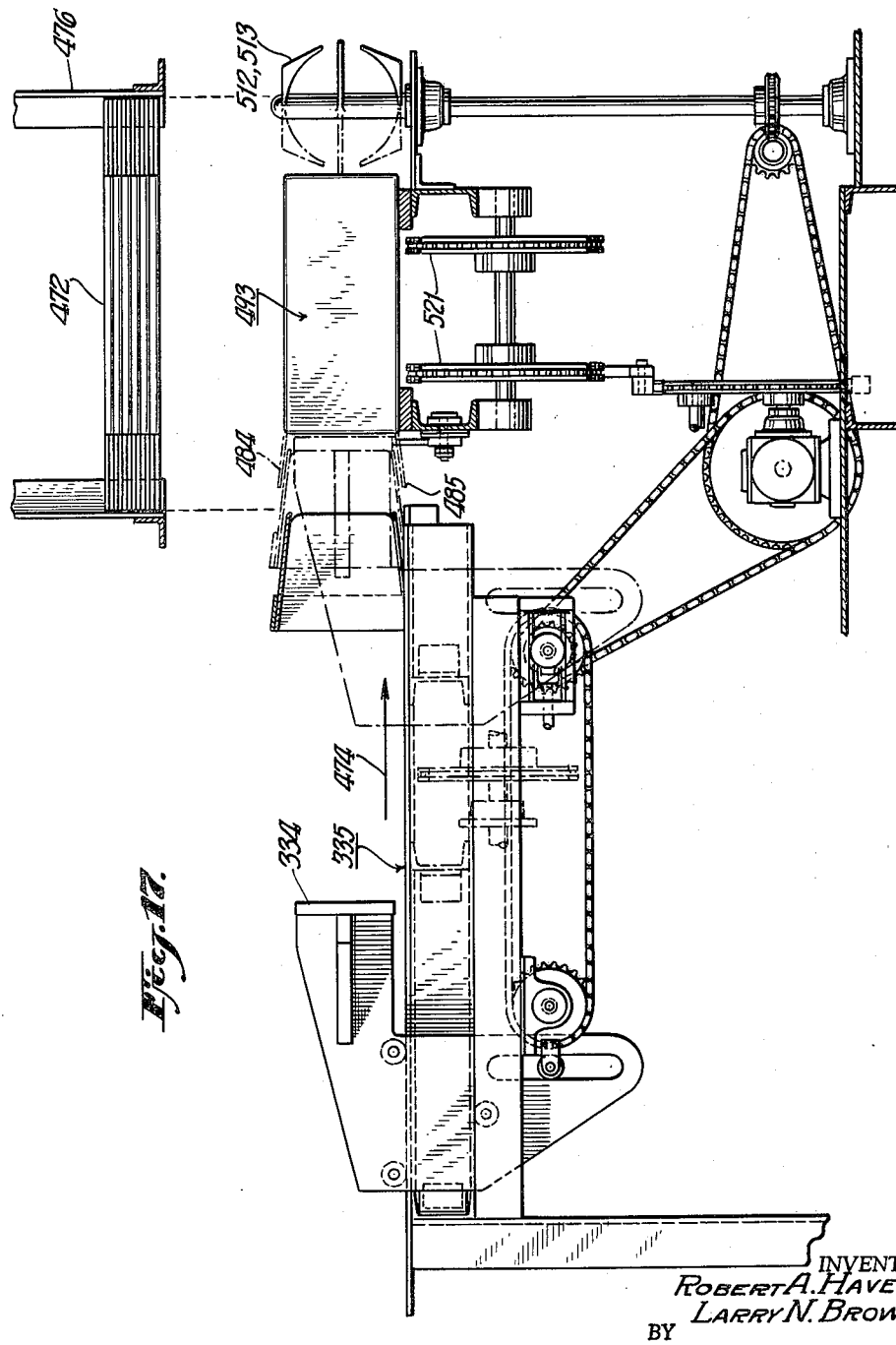

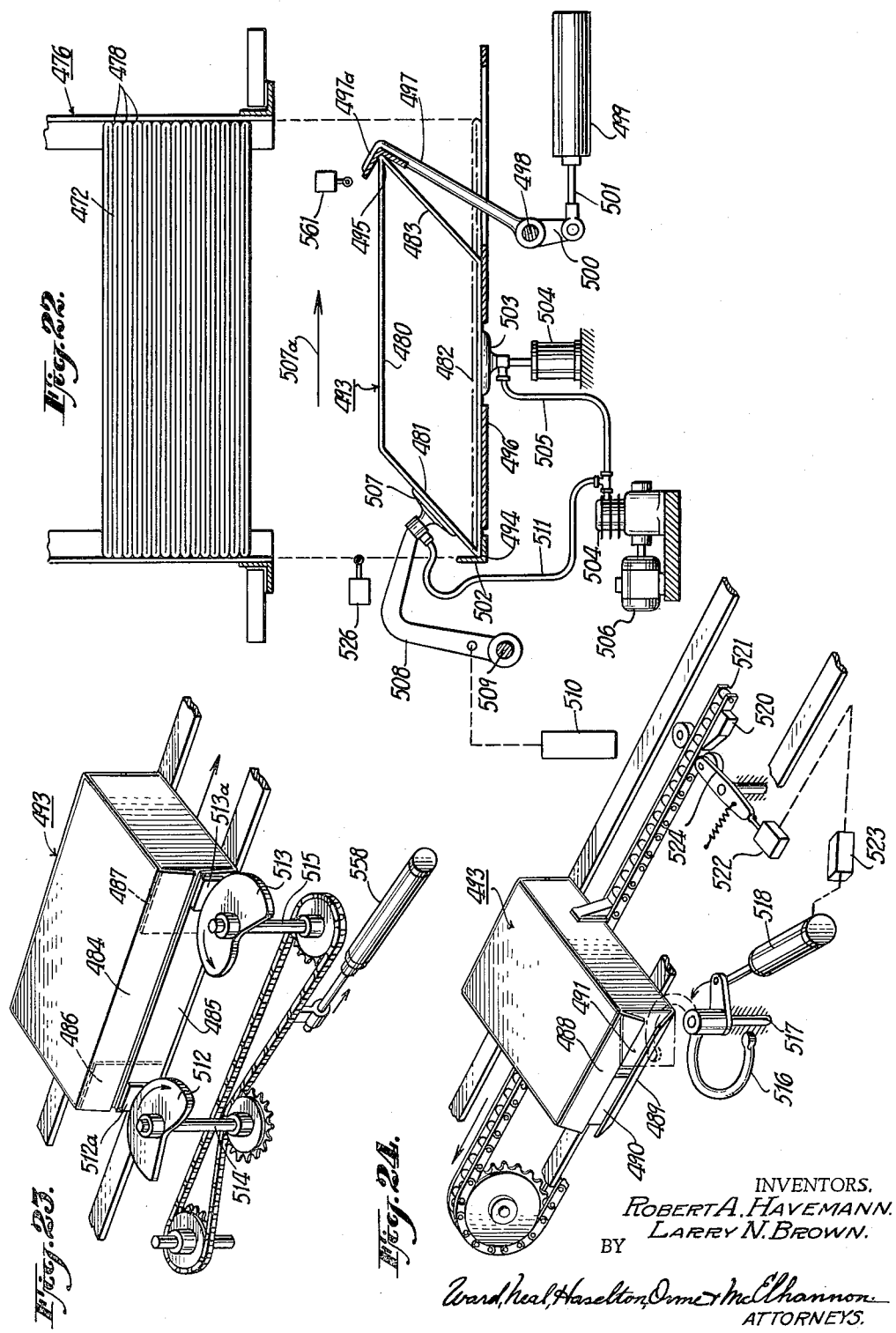

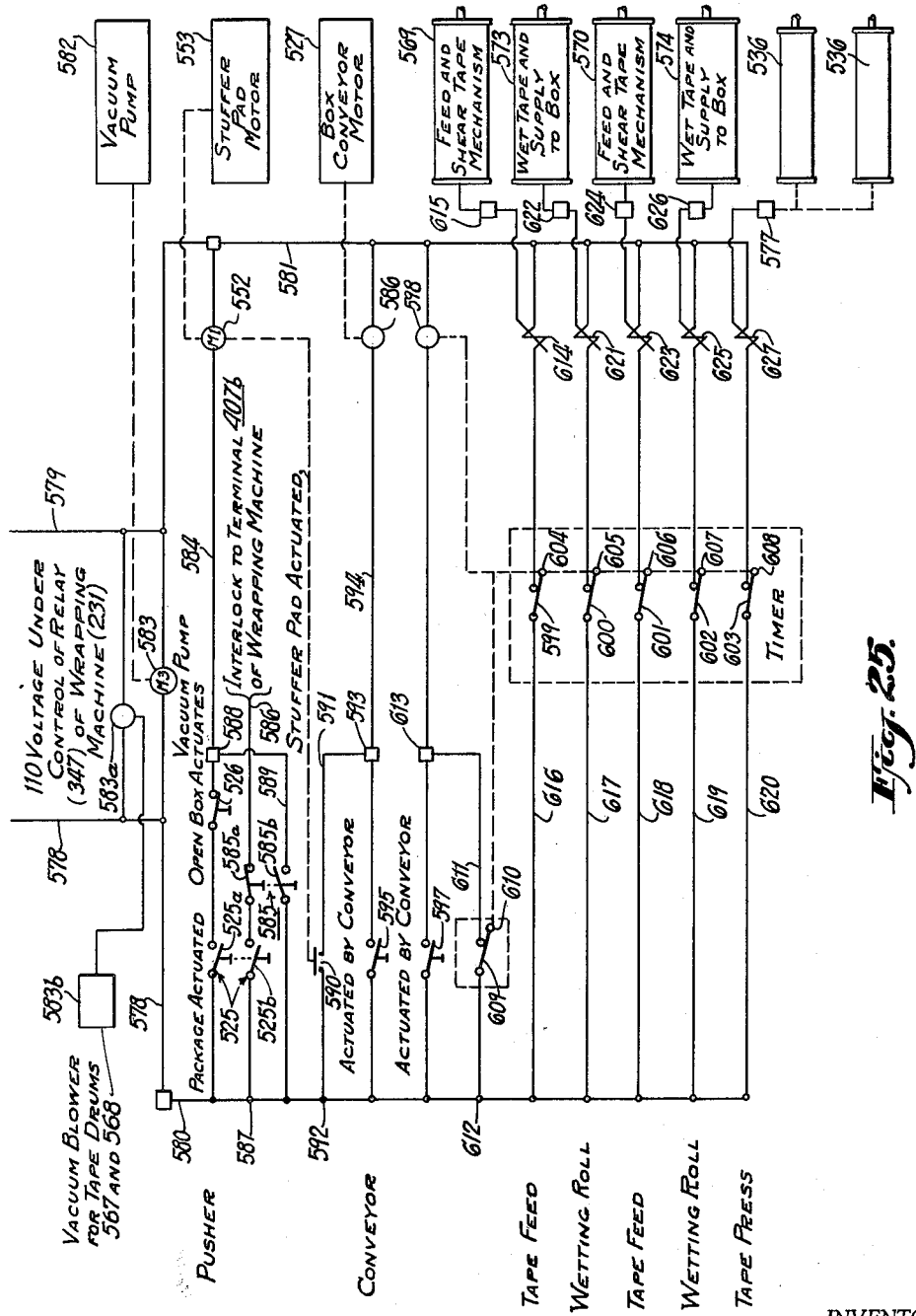

United States Patent Office 2,993,314
Patented July 25, 1961

2,993,314
PACKAGING MACHINE
Robert A. Havemann, Troy, and Larry N. Brown, Columbus, Ohio, assignors to St. Regis Paper Company, a corporation of Ohio
Filed July 7, 1958, Ser. No. 747,006
15 Claims. (Cl. 53—58)

This invention relates to packaging machinery, and more particularly to apparatus for automatically packaging groups of relatively narrow rolls of sheet material such as paper tape. The main roll of such sheet material, from which the relatively narrow rolls are formed, is originally of mill width and is subdivided, as by a slitting machine, to produce a plurality of rolls of relatively narrow width, the main roll after having been so subdivided comprising an initial length of coaxial tape rolls which are consecutively in close engagement and adhered to one another. The novel apparatus, by means of a roll separator device, separates each roll individually from such length, several separated rolls being formed into a packageable group which is automatically wrapped in a preliminary wrapping, as of kraft paper, by a wrapping device, and thereafter automatically inserted into a carton or box by suitable means comprising a box machine which automatically erects a box blank from a flat condition thereby adapting same to receive the wrapped group of rolls therein, the box machine thereafter automatically closing the box.

In the manufacture of rolls of tape, also referred to as gummed rolls, one of the principal difficulties comprises the expense incidental to the packaging of groups of the rolls for shipment. Such packaging has heretofore been accomplished by hand methods whereby each individual roll of tape is knocked by a mallet from the initial length of rolls aforementioned. Such initial length is known in the art as a "cut" and comprises a long cylinder-shaped group of rolls, which group is formed on the aforementioned slitting machine by slitting at a number of locations a mill width web of gummed paper, and thus subdividing the mill web into a plurality of smaller coaxial rolls. The separation of the rolls, as by striking same with a mallet to separate same preparatory to packaging, often damages the rolls and disfigures the roll sides which should be straight in order to be commercially desirable.

Following such roll separation by striking with a mallet, the gummed rolls to be packaged heretofore have been placed by hand in racks preparatory to the initial wrapping thereof, as with kraft paper, all of which also has been done by hand, although in some packaging procedures such initial wrapping may not be made and the gummed rolls may be packaged in suitable boxes, for example, of corrugated cardboard again by hand. The latter requires the removal by hand of the gummed rolls from the racks and the replacing of the rolls in the cardboard boxes, the latter in turn having been unfolded or erected by hand from flat box blanks.

Following the aforementioned hand operations, the cardboard box is closed manually by closing the end flaps thereof and manually applying gummed tape thereto although it is, of course, possible to close such boxes by the application of adhesive to selected surfaces of such end flaps.

One of the objects of the present invention is to overcome the above difficulties or to reduce same to insignificance.

The invention in one aspect thereof includes in combination rack means, which may be tubular in configuration, for receiving and holding such a cut consisting of the aforementioned plurality of coaxial rolls. Such rack means are held relatively fixed while means are employed for urging the cut in the direction of the axis thereof to cause one roll at a time to protrude from such rack means, although such protrusion does not cause the roll to separate from the rest. Suitable roll separator or part pull-off means are associated with the rack means comprising jaw or clamping means for grasping the protruding gummed roll mechanically and separating same from the rest by mechanical force and without the application of a blow, as by a hand mallet. The jaw or clamping means thereafter releases the roll. A plurality of such rolls then may be collected in a package group collection station preparatory to being wrapped and boxed as set forth below. If desired, suitable means may be provided for squeezing the aforementioned group of rolls between a pair of parallel surfaces and prior to the separation of any individual roll therefrom, for the purpose of straightening the sides of the rolls should such sides theretofore for some reason not be straight. Also, if desired, each individual roll may be squeezed or compressed between parallel surfaces following its separation from the cut thereby further to insure the desired straight-sided configuration of each roll.

After a group of such rolls is collected in the aforementioned package group collection station, the group is pushed, as by a ram, along a first path into engagement with a curtain of paper which is suitably releasably held and of selected dimension thereby causing the curtain of paper to be wrapped around the package group, there being suitable means employed for folding the upper and lower extremities of the curtain over one another thereby partially to wrap the package group, the opposite ends of the wrapping formed by the side margins of the curtain at this time being open. The package group thereafter is moved along a second path by suitable conveyor means, acting in timed relationship with such ram, past a tape applicator which applies tape of a selected length along the margins of such overlapping upper and lower extremities to hold same closed. Following the application of such tape, the package group is urged along a third path in a different direction (substantially perpendicular to the second) past suitable means for closing the aforementioned open ends of the wrapping, such means thereby forming on each end of the package closed end and side flaps preparatory to the application thereover respectively of additional preselected lengths of tape thereby to complete the initial wrapping of the package of rolls. Such package, now held closed by such tape on three sides thereof, is received at a package receiving station of a box machine which includes means for holding box blanks initially in flattened or unfolded condition above a box loading station. Associated with the means for holding the stack of box blanks are suitable box blank escapement means which at desired times release the box blanks seriatim in flattened condition onto the box loading station where suitable box unfolding or erecting means are provided consisting of means for squeezing the box open by compressing opposite side edges of the flattened blank, such box erecting means preferably including suction devices for engaging the bottommost horizontal box side wall and one of the side walls destined to be erected to a vertical attitude thereby to coact with the aforementioned box blank compression or squeezing means.

Upon fully erecting or unfolding each box blank, the end flaps, along the end thereof which is opposite to the position of the wrapped package of rolls, are closed by folding same inwardly by suitable end flap folding means whereupon a box stuffing or loading mechanism is actuated for the purpose of urging the wrapped package from said receiving station along a fourth path into the open mouth of the now erected box. A box conveyor acting in timed relation with the balance of the apparatus thereupon is actuated to urge the box out of the box loading station preferably in a direction perpendicular to the direction of motion of the package as inserted into the box, whereupon second end flap folding means come into operation for closing the flaps of the other end of the box. If desired, the now filled box may be held closed by virtue of adhesive theretofore applied to the end flaps at selected areas thereof or, if desired, such adhesive may be omitted and the filled box urged past a pair of tape applicators on opposite sides of the last-mentioned path thereof, which applicators apply tape over the end flaps to hold same closed.

The above and further objects and novel features of the invention will appear more fully from the description set forth below when read in connection with the accompanying drawings which form a part of the specification, it being understood that the drawings do not comprise a definition of the limits of the invention, reference to the claims being had for this purpose.

In the drawings:

FIGS. 1, 1a and 1b jointly comprise a perspective view of one form of apparatus embodying the invention, it being understood that said figures are to be considered in series;

FIGS. 2 and 2a jointly comprise a schematic view in plan of certain principal parts of the apparatus shown in FIGS. 1, 1a and 1b;

FIG. 3 is a side elevation, partly in section and with parts broken away, of a roll separator device comprising the first unit of the apparatus, namely, the one shown in FIG. 1 above;

FIG. 4 is a sectional view taken substantially on line 4—4 of FIG. 3;

FIG. 5 is a sectional view taken substantially along line 5—5 of FIG. 3;

FIG. 6 is a sectional view taken substantially along line 6—6 of FIG. 3;

FIG. 7 is a fragmentary sectional view taken substantially along line 7—7 of FIG. 6;

FIG. 8 is a fragmentary sectional view taken substantially along line 8—8 of FIG. 4;

FIG. 9 is a perspective schematic view of two pairs of jaws or clamps employed in the roll separator apparatus of FIG. 1 for consecutively separating one roll at a time from a group or "cut" of rolls;

FIG. 10 is a schematic representation of one form of wiring diagram for electrically interconnecting the various elements of the apparatus of FIG. 1, FIG. 10 also including a schematic representation of the mechanical elements of FIG. 1;

FIG. 11 is a schematic end view of the package wrapping and taping apparatus of FIG. 1a;

FIG. 11a is a schematic representation of the parts shown in FIG. 11 but in a different operating position;

FIG. 12 is a schematic representation of one form of wiring diagram for operatively and electrically interconnecting the parts of the wrapping and taping apparatus of FIG. 1a and including portions of the same machine shown in FIG. 1b exclusive of the box machine;

FIG. 13 is a schematic representation of the pneumatically operable parts of the wrapping and taping apparatus of FIGS. 1a and 1b (exclusive of such box machine);

FIG. 14 is a continuation of FIG. 13 and comprises a schematic representation of the pneumatically operable parts of the box machine of FIG. 1b;

FIG. 15 is a plan view, partly in section and with parts broken away, certain parts being omitted for clarity, of the box machine including the box loading apparatus of FIG. 1b above;

FIG. 16 is a side elevation, also partly in section and with parts broken away, of portions of the apparatus shown in FIG. 15;

FIG. 17 is a sectional view taken substantially along line 17—17 of FIG. 15;

FIG. 22 is a schematic side view, partly in section and with parts broken away, of apparatus for unfolding or erecting flattened box blanks after each has been discharged from the box blank stack holding and escapement device of FIGS. 18 to 21;

FIG. 23 is a perspective schematic representation of apparatus for closing the end flaps of a box after it has been erected in the box erecting station beneath the box blank stack holding device of FIG. 18;

FIG. 24 is a perspective view of mechanism for folding a carton flap upon an opposite end of the box, as compared to FIG. 23, and in response to movement of the box out of such box erecting station; and FIG. 25 is a schematic representation of one form of wiring diagram for operatively interconnecting the parts of the box machine of FIGS. 1b and 14–24, inclusive.

Figure 18:
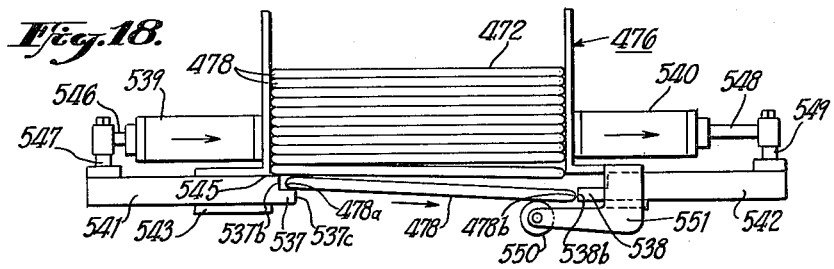
FIGS. 18, 19, 20 and 21 are schematic side elevations of a box blank stack holding and escapement mechanism of the apparatus of FIGS. 14, 15 and 16, such schematic representations showing the parts thereof in successive operating position.

Referring now to the drawings, the apparatus will be described in detail in three sections, namely:

(a) The roll separator device principally shown in FIG. 1, portions of FIG. 2 and in FIGS. 3–10;

(b) The package wrapping and taping device of FIG. 1a and portions of FIG. 1b (exclusive of the box machine) and shown principally in the aforementioned FIGS. 1a and 1b, together with FIGS. 11, 11a, 12 and 13; and (c) The box machine including the loading device shown in FIG. 1b and also in FIGS. 14–25, inclusive.

Roll separator device

This unit will be described in general terms with particular reference to its operation and to FIGS. 1, 2 and 4–9, inclusive. Thereafter the detailed operation of its many electrically and hydraulically interconnected parts will be described separately in connection with FIG. 10.

In the manufacture of rolls of tape, and in particular of gummed paper tape, the rolls as aforementioned are initially formed in coaxial groups, this being done by slitting machines, such coaxial rolls being consecutively closely adhered to one another by virtue of the adhesive or gum along the sides of the rolls. Such a group of rolls, as delivered by a slitting machine, is usually referred to in the art as a "cut" of rolls, it consequently being in the form of an elongated cylinder made up of the adhered but separable individual rolls. Normally it is difficult to disengage the rolls individually from the cut without the use of substantial force and this, as aforementioned, has been done in the past by a hand mallet thereby to separate the individual rolls consecutively from the cut preparatory to wrapping and boxing same.

Also in the formation of such group or cut of gummed rolls, as on a slitting machine, often the slitting machine produces defects in the rolls comprising non-straight sides. Straight-sidedness of each individual roll is a commercially important factor and must be maintained or restored by suitable means and, in the apparatus shown, roll compression devices are employed for restoring the straight-sidedness of any rolls which have been deformed in this manner. Such roll separation and roll compression operations are performed in the roll separator unit of FIG. 1 designated generally at 30.

The roll separator unit comprises a group of parallel tubes or barrels mounted for rotation about a common axis, each of such tubes having a longitudinally extending slot therein for a purpose to appear later.

In the form shown, four tubes, 31, 32, 33 and 34, are employed which are mounted at 90° intervals about a central mounting shaft 35 by means of suitable cross-arms, one of which, 36, is shown in FIG. 1 at one end of the tubes, an additional and analogous set of cross-arms 37 for the opposite end of the tubes being shown in FIGS. 3 and 5.

The tubes 31–34, inclusive, together with the mounting means therefor, 35, 36 and 37, comprise an angularly shiftable frame or reel generally designated 38 (FIG. 1), it being understood that the central shaft 35 of the frame is supported upon suitable bearings 39 (FIG. 3).

Such several tubes 31–34, inclusive, are each successively angularly shiftable into the following stations:

(a) A cut loading station 40 (FIG. 1);
(b) A cut compression station 41; and
(c) A roll discharge station 42.

The intermittent angular movement of the tubes into such three stations can be accomplished by any suitable means which, in the form shown, comprise a conventional Geneva mechanism 43 consisting of Geneva gears 44 and 45 secured respectively to the aforementioned central frame shaft 35 and to a shaft 46 of a motor 48 which is of the hydraulically actuated variety, it being understood that the term "hydraulically actuated" as employed herein embraces the use of oil or any suitable fluid under pressure. Geneva gear 45 is also referred to as the "reel driving arm" because of its function of angularly shifting the reel 38 (via motor 48). The oil under pressure is directed to the motor 48 by means of an hydraulic power unit 49 which includes an electric motor 50 which operates a pump 51, the latter drawing oil from a reservoir 52 and directing same to the several oil-actuated devices (including motor 48) as indicated schematically in FIG. 10 to be described below.

At the cut loading station 40 a cut or load 53 of rolls is inserted axially into the tube 31, the latter having a straight longitudinally extending slot 31a along the side thereof, as shown in FIG. 1, for the purpose of permitting the entrance of a pusher finger 54 or 55 to urge the rolls toward a roll separator or pull-off station when the tube reaches the roll discharge station 42.

When the tube reaches the cut compression station 41, it is subjected to pressure between parallel surfaces, that is, it is compressed by means of an hydraulic power cylinder 56 having a piston 57 to which is secured a circular plate 58 which urges or compresses the rolls against a stationary anvil 59 located at the opposite extremity of the cut of rolls. Plate 58 is preferably of less diameter than the inner diameter of any tube 31–34 thereby to allow the plate to enter into the tube if necessary.

Referring jointly to FIGS. 1 and 9, when the cut or group of rolls reaches the roll discharge station 43, one of the aforementioned fingers 54 or 55 are effective to urge the rolls axially toward one end of the tube to a roll separator or pull-off station 43a. The pusher fingers 54 and 55 are mounted upon an endless band or sprocket chain 60 which passes over sprocket wheels 61 and 62, such pusher fingers being separated by half the length of the chain, the latter being positioned in such a manner that one of the pusher fingers is capable of entering the aforementioned longitudinal slot, such as 31a in the tube 31 or a corresponding slot 33a in the tube 33, and to exert a pressure to the left, as viewed in FIG. 1, upon the group of rolls.

As shown in FIG. 10, a pusher hydraulic motor 63 is provided for this purpose which receives fluid under pressure from the pump 51, hydraulic motor 63 being provided with suitably well known by-pass valve control means for the purpose of insuring that a steady and uniform torque is applied to one or both of the sprocket wheels 61, 62 thereby to apply a steady pressure via a pusher finger to the rolls in the station 33 and axially thereof thereby to urge same toward the jaw device 64 at the roll separator or pull-off station 43a (FIG. 9), such jaw device being designed for the purpose of grasping two consecutive rolls and separating the outermost one from the other.

The jaw device 64 comprises two pairs of jaws 65 and 66, respectively the rear and front jaws. The rear pair of jaws 65 include individual jaws 65a and 65b, the former and upper one of which is fixed and the latter and lower one of which is angularly shiftable about a pivot 67 under the influence of a power cylinder 68 which thus is able to open and close the rear jaws.

The front jaws 66 include upper and lower jaws 66a and 66b, the former being fixed relative to the latter which is angularly shiftable about a pivot 69 under the influence of a power cylinder 70 which thus can open and close same.

In addition to the opening and closing movement of the front jaws 66, the latter are mounted for swinging or angular movement through an angle 71 about the axis of pivots 72 by means of a swing power cylinder 73. It is understood that said power cylinders are operatively connected to their respective jaws by well known means.

By means of the above mechanism it is possible for the two jaws to receive two consecutive rolls, for example, of gummed tape, which are strongly adhered to one another, this occurring while the jaws are open and in the relative positions shown in the drawings whereupon the jaws are closed and the front pair thereof, 66, is swung or angularly shifted through the angle 71 by power cylinder 73 thereby to separate the outermost roll from the rest of the cut, that is, to separate the roll in the front jaws 66 from the roll in the rear jaws 65.

Suitable means are employed for governing the timing of the above operations, as will be set forth more fully herebelow.

The front jaws 66 are opened after they have separated a roll from a cut thereby to release such roll into a chute 74 (FIGS. 1, 6 and 10) which guides the roll down to an individual roll compression station 75 (FIGS. 1, 6 and 10) having a gate mechanism 76 which is actuatable by a gate power cylinder 77 (FIG. 7) through an interconnection 78.

At the station 75 a compression plate 79 secured to a piston rod 80 of a power cylinder 81 is adapted for exerting a final and individual compression operation upon a roll in such station and thereby to insure that the sides of the roll are straight and have not been deformed as a result of the roll separating operation accomplished by the apparatus of FIG. 9.

The gate 76 is opened following the actuation of the power cylinder 81 thereby to release a roll therein to a conveyor 82 (FIG. 1) driven by an electric motor 83, such conveyor thus delivering a succession of separated rolls to an inspection station 84, as shown in FIG. 1a, or alternatively the conveyor 82 may be designed to convey the individual rolls to and place same suitably in a package group 85.

Referring now to FIG. 10, there will be set forth a description in detail of the wiring diagram showing one system for electrically interconnecting the various elements which have been heretofore described. There will also be described the electrical means for accomplishing the desired sequence of events which occur in the operation of the roll separator device 30.

A master switch 86 is provided for interconnecting the wiring system of FIG. 10 to power leads 87 and 88 for the purpose of providing the circuit with suitable supply of electrical energy, for example, 115 volt 60 cycle A.C.

The terminals 89 and 90 of the switch 86 are electrically connected to the principal electrical leads 91 and 92 of the wiring diagram by means of leads 93 and 94, respectively, there being interposed in such leads 93 and 94 suitable fuses 95 and 96, respectively, which, for example, may be of the 10 amp. variety.

The aforementioned leads 93 and 94 are respectively connected to the principal electrical leads 91 and 92 at terminals 97 and 98, respectively, there being connected across the aforementioned leads 91 and 92 in parallel with the circuit a suitable red pilot light 99 which is under the influence of a stop switch 100 which is normally closed and held normally closed by means, for example, of springs 101, the stop switch 100 being openable by finger pressure upon a button 102. Thus finger pressure upon the button 102 will, at least momentarily, interrupt the flow of current to the red pilot light 99 and in a manner to appear more fully herebelow will deenergize the electrical circuit in a manner also to appear more fully herebelow. The red pilot light 99 is connected across the leads 91, 92 via a lead 99a.

The energization of the red pilot light 99, of course, indicates that the machine comprising the unit 30 is electrically energized.

For the purpose of initiating the operation of the hydraulic system comprising those elements actuated by the hydraulic pump 51 and its motor 50, an hydraulic start switch 103 is momentarily depressed, such switch being normally open. The momentary depression or closing of such hydraulic start switch energizes a magnetic starter 104 of conventional design which is operatively connected to the hydraulic motor 50, the magnetic starter 104 being operatively connected to suitable holding contacts 105 which, in a well known manner, are capable of maintaining the energization of the hydraulic motor 50 after the release of the hydraulic starter switch 103 by virtue of an electric circuit through the holding contacts 105.

The lead 99a is connected respectively to the leads 91 and 92 at the terminals 99b and 99c. Also the magnetic holding contacts 105 are connected across such leads 91 and 92 via a lead 106 at the terminals 107 and 108, respectively.

The lead 106 is divided into two parts, namely, 106a between the terminal 108 and a terminal 109 interposed therein, and a portion 106b between the terminal 109 and terminal 107. The holding contacts are interposed in the portion 106a and an amber light 110 is interposed in the portion 106b, the latter, of course, indicating the state of energization of the holding contacts.

The magnetic starter device 104 and the hydraulic starter switch 103 are interposed in a lead 111 which is connected to the aforementioned leads 91 and 92 at terminals 112 and 113, respectively.

A terminal 114 is interposed in the lead 111 intermediate the start switch 103 and the magnetic starter 104 and is interconnected by means of a lead 115 with the aforementioned terminal 109 thereby providing the aforementioned holding circuit for the holding contacts 105 which enables the magnetic starter 104 to remain energized following release of the hydraulic start switch 103, this being accomplished via the circuit comprising the leads 106a, 115, and portion 111a of lead 111, such portion being interposed between the terminals 114 and 112. The hydraulic start switch 103 thus is interposed in a portion 111b of the lead 111.

It is necessary to insure that the electrically operable elements of the apparatus be prevented from operating or held inoperative unless the hydraulic system is in operation and hence it is desirable to provide means for insuring that electrical energy is withheld from the balance of the apparatus, as shown in FIG. 10, in the absence of the operation of the hydraulic motor 50 and hence of its magnetic starter 104 and its holding contacts. This is accomplished in the present invention by means of a relay coil 116 which is under the influence of a cycle start switch 117, the relay coil 116 being operatively connected to relay contacts 116a and 116b and also to relay contacts 116c and 116d, the latter two contacts to be described in greater detail hereinafter.

The relay coil 116 and the cycle start switch 117 are interposed in a lead 118 which is connected to the leads 91 and 92 across the terminals 119 and 120, the lead 118 being subdivided into two portions 118a between a terminal 121 and the terminal 120, and a portion 118b between the terminals 119 and 121.

The terminal 121 is electrically connected to the terminal 114 via a lead 122 in which are interposed the aforementioned pair of normally open relay contacts 116a.

The aforementioned pair of normally open relay contacts 116b are interposed in the lead 92 just below the aforementioned terminal 120.

Hence the aforementioned objective can be achieved of preventing operation of the apparatus (other than the hydraulic elements thereof) unless such hydraulic system is in operation, this being accomplished by virtue of the fact that the normally open contacts 116b will remain open unless the magnetic holding contacts 105 are theretofore closed, this being significant because a momentary closing of the cycle start switch 117 will energize the relay coil 116 which can remain energized thereby to hold closed the contacts 116b only in the event that the magnetic system is in operation and the magnetic holding contacts 105 are closed by virtue of a circuit from the terminal 119 through the relay coil 116, and thence to the terminal 108 via the terminal 121, the lead 122, leads 115 and 106a, the magnetic holding contacts being interposed in the latter lead.

It will be noted that a lead 123 is interconnected between terminals 124 and 125, the former being in the lead 91, and in the lead 123 there is interposed a green light 126 which indicates the state of energization of the aforementioned circuit through the relay coil 116, that is, between the terminal 119 and the terminal 108. Hence, by visual means it is possible to determine whether or not the magnetic holding contacts 105 are closed and hence whether or not the relay coil 116 is in condition for supplying the balance of the electrically operable devices below the relay 116b, as viewed in FIG. 10. It will be seen, of course, that all of the electrically operable devices below the aforementioned relay contacts 116 will be rendered inoperative by virtue of the normally open condition of these contacts when the relay 116 is deenergized, this being reflected, of course, in the fact that the green light 126 is out.

For the purpose of energizing the conveyor motor 83 (FIGS. 1 and 10), a magnetic starter 127 is provided therefor, said starter being of conventional construction and interposed in a lead 128 which is interconnected across the leads 91 and 92 via terminals 129 and 130. Hence the magnetic starter 127 is energized and the conveyor motor 83 operates continuously while the relay contacts 116b are closed, this, of course, continuing until the stop switch 102 is momentarily depressed, thereby to break the holding contacts 105.

As aforementioned, it is desirable when a new cut or load is inserted into a tube, such as 31, at the loading station 40, and also when the cut or load has been exhausted from the tube in the roll discharge station 42, that the reel 38 be angularly shifted 90°, that is, moved from one indexed position to the next one, whereupon the cut compress mechanism, including the power cylinder 58, is actuated for compressing the cut in the cut compression station 41. Simultaneously, of course, a new and compressed cut is moved into the roll discharge station 42 and a pusher arm, such as 54, is urged against the lefthand extremity thereof (FIG. 10) for the purpose of urging the cut toward the part or roll pull-off station 43a, namely, the station comprising the location of the two pairs of jaws 65 and 66.

The aforementioned is accomplished automatically and in a desired sequence of events by electrical and mechanical devices which will now be described, special reference being had to the means for controlling the reel motor 48, the cut compress power cylinder 56, and the pusher arm hydraulic motor 63, the latter being operatively connected to the sprocket chain 60 via the sprocket wheel 61.

The section of the wiring diagram now to be described is referred to as the reel control section and is designed for the purpose of controlling the aforementioned elements: the reel motor 48, the cut compress power cylinder 56 and the pusher arm hydraulic motor 63, such reel control section being designated as the portion within the box 131 represented by broken lines.

The reel motor 48 is directly under the influence of two solenoids, namely, solenoid 132 and 133. The cut-compress power cylinder 56 is directly under the influence of another power cylinder 134. The pusher arm hydraulic motor 63 is under the control of a solenoid 135. When the aforementioned solenoid 133 is energized, it acts to reset the reel driving arm 45 in a manner to appear more fully hereinafter and also when the solenoid 135 is deenergized, it allows the pusher arm hydraulic motor 63 to operate thereby to move the sprocket chain 60 and to urge one or the other of the pusher arms 54 or 55 against the cut or group of rolls.

The other two solenoids, namely, 132 and 134, when energized actuate their respective elements.

The aforementioned solenoids 132–135, inclusive, are principally under the influence of the following limit switches: (a) a limit switch 136 which consists of two interconnected portions, namely, 136a and 136b, the latter to be described more fully hereinafter in connection with the timing mechanism for controlling the sequence of operations of the part pull-off mechanism, namely, the double jaw mechanism of FIG. 9; (b) a limit switch 137 which is also subdivided into two interconnected portions 137a and 137b; and (c) a third limit switch 138.

In addition to the aforementioned limit switches 136, 137 and 138, the aforementioned solenoids 132–134 are also under the influence of relay coils 139, 140 and 141, together with the relay contacts operatively connected thereto also as will be described more fully hereinafter.

There will now be described the circuit for electrically interconnecting the several parts mentioned above in connection with the reel control section.

A main reel section terminal bar 142 is provided which is electrically connected to the lead 92 below the terminal 130 by means of an electrical lead 143, the aforementioned limit switch 136a being interposed in the lead 143. The limit switch 136a is normally open and is operatively connected to the aforementioned companion limit switch 136b which is normally closed. The limit switch 136a is positioned adjacent the righthand extremity of a tube in the roll discharge station 43a (as viewed in FIG. 10) in such a way that a pusher arm, such as 54 or 55, upon exhausting a cut in such tube into the part pull-off station 43a, is able to engage such limit switch 136a and hence to close same, it being normally open.

The solenoids 132, 133, 134 and 135 are respectively connected on the lefthand side thereof, as viewed in FIG. 10, to the lead 91 via leads 144, 145, 146 and 147. The relays 139, 140 and 141 on the other hand are electrically connected on the lefthand side thereof, as viewed in such figure, by the leads 148, 149 and 150, respectively.

The means for electrically connecting said solenoids on the righthand side thereof to the aforementioned terminal bar and other parts of the circuit will now be described: The solenoid 132 is electrically connected to the terminal bar 142 by means of a lead 151 extending to a terminal 152, the latter in turn being electrically connected to such terminal bar 142 by means of parallel leads 153 and 154. The aforementioned limit switches 137b and 138 are interposed in the lead 154, their relative positions being shown in the drawings and described more fully hereinafter.

The solenoid 133 is electrically connected on the righthand side thereof to a terminal 155, which is located intermediate the switches 137b and 138, by means of a lead 156 to a terminal 157, the latter in turn being electrically connected to the terminal 155 by means of a lead 158.

The solenoid 134 is on the righthand side thereof, as viewed in FIG. 10, electrically connected to the aforementioned terminal 157 by means of a lead 159 to a terminal 160 and thence to the aforementioned terminal 157 via a lead 161. The terminal 160 in turn is electrically connected to the main lead 92 via a lead 162.

The solenoid 135 for the pusher arm hydraulic motor 63 in turn is electrically connected on the righthand side thereof to the terminal bar 142 by means of a lead 163 extending to a terminal 164 and thence via a lead 165 to a terminal 166 where the circuit is subdivided into two parallel leads 167 and 168, each of the latter interconnecting the terminal 166 with the terminal bar 142.

The relay contacts 116c are interposed in the lead 165, such contacts being normally open, and the relay contacts 116d are interposed in the lead 169, such contacts being normally closed. The relay contacts 116c and 116d are, as aforementioned, under the influence of the relay 116.

For a purpose which will appear more fully hereinafter, the solenoid 135 can also be electrically connected to the terminal 114 via a portion 122a of the lead 122, this being accomplished via a lead 169 interconnecting the aforementioned terminal 164 to a terminal 170 and thence to the terminal 114 via the lead portion 122a.

There will now be described the interconnection of the relays 139, 140 and 141 into the circuit. The relay 139 is electrically connected to the terminal bar 142 via a lead 171 on the righthand side thereof (FIG. 10) and in which lead is interposed the aforementioned limit switch 137a.

The relay 140 is connected to the terminal bar 142 on the righthand side thereof via a lead 172 extending to a terminal 173, there being two parallel leads 174 and 175 interconnecting the terminal 173 to the terminal bar 142.

The relay 141 in turn is electrically connected in the circuit on the righthand side thereof (FIG. 10) via a lead 176 which interconnects same to the above-described terminal 157.

The relay contacts and their locations in the circuit for the aforementioned respective relay coils will now be described, that is, the contacts operatively connected to the relay coils 139, 140 and 141. The relay coil 139 is operatively connected to and controls the following contacts:

(a) Contacts 139a (normally open) interposed in the lead 153;

(b) Contacts 139b (normally open) interposed in the lead 175;

(c) Contacts 139c (normally open) interposed in the lead 167.

The relay coil 140 controls four sets of relay contacts as follows:

(a) Contacts 140a (normally open) interposed in the lead 174;

(b) Contacts 140b (normally closed) interposed in the lead 154 intermediate the terminal 155 and the limit switch 138;

(c) Contacts 140c (normally closed) located in the lead 168; and (d) Contacts 140d (normally open) interposed in the lead 158.

In turn the relay coil 141 controls two sets of relay contacts as follows:

(a) Contacts 141a (normally open) interposed in the lead 162; and (b) Contacts 141b (normally open) interposed in the lead to be described hereinafter.

The operation of the reel control section can be well understood by considering the sequence of events which occurs when a pusher arm, such as 55, reaches its endmost position where all of the rolls in the roll discharge station have been discharged and also a new cut or load has been inserted in the reel or tube at the cut loading station 40. Under these circumstances it is, of course, desired for the reel mechanism to be angularly shifted to 90° and for the cut compress power cylinder to be actuated to compress the new load in the cut compress station, there being, of course, moved to the roll discharge station 43 a previously compressed cut or load which thereupon should have exerted upon it the pressure of a pusher arm thereby to urge the rolls toward the part pull-off discharge station 43a.

In order for the reel to be shifted angularly 90° it is, of course, necessary for all pusher arms to have moved out of their respective slots in the tube in the roll discharge station 43 and accordingly when, as shown in FIG. 10, the pusher arm 55 moves out of the tube to the right-hand extremity thereof, as viewed in this figure, it is capable of actuating the limit switch 136 and to close the limit switch 136a and simultaneously to open the related and interconnected limit switch 136b (the action of the latter to be described hereinafter). It is assumed that a new load or cut has already been inserted in the tube at the cut loading station 40 and that as a result thereof the limit switch 138 (normally open) is now closed.

The condition of the limit switch 137 under these circumstances is of significance because this switch operates under the influence of the reel driving arm 45 (such reel driving arm also being known as one of the Geneva gears). However, when the reel driving arm 45 is at "index," that is, when it is at one of its selected positions at rest, the limit switch 137a is open and alternatively when such reel driving arm 45 is out of "index" the switch 137a is closed.

The converse of this situation occurs with respect to the interconnected limit switch 137b, that is, when the reel driving arm 45 is at "index" this switch is closed and when such arm is out of "index" the switch is open.

The effect of these relationships of the switches will be apparent from the following description:

As aforementioned, the pusher arm hydraulic motor 63 is effective to operate when the solenoid 135 is deenergized. Alternatively, when the solenoid 135 for such hydraulic motor 63 is energized, the pusher arms 54 and 55 of necessity become stationary. Hence when a pusher arm, such as 55, has pushed all of the rolls out of the tube in the station 43, it is desirable for the solenoid 135 to be energized thereby to stop the hydraulic motor 63 and at least temporarily to stop the motion of the sprocket chain 60 and the pusher arms 54 and 55. This occurs by virtue of the following:

The pusher arm 55 actuates the normally open switch 136a to close same, electrical energy flowing thence from the lead 92 via the terminal bar 142 and the normally closed contacts 140c and the closed contacts 116c and terminal 164 to the solenoid 135 thereby to energize same and to stop the hydraulic motor 63 thereby to arrest the motion of the pusher arms.

As a result of the movement of the pusher arm 55 out of the tube in the station 42, the reel 38 is in condition to be angularly shifted through 90° thereby to move the new load into the cut compress station and to move the previously compressed load into such station 42 for piece-by-piece discharge. Hence it is now desired for the reel motor 48 to come into operation thereby to actuate the Geneva mechanism 43 to accomplish the aforementioned angular shift of 90° of the reel 38. This is accomplished as follows:

A circuit is completed via the limit switch 136a, the terminal bar 142, the lead 154, terminal 152 and lead 151 to the solenoid 132, thereby to energize such solenoid and to put into operation immediately the reel motor 48. This occurs by virtue of the fact that the normally open limit switch 137b is at this time closed because the reel driving arm at this moment is at "index" and also by virtue of the fact that the new load in the station 40 has closed the limit switch 138. It is, of course, understood that the contacts 140b normally being closed are at this time closed since the relay 140 is not yet energized. Hence as a result of this the reel driving arm 45 is angularly shifted by the reel motor 48 and moves out of its index position in order to shift the reel by 90° with the following effects:

The limit switch 137b is allowed to assume its normally open condition by virtue of the movement of the reel driving arm out of its index position. However, there had been theretofore energized the relay 139 by virtue of the circuit via the limit switch 136a and via the lead 171, the limit switch 137a closing as a result of the movement of the reel driving arm out of "index." The energization of the relay 139 closes the contacts 139a thereby closing a holding circuit for the solenoid 132 via the leads 151 and 153. Consequently the reel motor continues to operate until the reel driving arm 45 moves again into its index position. The energization of the relay 139, in addition to closing the normally open contacts 139a, also closes the normally open contacts 139b, thereby completing a circuit to the relay 140 via leads 172 and 175, the relay 140 in turn actuating its own holding circuit via the normally open contacts 140a, the latter being closed as a result of energizing the relay 140. Also, the other contacts operatively connected to the relay 140 are actuated at this time. That is, the relay contacts 140b (normally closed) are opened and the relay contacts 140c (normally closed) are also opened which ordinarily would deenergize the solenoid 135. However, the supplanting circuit is now energized via the now closed relay contacts 139c via leads 167 and 165 thereby to maintain energized the solenoid 135 so that the pusher arm hydraulic motor 63 remains stationary for the time being.

At this point the reel motor 48 is continuing in operation and so continues until the reel driving arm 45 again moves into the index position at which time the limit switch 137 is reactuated and the portion thereof 137a is opened by virtue of such arm moving into index, and the switch 137b is closed due to moving into index.

The reindexing of the driving arm 45 has the following effects:

The relay 139 is deenergized by virtue of the opening of the limit switch 137a and this in turn opens the contacts 139a which promptly deenergizes the solenoid 132 of the reel motor 48 arresting the reel motor, it being understood that an alternative circuit to the terminal bar 142 via the lead 154 cannot at this time be made by virtue of the open switch 138.

The solenoid 135 for the pusher arm hydraulic motor has heretofore been temporarily energized thereby to stop such motor 63 by virtue of the completion of the circuit to the solenoid 135 via the relay contacts 139c which, so long as the relay 139 is energized, remain closed (contacts 139c being normally open). Hence, when the reindexing of the reel driving arm occurs and the limit switch 137a is open, the relay contacts 139c are promptly open thereby to deenergize the circuit to the solenoid 135 and to energize the pusher arm hydraulic motor 63 thereby to move the pusher arms 54 and 55 via their sprocket chain and hence to move the pusher arms, such as 55, out of engagement with the principal limit switch 136. This brings the switch 136a to its normally open condition thereby deenergizing the terminal bar 142 and hence deenergizing the entire reel section.

The cut compress power cylinder 56, however, operates when the aforementioned reindexing of the reel driving arm occurs by virtue of the fact that the limit switch 137b is closed, the pusher arm 55 having not as yet departed from the limit switch 136a, it temporarily thus being closed and hence a circuit is completed via the limit switch 136a and limit switch 137b to the relay 141 via the now closed contacts 140d. This in turn closes the normally open contacts 141a in the lead 162 and hence energizes the solenoid 134 of the cut compress power cylinder 56 which is thus brought into operation to urge the compression plate 58 against the new cut or load which has been shifted into the cut compress station 41 (FIG. 1), the cut or load thus being urged against the anvil 59. The operation of the power cylinder 56 persists until a preselected pressure is generated therein which actuates a pressure sensitive switch 177 which is interposed in the above-mentioned lead 162. Consequently the energization of the solenoid 134 will be interrupted thereby to cease the operation of the cut compress power cylinder and to return it to its initial withdrawn condition.

Reverting to the aforementioned reindexing of the reel driving arm, the limit switch 137b, as aforementioned, is closed when such reindexing takes place, relay 140 being still energized before the pusher arm 55 departs from the limit switch 136, the relay 141 is energized by the circuits above described and the solenoid 133 is energized thereby to reset the reel drive arm to its index position, this being necessary because the motor has a motivation of only 190°.

Note that the solenoid 134 of the cut compress power cylinder remains energized by way of the relay contacts 141a which also acts as a holding circuit for the relay 141 until pressure within the power cylinder 56 builds up to actuate the pressure switch 177 which, when temporarily opened, will thereby open such holding circuit and deenergize the relay 141 thereby to deenergize the solenoid 134.

There will now be described the roll pull-off or jaw control section 178 which is designed for the purpose of controlling the sequence of operations of the front and rear jaws 66 and 65, the swing cylinder 73 and the part compress power cylinder 81, together with the gate power cylinder 77.

As the pusher arm, such as 55, departs from or moves away from the limit switch 136b (normally closed), the latter assumes its normally closed condition and a timer motor 179 is actuated or energized by way of a timer switch 180 (normally open and operatively connected to timer relay 190), said timer 179 and timer switch 180 being interposed in a lead 181 which, at the righthand extremity at 182, is connected to the lead 92 and at the lefthand extremity is connected to a terminal 183 which via lead 184 is connected to the lead 91. It is understood, of course, that the aforementioned limit switch 136b is also interposed in the lead 181.

A lead 185 interconnects the terminal 183 to the lead 92 at a terminal 186, the lead 185 thus being parallel to the lead 181 aforementioned.

Interposed between the limit switch 136b and the timer switch 180 is a terminal 187 which via lead 188 is connected to another terminal 189 interposed in the aforementioned lead 185.

Interposed in the lead 185 is a timer relay coil 190 and the aforementioned normally open contacts 141b which are under the influence of the relay 141.

Also interposed in the lead 185 is a limit switch 191 which is actuatable by an individual roll grasped by the front jaws 66, the limit switch 191 being positioned in a manner well shown in FIG. 9.

The rear jaws 65 and the power cylnder 68 therefor are under the influence of a pair of solenoids 192 and 193 which in turn control a rear jaw valve control device 65c (FIG. 10). The front jaws 66 and the power cylinder 70 therefor are under the influence of solenoids 194 and 195 via a front jaw valve control 66c.

In turn the so-called "swing cylinder" 73 is under the influence of solenoids 196 and 197 via valve control 73a (FIG. 10).

The aforementioned solenoids 192–197, inclusive, are controlled as to the sequence of their operation by any suitable means and, in the form shown, by means of certain cam controlled timer switches thereby to insure that the jaws are opened at selected times to receive the next consecutive roll whereupon the jaws are clamped and the swing cylinder is actuated to pull off the endmost roll and to separate it from the rest whereupon the power cylinder 70 is actuated to release the roll to permit it to fall into a chute where it can move to a so-called "part compress station" and undergo further compression under the influence of the cylinder 81, after which a gate at the bottom of the chute 74 is opened and the roll is directed to or permitted to fall upon the conveyor 82 whereupon it is discharged from the roll separator unit 30.

The manner of electrically interconnecting the aforementioned solenoids 192–197, inclusive, and the timer switches for governing same will now be described as follows:

The solenoids 192–197, inclusive, are respectively interposed in electrical leads 198–203, inclusive, which respectively are electrically interconnected on the lefthand extremities of each thereof with the lead 91 and on the righthand extremities thereof with a terminal bar 204, the latter in turn being electrically connected to the aforementioned terminal 189 and thence to the terminal 187 via the lead 188, this being accomplished by means of a lead 205 in which is interposed a timer switch 206, the latter being under the influence of the aforementioned timer relay coil 190. The timer switch 206 is normally open.

Also interposed in the leads 198–203, inclusive, are the following timer switches: 207a, 207b, 208a, 208b, 209a and 209b. The timer switches are subdivided into pairs which are mechanically interconnected in the manner schematically shown in FIG. 10, the switches 207a and 207b thus being mechanically interconnected and respectively normally opened and normally closed. The timer switches 208a and 208b are analogously mechanically interconnected and analogously respectively normally opened and normally closed. Also the pair of switches 209a and 209b are mechanically electrically interconnected and also respectively normally opened and normally closed.

The timer switches 207a and 207b are collectively designated switches 207 and analogously the remaining two pairs of switches are designated respectively collectively switches 208 and 209.

The pairs of switches 207, 208 and 209, together with switches 180 and 206, are respectively under the influence of rotatable cams 210, 211, 212, 212a and 212b which in turn are rotatable by the aforementioned timer motor 179, such cams 210–212, 212a and 212b being adjustable to accomplish a preselected sequence of operations as will be set forth below.

When the first roll of a cut has reached the position shown in FIG. 9 and actuates the limit switch 191, the timer relay 190 is energized by way of lead 185 to terminal 189 via lead 188 to terminal 187 thence to terminal 182 via limit switch 136b, which at the time is closed, being actuated by pusher arm 54 or 55 moving away from switch 136b prior to urging the cut toward switch 191. The energization of such timer relay 190 is effected to close the normally open timer switch 206, and also to close the normally open timer switch 180 thereby bringing into operation the timer motor 179 as will now appear.

Relay coil 190 includes a movable contact arm (not shown) which is operatively connected to a latching device (not shown) for cam 212a. The latter cam 212a, subject to such latching device, operates switch 180. Thus the relay coil 190, in response to a cut or roll part actuating switch 191, simultaneously releases such latching device and actuates the timer switch 180 to energize timer motor 179. The latter by its rotation causes a depression in cam 212a to move away from such latching device allowing the greater portion of the periphery of cam 212a to actuate or hold closed the switch 180 until such cam depression has moved 360° and again engages such latching device. This opens the timer switch 180 and deenergizes timer motor 179 until another roll or part actuates again the switch 191 thus to repeat the cycle.

All of the remaining cams (210, 211, 212 and 212b) are actuated in selected sequence during the actuation of timer motor 179 as set forth above.

The closing of the timer switch 206 completes the electric circuit to the main terminal bar 204.

Such cams are adjusted in such a manner that the sequence of operations will be as follows:

(a) the switches 207a and 208a are closed thereby energizing solenoids 192 and 194, respectively, thereby to set or close the rear and front jaws against the respective individual rolls therein, it being understood that such jaws were theretofore open and that one of the pusher arms 54 or 55 had urged such two rolls into the rear and front jaws.

(b) The switch 209a is then closed actuating the solenoid 196 which via the element 73a actuates the swing cylinder 73 causing the front jaws angularly to shift or to swing thereby to separate the outermost roll from the rest of the cut. Closing switch 209a causes the other switch 209b of this pair to open, thus deenergizing solenoid 197, which insures that the outermost or swing clamp remains stable while the new part is being urged between the jaws. As solenoid 197 is deenergized, the solenoid 196 is energized to actuate the swing cylinder via element 73a as indicated in (d) below.

(c) The timer switch 208b thereupon is closed and hence 208a opened thereby to energize the solenoid 195 of the front jaw valve control 66c thereby to open the front jaws and to release the roll held thereby permitting it to drop into the chute 74 and to roll down to the part compress station 75 opposite the part compress plate 79 actuated by the power cylinder 81.

(d) The timer switch 209b thereafter is closed, and hence switch 209a is open, thereby to energize the solenoid 197 and via the swing cylinder valve control 73a to swing the front jaws back again into their position for receiving a new roll.

(e) Thereafter the timer switch 207b is closed, and 207a opened, to energize the solenoid 193 thereby to open the rear jaws 65 to allow the cut to move forward to reactuate the limit switch 191 thereby to repeat the aforementioned roll pull-off sequence.

If for some reason the clamping jaws (66a, 66b) fail to remove a roll from the end of a cut during a complete cycle, and cam 212a returns to its norm or indexed position while switch 191 is still closed when such clamping jaws (66a, 66b) swing back to a closed or roll gripping position (or the jaws 66a, 66b temporarily have inadequate grasping power) the cycle will be repeated until the roll or part is pulled off.

The aforementioned part compress power cylinder 81 is controlled by a valve control means schematically shown at 213 which in turn is under the influence of a solenoid 214 (FIG. 10), the valve control 213 also being under the influence of a pressure switch 215 which is subdivided into two parts 215a and 215b, the location of which will be set forth hereinafter.

The power cylinder 77 for controlling the gate 76 is in turn under the influence of a gate valve control device 216 and a pair of solenoids 217 and 218.

Influencing the operation of the solenoids 214, 217 and 218 are relay coils 219 and 220 and their respective relay contacts which will be described herebelow.

The relay 219 is electrically connected across the leads 91 and 92 by means of an electrical lead 221 in which are interposed a terminal bar 222 and normally open relay contacts 219a under the influence of the relay coil 219, the relay contacts 219a being in turn positioned intermediate the terminal bar 222 and the lead 92.

Also interposed in the lead 221 intermediate the relay coil 219 and the terminal bar 222 are relay contacts 220a which are under the influence of the relay coil 220.

The solenoid 214 is connected in parallel with the relay 219 via a lead 223 interconnecting a terminal 224 in the lead 221 with the lead 91.

A limit switch 225, which is actuatable by an individual roll in the part compress station 75, is connected in parallel with the relay contacts 219a by means of a lead 226 in which it is interposed and which interconnects the terminal bar 222 with the lead 92 via a terminal 226a. The limit switch 225 is normally open.

The relay 220 is electrically connected across the leads 91, 92 via a lead 227 in which are interposed relay contacts 220b (normally open) which are operated by the relay coil 220. The lead 227 via a lead 222a is connected to the terminal 226a.

The solenoids 217 and 218 are respectively connected across the aforementioned leads 91 and 92 by means of leads 228 and 228a, respectively, there being interposed in the former the aforementioned pressure-actuated switch 215a (normally open) and in the latter the pressure-actuated switch 215b (normally closed). Also interposed in the lead 228a are the contacts 220c (normally closed) under the influence of the relay 220.

In the operation of the part compress power cylinder and the gate power cylinder, the following sequence of events occurs:

The detached individual part or roll, when it rolls to the bottom of the chute 74, actuates the limit switch 225 which is normally open, thereby to close same, which energizes the relay 219 by way of the terminal bar 222 and the normally closed relay contacts 220a. This also energizes the solenoid 214 via the terminal 224 and the lead 223, thus actuating the part compress power cylinder 81 via the valve control 213. The power cylinder 81 operates until a pre-selected pressure has been reached therein thereby to actuate the pressure sensitive valve 215 and to close the normally open portion 215a and to open the normally closed portion 215b.

The closing of the switch 215a results in the energizing of the relay 220 via an interconnecting lead 225a between the leads 227 and 228 and also results in the energizing of the solenoid 217. This causes the return of the part compress power cylinder by virtue of the opening of the normally closed contacts 220a, and also results in the opening of the retaining gate 76 by virtue of the energizing of the solenoid 217 thereby letting the individual roll or part escape. Such circuit remains energized so long as the roll or part holds the switch 225 in a closed condition, this occurring by reason of the relay contacts 220b.

After the roll or part has departed from the limit switch 225, thereby causing same to assume its normally open condition, and the preselected pressure has been reached in the valve control means 213, thereby closing the switch 215b, the solenoid 218 is energized thereby returning the gate 76 to its closed position.

The above-described cycle of operation will repeat until one of the pusher arms 54 or 55 again actuates the limit switch 136.

*Wrapping and taping device*

The wrapping and taping device now will be described. The operation and construction of such wrapping and taping device will be described generally with reference to FIGS. 1a, 1b, 2, 11 and 11a, and thereafter will be described in detail in connection with the wiring diagram of FIG. 12.

The individual rolls are inspected at the inspection station 84, sorted and grouped for packaging according to size and placed in front of an air-operated power cylinder 229 having a pusher plate 230 (primary ram means). The wrapping and taping device is generally designated 231 (FIG. 1a).

The pusher plate 230 is secured in a conventional way to a piston 232 of the air cylinder 229.

The wrapping and taping device 231 is designed for the purpose of wrapping around the package group 85 a preliminary wrapping of sheet material, such as kraft paper.

The package group 85 at inspection station 84 can be disposed in the manner shown in FIG. 1a, or alternatively in the manner shown in FIG. 2.

Referring now to FIGS. 1a, 2, 11 and 11a, the wrapping and taping device 231 is electrically energized by directing electrical energy to the system, as shown in FIG. 12, whereby a red pilot light 233 is caused to light up, the effect of the energization of such system (FIG. 12) to be described more fully hereinafter.

Thereafter a so-called air charging switch 234 is momentarily depressed and the wrapping and taping device 231 is prepared for operation.

Such momentary depressing of the air-charging switch 234 actuates an air pump to provide air under line pressure to actuate the pneumatically operable devices also as will appear more fully hereinafter.

The aforementioned package group 85, as shown in FIGS. 1a and 2, is positioned in a package group collection station 235 which is situated in front of means for establishing a vertical curtain of paper against which the package group 85 is thrust by means of the pusher plate 230 thereby to wrap the curtain around the package group 85 as will appear more fully hereinafter.

The means for establishing or holding the vertical paper curtain are well shown in FIGS. 11 and 11a and constitute a vertical curtain guide 235 which is threaded from above via a horizontal roller 236 from a main paper supply roll 237 mounted upon supports 238. The vertical curtain guide 235 is situated directly above a vertically reciprocable rack 239 having a pair of paper curtain grasping fingers 240, one of which is shown in FIGS. 11, 11a, the fingers 240 being actuatable by means power cylinders 241, one for each of the fingers 240.

The rack 239 is vertically reciprocable under the influence of a rack power cylinder 242 which is connected to the rack by means of a piston 243 in a conventional manner.

The rack 239 is caused to rise vertically, as viewed in FIGS. 11 and 11a, until the open fingers 240 shown at position 240a in FIG. 11a are capable of grasping a lowermost extremity 244 of the paper web 245 whereupon the power cylinder 242 is actuated to lower the rack 239 to the position shown in FIG. 11 thereby to pull down the extremity of the vertical paper curtain into position wherein the package group 85 can be thrust against same thereby to wrap the curtain of paper thereabout in the manner also shown in FIG. 11.

As aforementioned, preferably two of the fingers 240 are provided, one near each side margin of the vertical paper curtain thereby to provide a substantial grip thereupon.

When the vertical paper curtain is established, as shown in FIG. 11, the package group 85 is thrust thereagainst by means of the pusher plate 230, the fingers 240 holding the lower extremity of the curtain tightly thereby to cause the curtain to wrap around the package group 85 as shown in such FIG. 11 preparatory to severing the upper part of the curtain to preliminarily form the wrapping.

It is, of course, understood that the paper web 245 is preferably of kraft, although it can be of any suitable sheet material.

After the actuation of the power cylinder 229 and the movement of the package group 85 to the position shown in FIG. 11, it is, of course, understood that sufficient sheet material or paper is fed from the roll 237 to accommodate the package group 85 as shown in such FIG. 11 whereupon the paper is severed at location 246 by any suitable means, for example, by means of a reciprocating knife mechanism generally indicated at 247, the latter including a knife 248 pivoted upon a bell crank 249, the latter being mounted for angular movement about a pivot 250 under the influence of a power cylinder 251.

When the power cylinder 251 is actuated, the apparatus is in condition for the raising of the paper rack 239, one stage of such movement being shown in FIG. 11a. Prior to the raising of the paper rack 239, the fingers 240 are released and foldover plates 252 and 253 come into operation for the purpose of folding the ends of the paper curtain over one another as shown in FIG. 11, that is, the curtain end 254 is folded downwardly against the package group 85 and thereover is folded the curtain end 255 by means of the foldover plates 252 and 253, respectively.

Suitable guides are provided at opposite extremities of the foldover plates 252, 253 for controlling the movement thereof in response to the vertical reciprocation of the piston 243 of the power cylinder 242.

The paper rack 239 is connected to a carriage device 256, as shown in FIGS. 11, 11a, the carriage 256 being vertically reciprocable along with the rack 239. Hence a raising of such rack 239 by means of the cylinder 242 via the piston 243 will cause the carriage 256 to rise to the position shown in FIG. 11a and this rising motion is communicated to a rocker arm 256a, the angular motion of which in turn is communicated to the uppermost of the foldover arms 252 by means of the substantially vertical interconnecting arms 257 and 258 respectively interconnecting the carriage 256 with the forward end of the rocker arm 256a, and the rear end of such rocker arm to the foldover plate 252.

The latter foldover plate is controlled in its vertical movement by means of a slot 259 which acts as a guide for rollers 260 secured to opposite extremities of the foldover plate 252. The attitude of the slot 259 is well shown in FIG. 11, there being an upper portion which is substantially straight and which is angularly disposed relative to a lower portion, the latter being vertical.

The function of the slot 259 is to insure that the upper foldover plate 252 performs the function of urging the package group 85 with gradually increasing pressure against a rearmost limit-stop 261 comprising a portion of a dolly 262 which is movably mounted and adapted for transferring the package group out of the wrapping station of FIGS. 11 and 11a.

The dolly 262, as is well shown in FIGS. 11 and 11a, is mounted for movement upon rails 263 and 264 by means of wheels 265 and 266, respectively, the wheels being mounted upon the lower surface of the dolly 262.

Reverting to the foldover plates 252 and 253, suitable guide slots, one adjacent each extremity thereof, are provided for the lowermost of the foldover plates 253, a portion of one of such slots being shown in FIG. 11 at 267. The latter slot is formed in such an attitude that the upper extremity of the foldover plate 253 is preferably slightly to the left of the lower extremity of the foldover plate 252, as viewed in the FIGS. 11 and 11a, this being for the purpose of achieving the relative attitude of the curtain extremities 254 and 255, as shown in said FIG. 11a. It is, of course, understood that suitable guide rollers secured to opposite extremities of the foldover plate 253 engage the opposite guide slots 267 in a manner analogous to the guide rollers for the uppermost foldover plate 252.

Preferably the rocker arm 256a has connected thereto a resilient means for urging the righthand extremity downwardly, this, in the form shown, comprising a spring 268. The spring performs the function, at least partially, of a counterbalance means for assisting the vertically reciprocable paper rack 239.

It will be observed regarding the vertical arm 257 that, in order to provide means which will enable the rack 239 to move to the position 240a (FIG. 11a), a fixed collar 257a is secured to the arm 257 above which is mounted a coil spring 257b embracing the arm 257 and supporting a washer 257c, the latter being positioned for engaging the lowermost extremity of the rocker arm 256a as shown in FIG. 11a in response to the vertical movement of the rack 239 (and the piston 243), such vertical movement being to the uppermost limit thereof. The coil spring 257b permits the rack to rise responsive to an upward thrust of the arm 257 and accommodates such upward thrust to the degree shown in FIG. 11a and at the same time causes a proper angular shifting of the rocker arm to accomplish the downward thrust of the uppermost foldover arm 252 as shown in said figures.

The rack 239 vertically moves the lowermost of the foldover plates 253 via upper and lower limit-stops 269 and 270 which are secured to the rack 239, there being interposed therebetween a lug 271. Thus the vertical motion or vertical movement of the rack 239 is not transmitted to the lowermost foldover plate 253, as viewed in FIG. 11, until the lowermost limit-stop 270 engages the lug 271 and conversely the downward motion of the rack 239 similarly is not transmitted to the foldover plate until the uppermost of the limit-stops 269 also engages the lug 271.

The function of the separated limit-stops 269 and 271 between which move the lug 271 is to insure adequate vertical movement of the rack 239 so that it may move to the position 240a (FIG. 11a) thereby to engage the lowermost extremity 244 of the paper web 245. A further function is to insure that the uppermost foldover plate 252 moves the paper extremity 254 (FIG. 11a) inside of the margin or extremity 255.

It is, of course, understood that the various parts of the wrapping and taping device herein described move in timed relationship to one another, for example, by means which will be described more fully hereinafter.

After the package group 85 has been partially wrapped, as shown in FIG. 11a, the dolly 262 is caused to move to the left, as viewed in FIG. 2, thereby to move the package group along a second path which is thereby moving the partly wrapped package group past a first tape applicator 272 (FIG. 2) which applies a selected length of adhesive tape or gummed tape along the overlapping margins 254, 255, the latter comprising the upper and lower extremities of the paper curtain.

The dolly 262 moves the now partially wrapped package group 85, having the tape over the margins 254, 255, to an intermediate station 273 (FIG. 2) in front of secondary ram means 274 which includes a pusher or ram plate 275 having pivoted to opposite extremities thereof flap folders 276 and 277 for a purpose to appear hereinafter.

The secondary ram means 274 includes not only the aforementioned pusher blade 275 but a fluid or air-actuated power cylinder 278 which is connected to the pusher plate 275 via a piston 279.

The dolly 262 is moved from the package wrapping station of FIGS. 11 and 11a (designated 235a (FIG. 2)) to the aforementioned intermediate station 273 by means of a dolly conveyor 280, which can be in any suitable form, for example, in the form of an endless sprocket chain having means for engaging in suitable timed relation the dolly 262 and urging same to the aforementioned station 273.

It will be understood that the now partially wrapped package group 85 when moved from station 235a (FIG. 2) to station 273, has the ends thereof open, that is, the opposite ends of the wrapping formed by the side margins of the curtain at this time are open. The secondary ram means 274 coacts with wrapping folding means 281 (FIG. 2a) for closing such open ends of the package and preparing same for the application of additional strips of tape over the closed ends thereby to complete the preliminary wrapping of the package group of tape rolls.

Thus in suitable timed relation by means to appear more fully hereinafter the secondary ram means 274 are actuated responsive to a package group reaching the intermediate station 273 and the flap folder arms 276 and 277, which are pivotally mounted to opposite extremities of the pusher plate 275, are effective to preliminarily close the end flaps along the opposite sides of the partially wrapped package group and to urge the same into a package pickup station 282 (FIG. 2a) where a package conveyor 283 engages the package and urges same past the second tape applicator 284 and the third tape applicator 285 (FIG. 2a).

It will be understood, of course, that the secondary ram means thus urges the package group and its preliminary wrapping along a third path 286 which is substantially perpendicular to the aforementioned second path.

The aforementioned wrapping folding means 281 (FIG. 2a) are effective to form on each end of the package closed end and side flaps preparatory to the application thereover respectively of the aforementioned additional preselected lengths of tape thereby to complete the initial wrapping of the package, it being understood that the fold flaps 276 and 277 cooperate with the wrapping folding means for this purpose.

Such preliminarily wrapped package of tape rolls now held closed by the tape on three sides thereof is thereafter received at a package receiving station 286 (FIG. 2a) of the box machine 287, the latter to be described more fully hereinafter.

Reverting again to FIGS. 2 and 2a, the operation of the wrapping and taping device will now be described without reference ot the detailed wiring diagram of FIG. 12;

The tape applicators 272, 284 and 285 are provided with so-called vacuum drums 287, 288 and 289, respectively, which have rubber applied to the periphery thereof to give suitable traction to the tape which is moved thereby, the ungummed sides of the tape engaging the periphery of such vacuum drums. The vacuum drums having the sheet rubber applied to the periphery thereof also are provided with a number of perforations or holes in the periphery and vacuum is applied interiorly of the drums so that the latter are capable of sucking or holding the preselected lengths of tape thereagainst thereby to insure that they are applied to the sides of the kraft paper wrapping for the package group 85 as the wrapping moves therepast as aforementioned.

Accordingly, prior to the actuation and operation of the wrapping and taping device 231, suitable vacuum pumps (not shown) or vacuum blowers should be set in operation, such pumps or blowers being connected to the vacuum drums 287, 288 and 289 for the purpose of applying vacuum thereto for the purpose aforementioned.

Furthermore, each of the tape applicators 272, 284 and 285 are provided with wetting rolls 290, 291 and 292, respectively, which are pivotally mounted for angular movement respectively about pivots 293, 294 and 295 under the influence respectively of small air-actuated power cylinders 296, 297 and 298.

Suitable means (not shown) are provided for feeding water at a suitable flow rate to the wetting rolls 290, 291 and 292 and prior to the setting in operation of the wrapping and taping device 231 such water feeding means also must be set in operation.

Preferably the wetting rolls 290, 291 and 292 are of hollow construction having sponge-like coatings comprising the peripheries thereof adapted for transferring water or any suitable wetting substance from the hollow interior thereof to the outside surface thereby to wet the gummed side of the tape which is to be applied to the package, it being understood, of course, that the adhesive applied to one side of the tape is actuated by the wetting thereof.

Furthermore, said tape applicators 272, 284 and 285 are respectively provided with tape rolls 299, 300 and 301, the tape webs from which are respectively led past suitable means for measuring and cutting preselected lengths thereof and leading same past the respective wetting rolls and thence into contact with the periphery of their respective vacuum drums by which they are applied to the sides of the wrapping.

The means for feeding out the tape and shearing same in preselected lengths is shown both in FIGS. 2 and 2a in connection with the tape applicators aforementioned. Tape applicator 272 includes a carriage 302 which is shiftable in a direction radially of the vacuum drum 287 under the influence of a small air-actuated power cylinder 303 which is connected thereto by a suitable piston. Mounted upon the carriage 302 are the rolls 304, 305 and 306 which may be caused to rotate by means of the power cylinder 303 urging the innermost roll 304 against the periphery of the rotating vacuum drum 287. The rotation of the latter drum is transmitted to the three rolls 304, 305 and 306, they being in peripheral contact, and the tape from tape roll 299 passing between the two rolls 305 and 306 thereby to pay same out toward a tape guide 307 which leads same past the wetting roll 290 and thence to the periphery of the vacuum drum 287.

So long as the rack 302 and the innermost of the rolls 304 is out of engagement with the periphery of the vacuum drum 287, it will be seen that there is no force to pay out the tape from the roll 299, but if under the influence of the power cylinder 303 the carriage 302 is urged upwardly as viewed in FIG. 2, the three rolls 304, 305 and 306 are caused to rotate and to pay out the tape over the guide 307.

Such urging of the carriage 302 upwardly, as viewed in FIG. 2, and hence such urging of the roll 304 into peripheral engagement with the drum 287 causes the tape to be paid out in a length which is determined by the length of time which the vacuum drum engages the roll 304. When the air-actuated power cylinder 303 is retracted, there comes into operation a tape shearing device 308 which automatically severs the tape in the preselected length adequate for application to the side of the wrapping of the tape roll package group. For example, with respect to the first tape applicator 272 the power cylinder 303 is urged upward (FIG. 2) a length of time to provide a tape adequate to cover the overlapping margins 254, 255 (FIG. 11a) of the wrapping 245a of the package group 85. Thereupon the retraction of the carriage 302 will bring into operation the shearing device 308 whereby the tape is severed and the preselected length of tape is formed for the aforementioned purpose. It is, of course, understood that the wetting roll 290 is also actuated in timed relationship with such movement of the tape and of the carriage 302 thereby to wet the gummed surface of the tape, the wetting roll 290 being retracted also in proper timed relationship with the other parts of such tape applicator.

The second and third tape applicators 284 and 285 are constructed and operate in an analogous manner to that of the first tape applicator 272.

When the operator of the apparatus observes the glowing of the red pilot light 233 (FIGS. 1a and 12) indicating the electrical energization of the apparatus, the air-charging switch 234 (FIGS. 1a and 12) is depressed, as aforementioned, thereby causing a green pilot light 309 to glow indicating that the apparatus is prepared for further operation whereupon the operator momentarily depresses a start button 310 thereby to energize the primary ram means 229, which comprises the first of a series of operations as will appear below. Thus the package group 85 of tape rolls is thrust against the paper curtain 245 (FIGS. 11 and 11a), the latter paying out adequately to accommodate and thus wrap around the rolls urged thereagainst, the paying out being from the roll 237, the package group 85 thus having the paper wrapped around the upper and lower and rightmost sides thereof, as viewed in FIG. 11.

The aforementioned primary ram means 229 (FIG. 2) embracing the air power cylinder 229a is connected to the pusher plate 230 by means of a piston 232. Secured to the latter piston 232 are suitable cam means 311 which serve the purpose of actuating a plurality of limit switches in response to axial movement of the piston 232. Thus cam means 311 are provided for actuating the following limit switches: 312, 313, 314 and 315. The first three of such limit switches, 312–314, inclusive, are actuated in response to forward motion of the piston 232, and the latter in response to reverse motion. The cam means 311 when so actuated effects the following sequence of operations:

(1) Limit switch 313 is operatively connected to the power cylinder 251 for controlling the paper knife 248 to shear the paper curtain after the tape roll package group 85 has been thrust to the position shown in FIG. 11 and thus after the paper curtain has been caused to cover the three sides (top, bottom and right side) of such package group. The paper curtain 245 thus is in condition for shearing preparatory to foldover of the end margins 254, 255. The actuation of such limit switch 313 also energizes a suitable air cylinder 251a to operate a roll positioner shoe 251b (FIG. 12).

(2) The limit switch 314 is actuated to release the two small power cylinders 241 which control the fingers 240 which in turn hold the lower edge of the paper curtain, thereby releasing the lower edge preparatory to the folding up of the lower margin 255 into the position shown in FIG. 11a.

(3) The limit switch 312 is actuated to energize the reversing air valve for the primary ram means 229, that is, for retracting the pusher plate 230.

(4) Responsive to the reverse movement of the pusher plate 230 and its piston 232, the limit switch 315 is actuated for energizing the air power cylinder 242 (FIG. 11) thereby to move upwardly the paper rack 239 to grasp and thus in effect to retrieve (via finger 240) the sheared end of the paper curtain from the paper roll 237 and coincidentally to fold over the loose ends of the released and severed wrapping at 254 and 255 as shown in FIG. 11a by means of the foldover plates 252 and 253.

In response to the upward advance of the rack 239 (FIG. 11) under the influence of the power cylinder 242, such advance being to the upward limit of travel thereof, the limit switch 316 (FIGS. 2 and 12) is actuated causing the energization of a motor which drives the aforementioned dolly conveyor 280. The manner in which this is accomplished will be explained below in connection with FIG. 12.

The dolly conveyor 280 as energized by the motor 317, of course, moves the partially wrapped package group past the first tape applicator 272 for receiving the first preselected length of tape which covers the overlapping margins 254, 255, as shown in FIG. 11a. The actuation of the limit switch 316 is also effective to actuate the two small air power cylinders 241 (FIG. 11) to actuate the two fingers 240 to grasp or clamp onto the sheared extremity of the paper roll at 240a (FIG. 11a) preparatory to the downward movement of the paper rack 239 to the position shown in FIG. 11.

The package group 85 thus is advanced from the package wrapping station 235a (FIG. 2) by means of the dolly conveyor 280 under the influence of the driving motor 317 to the intermediate station 273, such advancement being along the second path 280a.

Secured to the dolly 262 are suitable cam means 318 (FIGS. 2 and 11a) which are positioned for actuating in a preselected order a plurality of limit switches which are well shown in FIG. 2 and comprising limit switches 319–323, inclusive, the function of which will be more fully set forth hereinafter in connection with FIG. 12. It will be noted that the switches 319–323, inclusive, are situated in the desired relative positions as shown in such FIG. 2.

The limit switches 320, 322 and 323 which are situated in that order, as shown in FIGS. 2 and 2a, when actuated, respectively energize the air cylinders 297, 296 and 298 of the second, first and third tape applicators in that order, namely, 284, 272 and 285, thereby to force the respective wetting rolls 291, 290 and 292 against their respective vacuum drums and thus applying water to the gummed side of the tape as it passes toward its tape applying region.

In suitably timed relationship with the actuation of the limit switches 320, 322 and 323 as aforementioned, there occurs the actuation of the limit switch 321 which controls the paying out or feeding of the tapes from the several rolls of the three tape applicators. That is, the actuation of the limit switch 321 simultaneously actuates all of the power cylinders 303, 324 and 325 (FIGS. 2 and 2a) of the tape applicators 272, 284 and 285 thereby respectively to urge the tape roll carriages 302, 326 and 327 toward their respective vacuum drums 287, 288 and 289 and thence in turn urging the innermost of the rollers mounted upon such carriage into engagement with such vacuum drums thereby to cause the pay-out or feeding of the respective tapes. Thus tape is applied not only to the side of the package upon the dolly 262 but also to the opposite ends of the package which is ahead of the last-mentioned package, that is, to the package which has passed through the wrapping folding means 281 (FIG. 2a) and is progressing down the third path 286.

The movement of the dolly 262 into the aforementioned intermediate station 273 actuates the limit switch 328 which is operatively connected to the aforementioned power cylinder 242 thereby to cause the paper rack 239 to move downwardly and at the same time to pull down the sheared end of the paper curtain and thus to reestablish the paper curtain 245 in the position shown in FIG. 11. Simultaneously, by virtue of actuation of the limit switch 328, the secondary ram means 274 is actuated and the power cylinder 278 via the piston 279 thrusts the package (via the plate 275) from such intermediate station 273 into the end folding and taping section 329 (FIG. 2a) of the wrapping and taping device 231.

Suitable cam means 330 (FIG. 2) are connected to the plate 275 (or to the piston 279) for the purpose of actuating limit switches 331 and 332. The former, 331, is positioned in such a manner that when the piston 279 has reached its fully extended condition, such switch is actuated thereby to cause the return of the piston to its initial retracted position.

The limit switch 332 (FIG. 2) is constructed and arranged with respect to the cam means 330 in such a way that it is actuated at the termination of the reverse travel of the piston 279 and is effective to cause the dolly 262 to be moved back to its original position in the package wrapping station 235a.

Such actuation of the limit switch 332 also has the effect of operating the package conveyor 283 via chain and sprocket means 333 and 333a (FIG. 1b) to place such conveyor 283 in what is known as its "original position" in which condition it is prepared to urge the package to the box machine 287 in the next packaging operation during which urging both ends of the package as folded over and taped by the end folding and taping section 329 (FIG. 2a).

The conveyor 283 (FIG. 2a) is placed in such original position by actuating the chain and sprocket device 333 and 333a (FIG. 1b) in such a way that a pusher pad 333b is moved to the position shown in FIG. 2a directly behind the package 85 in the package pickup station 282 (FIG. 2a). From such station 282 the package can be conveyed along the third path 286 (FIGS. 2 and 2a) past the aforementioned second and third tape applicators 284 and 285 which apply tape to the now folded ends of the package, this taking place by virtue of the actuation of the limit switches 320 and 323 by the dolly 262 while moving a prior package which has been placed thereon.

It is, of course, understood that suitable means are provided for actuating the flap folders 276 and 277 (FIG. 2) upon the pusher plate 275 in order to insure that the open ends of the package are suitably folded whereby the side flaps, both upper and lower, upon the package are simply folded and the end flaps, both front and rear, similarly are suitably folded preparatory to the move past said second and third tape applicators.

The package is delivered to the box machine 287, namely, to a station in front of a stuffer pad 334 which comprises a portion of a box loader ram 335. The operation and construction of the box machine 287 will be set forth in further detail below.

Referring now to FIG. 12, the operation of the wrapping and taping device 231 will now be described.

Assume that the package group 85 is positioned as shown in FIG. 2 and thus prepared to be thrust up against the paper curtain 245 to initiate the wrapping thereof.

The several elements of the wrapping and taping device 231 will be described in connection with the wiring diagram of the aforementioned FIG. 12, there being two main electrical leads of such diagram, namely, 336 and 337 across which many of the electrically actuated devices are connected in parallel to one another.

The electrical leads 336 and 337 receive electrical energy from a suitable source (not shown), for example 110 volts 60 cycle A.C. via a master switch 338 having terminals 339 and 340 which in turn are respectively connected to the leads 336 and 337 via interconnecting leads 341 and 342 in which respectively are interposed fuses 343 and 344. A normally closed manually actuatable stop switch 345 is interposed as shown in the lead 342.

The aforementioned red pilot light 233 is interposed in a lead 345 connected across the two basic leads 336 and 337 and thus will be energized so long as the normally closed stop switch 345 is in its closed position as shown.

For the purpose of initiating the operation of the apparatus of FIG. 12, the aforementioned air charge switch 234 is temporarily closed by, for example, finger pressure, this switch being normally open. It will be seen that such air charge switch is operatively connected with a solenoid 346, the aforementioned green pilot light 309, and the relay 347.

The solenoid 346 is connected across the leads 336 and 337 via a lead 348 which interconnects a terminal 349 with another terminal 350, the solenoid 346 being interposed in the lead 348. The terminal 350 in turn may be interconnected to the lead 337 via a lead 351, there being interposed in the latter a relay switch 352 which is normally open and which is, of course, operatively connected to the relay 347 in such a manner that it is closed when the relay 347 is energized.

Parallel to the lead 351 is a lead 353 which interconnects the terminal 350 to a terminal 354 in the lead 337, the charge switch 234 thus while the relay switch 352 is open being able to energize the solenoid 346 in response to momentary closing of such switch 234 thereby to actuate an air control valve 355 in an air conduit system 356, the latter providing air at so-called line pressure which is directed to the pneumatically actuated devices of FIGS. 13 and 14.

The aforementioned green pilot light 309 is connected across the leads 336 and 337 via a lead 357 in which are interposed a terminal 358 and one part 310a of the normally open start button switch 310, the latter also including another part 310b to which it is operatively connected and which is associated with the apparatus in a manner to appear more fully herebelow.

The aforementioned relay 347 is in turn connected into the circuit via lead 359 interconnecting terminal 360 with the terminal 358.

Thus the aforementioned momentary closing of the normally open air charge switch 234 will energize the relay 347 via the lead 359, terminal 358, lead 361 and lead 353, it being understood, of course, that the actuation of the relay 347 will close the normally open relay switch 352 thereby to provide a locking circuit for the relay 347 holding same closed so long as the stop switch 345 remains closed.

The temporary closing of the air charge switch 234 will illuminate the green light 309 thereby indicating that the apparatus is prepared for its further sequence of operations.

The aforementioned second part of the start switch 310, namely, the part 310b, is interposed in a lead 362 which in turn is connected across the leads 336, 337, there also being interposed in the lead 362 a further relay 363, a terminal 364, the aforementioned switch part 310b, a terminal 365, and a part 319a of the aforementioned limit switch 319. The limit switch 319 is divided into two parts, namely, 319a and 319b, the former being interposed in such lead 362 as aforementioned.

The switch part 319a is normally open whereas the part 319b is normally closed as will appear more fully hereinafter.

Momentarily depressing the start button 310 thus momentarily causes the closing of the switch part 310b and (assuming that the switch 319a is closed by virtue of the dolly being in its start position) a circuit is completed to a solenoid 366 which is operatively associated with a pneumatic valve 367 for the purpose of causing forward motion of the primary ram means 229, that is, causing forward motion of the piston 232 of said ram means. This is accomplished by virtue of a lead 368 interconnecting a terminal 369 with the terminal 364, the solenoid 366 being interposed in such lead 368. If the dolly 262 is not in its start position, the depressing of the start switch 310 will initiate the remaining sequence of operations of the apparatus to finish such sequences.

Thus the primary ram means 229 and its piston 232 move forward by virtue of the actuation of the air valve 367, air under line pressure entering same as schematically indicated via the conduit 370a. The forward motion of the piston 232 actuates the limit switch 313, including both of its parts, namely, 313a (normally open) and 313b (normally closed). The effect of such actuation of the limit switch 313 is to cause both the forward and reverse motion of the paper cutting knife 248 via its power cylinder 251, that is, the latter is actuated in both forward and reverse motion to cut the paper curtain at the desired location as shown in FIG. 11, namely, adjacent the horizontally reciprocable paper cutting knife 248.

The aforementioned is accomplished by virtue of the leads 371 and 372 respectively connected across the aforementioned basic leads 336 and 337 and in which are respectively interposed the limits switches 313a and 313b. Solenoids 373 and 374 are also interposed in such leads and under the influence of such limit switches, as aforementioned, the solenoids 373 and 374 being respectively operatively associated with air valves 375 for controlling the forward and reverse motion of the paper knife power cylinder 251. Connected in parallel with the solenoid 373 is a further solenoid 376 which is operatively associated with a valve control 377 which governs a roll positioner or shock absorber power cylinder 251a having a roll positioner shoe 251b as shown in FIG. 12. The solenoid 376 thus is interposed in a lead 378 which is parallel to a portion of the lead 371 containing the solenoid 373.

The forward motion of the piston 232, as aforementioned, following the actuation of the limit switch 313 immediately actuates the limit switch 314 which operates to release the small paper holding fingers 240 (FIGS. 11 and 12), the latter being under the influence of the small power cylinders 241. This is accomplished by de-energizing a solenoid 379 which is interposed in a lead 380 connected across the aforementioned basic leads 336 and 337. The solenoid 379 operates an air valve 381 to which air under line pressure is fed and via which such air is directed to the two cylinders 241 to urge the fingers 240 to a closed condition against the pressure of spring means which tend to open such fingers. Consequently when the pneumatic pressure is released via the valve 381 the springs acting upon the pistons of the power cylinders 241 take over and open the fingers 240.

Interposed in the lead 380 is normally open relay switch 382 which is under the influence of a relay 383 to be described more fully hereinafter.

The aforementioned effect accomplished by actuating the limit switch 314, namely, opening such normally closed switch, is accomplished as follows:

The temporary closing of the switch 310b temporarily energizes the relay 363 thereby temporarily or momentarily to close the normally open relay switch 384 which is interposed in a lead 385, the latter interconnecting a terminal 386 (interposed in lead 372) and a terminal 387 interposed in a lead 388. A relay 389 in turn is interposed in the lead 388 as are: (a) relay switch 390 (normally closed), and under the influence of relay 383, (b) a relay switch 391 which is actuatable by and under the influence of the relay 389, and (c) the aforementioned limit switch 314, the lead 388 thence being in connection with a terminal 392 and there being placed between the latter terminal and the limit switch 314 a further relay switch 393, the operation of which will be set forth hereinafter. The relay switch 393 is normally closed.

Thus a temporary or momentary energization of the relay 363 will cause a temporary or momentary closing of the relay switch 384 thereby temporarily to energize the relay 389 and actuate its holding circuit by closing relay switch 391, the relay switches 390 and 314 at the time being in their normally closed positions. Such closing of the relay switch 391 creates a circuit which causes the energization of the paper holding finger solenoid 379 as follows:

Commencing at a terminal 392a (the lefthand extremity of lead 380), the solenoid 379, a terminal 393a, a lead 394 interconnecting the latter terminal to the terminal 387, the relay switch 391 and relay switch 314, the latter two being via that portion of the lead 388 between terminals 387 and 395, a lead 396 interconnecting the terminal 395 in turn to a terminal 397 and thence to the terminal 386 and to the lead 337 via the normally closed limit switch 313b.

It will be seen that by temporarily opening the limit switch 314, the paper holding fingers 240 will be immediately released.

When the primary ram means 229 has accomplished its full forward motion, that is, when the piston 234 has moved to its fully extended condition (FIG. 2), the limit switch 312 is actuated thereby energizing a solenoid 398 which also is operatively connected to the air valve 367 for producing reverse motion of the piston 232. The limit switch 312 and said solenoid 398 are interposed in a lead 399 connected across the aforementioned basic leads 336 and 337.

The reverse movement of the piston 232 to its retracted condition actuates the limit switch 315 thereby energizing a solenoid 400 for the purpose of driving upwardly the paper rack 239 by virtue of the directing of air under pressure into the power cylinder 242 (FIG. 11). The limit switch 315 and the solenoid 400 are for this purposed interposed in a lead 401 connected across said basic leads 336 and 337. The so-called "rack-up" solenoid 400 is operatively associated with the air valve 402 for the purpose of directing air as aforementioned to the power cylinder 242 for the aforementioned purpose thereby causing the upward motion of the paper rack 239 as shown in FIG. 11a.

The rack 239 upon reaching its uppermost position actuates the limit switch 316 (FIGS. 2 and 12), such switch being normally open and thus being closed when so actuated. The closing of such limit switch energizes the relay 383 above mentioned and accomplishes the retrieving of the loose end of the paper curtain, that is, the paper clamping fingers 240 are caused to grasp the lowermost edge of the paper curtain preparatory to pulling it down when the rack in turn is moved vertically downwardly. In the form shown, this is accomplished by the following: The limit switch 316 and the relay 383 are interposed in a lead 403 connected across said basic terminals, said relay being operatively associated with the aforementioned relay switch 382 in the lead 380. The relay switch 382 is normally open but upon energization of the relay 383, the switch 382 is closed and thus immediately there becomes energized the aforementioned solenoid 379 for the purpose of directing air into the paper hold finger cylinders 241 via the valve 381 thereby to grasp the lower edge of the paper curtain.

Note that when the paper rack 239 is in its uppermost position thereby closing the limit switch 316 and energizing the relay 383, the latter effects its own locking circuit by closing the relay switch 404 interposed in the lead 405, the latter interconnecting terminals 405a and 392. A portion 388a of the lead 388 interconnects the terminal 392 with the terminal 395 and hence the holding circuit of the relay 383 is from the terminal 405a to the terminal 395 via the aforementioned leads 405 and 388a. Interposed in the lead 388a is the normally closed relay switch 393 to appear more fully hereinafter.

The aforementioned energization of the relay 383 also causes the dolly 262 to commence its movement from the package wrapping station 235a (FIG. 2) to the left, as viewed in this figure, to the intermediate station 273, this being accomplished by virtue of the energization of a motor starter 406 interposed in a lead 407 which interconnects terminals 408 and 409, the former being in the basic lead 336. The terminal 409 in turn is connected to the lead 337 via a lead 410 in which are interposed relay switches 411 (normally open) and 412 (normally open). The relay switch 411 is under the influence of the relay 383 and hence, by virtue of the energization of the latter relay, the switch 411 is closed. The relay switch 412 being under the influence of the energized relay 347 also is closed and hence the circuit is completed for energizing the motor starter 406. The latter actuates a motor 413 (FIGS. 2 and 12) for the conveyor which moves the package from the package pickup station 282 (FIG. 2a) via the third path 286 to the box machine, namely, the package receiving station 286 of the box machine 287. Motor 413 also drives the conveyor 280 (FIG. 2) and the dolly 262.

Relay switch 412a is also inserted in the electrical lead 407 and interposed between the limit switch 328b and the motor starter 406 and is under the influence of the relay 347 as is the relay switch 412. Thus the motor starter 406, by virtue of the normally open condition of the switch 412a, cannot be energized unless the relay 347 also is energized, the relay 347, of course, reflecting the energized status of the air system.

It is, of course, understood that the limit switch 328b is closed and thus in its normally closed condition in order to complete the circuit to the motor starter 406. Thus the dolly 262 (FIG. 2) is started on its way toward the intermediate station 373 and when it reaches the latter station the limit switch 328 is actuated, that is, both of the parts thereof are actuated, namely, 328a and 328b, the former being urged from its normally open to its closed condition, and the latter from its normally closed to its open condition, thereby deenergizing the motor starter 406 and energizing a solenoid 414 for the purpose of actuating the secondary ram means 274 (FIG. 2) to extend same by actuating the power cylinder 278 via an air control valve 415, the solenoid 414 being operatively connected to the air control valve 415, the latter in turn receiving air under line pressure as is shown in connection with FIG. 13.

The aforementioned limit switch 328a and its solenoid 414 are interposed in the lead 416 connected across the basic leads 336 and 337, there also being interposed therein a terminal 417 which is located between the limit switch 328a and a normally closed relay switch 418 under the influence of a relay 419 as will appear hereinafter.

The closing of the limit switch 328a energizes the terminal 417 and in addition to actuating the solenoid 414, and hence the secondary ram means 279, also energizes a solenoid 420 which is known as the "rack down" solenoid which is also operatively connected to the air valve 402 for the purpose of actuating the power cylinder 242 (FIGS. 11 and 12) to cause the paper rack 239 to move downwardly thereby to reestablish the paper curtain 245 as shown in FIG. 11.

It is, of course, understood that the actuation of the transfer cylinder 278 urges the partially wrapped package out of the intermediate station 273 and into the package pickup station 282 (FIGS. 2 and 2a). In moving the package from said two stations, namely, from station 273 to 282, the end flaps on each side thereof are folded as are the side flaps preparatory to moving the package past the second and third tape applicators 284 and 285, respectively.

The aforementioned "rack down" solenoid 420 is located in a lead 421 which interconnects the terminal 417 with the basic lead 336, the solenoid 420 thus being in parallel with the solenoid 414.

Analogously connected to the terminal 417 is a lead 422 in which is located the aforementioned relay 419, there also being located therein a relay switch 423 under the influence of the relay 419, switch 423 being normally open.

For the purpose of retracting the pusher plate 275 (FIG. 2) and hence the piston 279 of the secondary ram means 274, the aforementioned limit switch 331 is provided in the path of the cam means 330 and the limit switch 331 is actuated when the pusher plate 275 and its cam means have moved a selected distance. Thus a lead 424 is connected across the basic terminals 336 and 337 and in which are located the aforementioned limit switch 331 and a solenoid 425 which when energized is effective to retract the pusher plate 275. The limit switch 331 is normally open and is closed in response to the cam means 330 actuating same thereby to energize the solenoid 425 and via the air valve 415 to retract the primary ram means 274. The aforementioned retraction of the secondary ram means can take place providing a further switch, known as an interlock switch, 426 is closed, the latter being located also in the lead 424.

A terminal 427 is located in the lead 424 between the solenoid 425 and the limit switch 331 and is connected via a lead 428 to a terminal 429 in the aforementioned lead 422. Hence when the normally open relay switch 331 is closed by means of the cam 330, the relay 419 is energized via the lead 422, the terminal 429, lead 428, terminal 427 and that portion of the lead 424 to the right of the terminal 427, as viewed in FIG. 12. The energization of the relay 419 actuates a holding circuit via the relay switch 423 which is normally open but which is closed in response to energizing the relay 419.

The result of energizing the relay 419 and holding same closed via such holding relay switch 423 is effective to close the following additional relay switches under the influence of the relay 419: relay switch 430 and relay switch 393 aforementioned, such switches being respectively normally open and normally closed.

The result of such energization of the relay 419 is to supply current to the motor starter 406 via the limit switch 332 (switches 319b and 332 being closed) thereby to cause the return (by motor 413) of the dolly 262 to its original position, namely, to the package wrapping station 235a (FIG. 2). The energization of the motor starter 406 is also effective to deliver a package to the box machine 287 by means of conveyor motor 413.

The return motion of the dolly 262 actuates the limit switch 321 (normally open) thereby to actuate the tape feeding solenoids 431, 432 and 433 which via the air control valves 434, 435 and 436 control respectively the tape feeding power cylinders 303, 324 and 325 (FIGS. 2 and 2a).

The aforementioned wetting roll limit switches 320, 322 and 323 are respectively interposed in the leads 437, 438 and 439 in which also respectively are connected the wetting roll control solenoids 440, 441 and 442. The leads 437, 438 and 439 are connected across the basis leads 336 and 337 in parallel.

The aforementioned solenoids 441, 440 and 442 are respectively operatively connected to control valves 443, 444 and 445 which in turn control the wetting roll power cylinders 296, 297 and 298. The pistons of such power cylinders are urged to the right, as viewed in FIG. 12, by means of springs which are schematically indicated adjacent such cylinders and such springs tend to urge the respective wetting rolls 290, 291 and 292 away from their respective vacuum drums. However, the application of air under pressure to the wetting roll power cylinders overcomes such spring pressure and urges the wetting rolls against the vacuum drums and hence against the gummed tape passing therebetween.

Thus in properly timed relationship to the motion of the package by means of the dolly 262 and the conveyor 283, the wetting rolls are applied to the tape and the tape feeding rolls are actuated.

Referring now to FIG. 13, there will be described briefly one plan of interconnecting the pneumatically actuated devices which were described in connection with FIG. 12, FIG. 13 comprising a schematic diagram of one form of such interconnection.

In FIG. 12 the air charge system was described as being initially actuated by the momentary closing of the normally open push button switch 234 which actuated the solenoid 346, the latter in turn starting the flow of air at line pressure via a control device 355. Alternatively, air solenoid 346a may be employed (FIG. 13) which is situated with respect to an air pump 356a as shown, the air pump 356a normally being continually operating to provide the line pressure and the solenoid 346a being operatively connected to the normally closed air valve 446 which comprises a master valve for the pneumatically interconnected parts of the system. Thus upon actuation of the solenod 346a the normally closed valve 446 is open and air at so-called line pressure is admitted to a regulating valve 447 from which the air is directed via conduit 370a in a regulated condition.

The primary ram means 229 (FIG. 12) are pneumatically interconnected to the system in the manner shown via the aforedescribed air valve 367 which is under the influence of the two solenoid valves 366 and 398 for controlling the action of the power cylinder thereof (229a, FIG. 13) in both forward and reverse motion, respectively. A regulating device or valve 448, if desired, is interposed in one of the air conduits 449 which interconnects the cylinder 229a with the valve 367, another conduit 450 having a similar regulating valve 451 therein. Air at regulated pressure is applied to the valve 367 via a conduit 452.

The vertically reciprocable power cylinder 242 is pneumatically connected to its air valve 402 via the conduits 453 and 454, there being interposed therein respectively regulating valves 455 and 456 for controlling the speed of operation of such power cylinder 242. The air under pressure is directed to the air valve 402 via a conduit 457 and said air valve is, as well shown in FIGS. 12 and 13, under the influence of the two solenoids 400 and 414.

The paper knife cutoff power cylinder 251 is analogously under the influence of the aforedescribed two solenoids 373 and 374 which influence the air control valve 375.

The air under the selected and regulated pressure is directed to a manifold 458 from which it is in turn directed to the elements to be set forth below.

The tape drive and tape wetting control power cylinders 303 and 296, respectively, are urged normally to the right by spring pressure, as schematically shown in FIG. 13, and such spring pressure can be overcome by the exertion of pneumatic pressure on the left side of the respective pistons of the power cylinders by the control of the valves 434 and 443 respectively via the control solenoids 431 and 441 as described in connection with FIG. 12.

Analogously the pistons of the two small paper clamp cylinders 241 are urged also to the right by spring pressure and the latter pressure can analogously be overcome by pneumatic pressure in the manner also described above.

The air control valve 415 of the secondary ram means (transfer cylinder) is connected to the manifold 458 via a conduit 459, said control valve 415 being under the influence of the solenoids 414 and 425 in the manner described above.

The No. 2 tape applicator 284 is pneumatically interconnected into the system via still a further manifold 460 in communication with the manifold 458 via conduit 461 and No. 3 tape applicator 285 also is in communication with such system via another manifold 462 via a conduit 463. The manifolds 460 and 462 are in communication with their respective three-way valves 435; 444; 436 and 445 as shown.

Emanating from said manifold 458 is a conduit 464 which pneumatically interconnects the apparatus shown in FIG. 14 with the pneumatic system, said apparatus of FIG. 14 to be described in further detail below in connection with the box machine 287.

The aforedescribed vacuum drums 287, 288 and 289 are operatively connected to means for rotating same in such a manner that they rotate at all times that their respective conveyors are moving, that is, the vacuum drum 287 rotates whenever the dolly conveyor 280 moves to convey the dolly from the package wrapping station 235a to the intermediate station 273, and also the vacuum drums 288, 289 rotate during the motion of the package conveyor 283 which conveys the package from the package pickup station 282 (FIG. 2a) to the package receiving station 286 of the box machine 287.

Suitable vacuum blowers (not shown) are operatively connected to said vacuum drums 287, 288 and 289 to place same under suitable vacuum at all times, it being understood that the periphery of each of the drums is covered by a rubber covering and said periphery is perforated in order that the effect of the vacuum within the drum can be effective to cause the tape fed by the respective tape applicators to adhere to the periphery of the vacuum drums thereby to cause the tape to be applied to the package. The vacuum of such drums is interrupted at the point of tape contact with the package because of the location and configuration of a stationary vacuum chamber within the drum.

However, reliance is not placed upon the adhering force of the gummed tape to separate such tape from the several vacuum drums aforementioned. Suitable tape stripping means are employed as are well illustrated in connection with the first tape applicator 272 (FIG. 2), such means comprising a cord 464 of resilient material, for example, of rubber, and, if desired, two such cords 464 may be employed, one above the other, spaced, for example, by a selected distance less, of course, than the width of the gummed tape. The rubber cord or belt 464 passes partially around the periphery of the vacuum drum 287, as shown in FIG. 2, and at a point of application 465 of the tape upon the package the belt 464 passes out of engagement with the vacuum drum 287 and passes around a roller 466 and thence back to the vacuum drum 287.

The roller 466, in the form shown, is only one of four here employed, the other three being designated 467, 468 and 469, all of which are mounted with the axes of rotation thereof vertical and in a vertical plane which is parallel to the path of motion of the conveyor, namely, parallel to the second path 280a (FIG. 2).

The rollers 466–469, inclusive, are preferably covered with a resilient material, such as sponge rubber, and are held resilient in a norm position, as shown in FIG. 2, in such a manner that they may move resiliently either toward or away from the second path 280a, this being accomplished by means of a suitable resilient mounting of the pivots of the several rolls 466–469, inclusive.

The mounting means for said four rolls, 466–469, are positioned in such a manner that the rolls resiliently press against the package 85 as it moves therepast and particularly against the overlapping margins 254, 255 (FIG. 11a) thereby to urge the selected length of tape from the roll 299 over and against said overlapping margins 254, 255. The resilient coated rolls 466–469 thus yieldingly press the selected length of tape over the partially wrapped package.

The second tape applicator 284 is provided with an analogous endless belt or cord 470 which passes along a plurality of resiliently coated rolls 271 which perform a function similar to the rolls 466–469, inclusive, and are analogously mounted (FIG. 2).

The third tape applicator 285 is also provided with an analogous endless resilient belt 472 which passes adjacent a plurality of analogous rolls 473 (FIG. 2a).

The two groups of rolls 471 and 473 are, as aforementioned, mounted analogously to the group of rolls 466–469 in such a manner that they are resiliently urged toward a norm position, as shown in FIG. 2a, such norm position providing a dimension perpendicularly between the two belts 470 and 472 which is preferably slightly less than the length of the package 85 as it passes therepast. Consequently the roll groups 471 and 473 resiliently press against the sides of the package 85 and hence urge the selected lengths of gummed tape against the overlapping end and side flaps of the package 85 thereby to cause same to adhere aggressively to the now closed ends of such package.

Note that the resilient belts 464, 470 and 472 move in suitable grooves in the peripheries of the several drums and rolls which they engage.

Any desired number of such resilient belts, such as 464, may be employed and as aforementioned two or three may be employed for the first tape applicator 272 and two belts 470 and two belts 472 may be employed respectively for the second and third tape applicators 284 and 285, the belts being spaced one above another at intervals suitable to insure proper stripping of the gummed tape from the vacuum drum.

Box machine

The box machine 287 will now be described with reference to the following FIGS. 1b, 2, 2a and 14–25, inclusive.

The aforementioned package conveyor 283 (FIG. 2a) thus, as aforementioned, delivers the package now wrapped with the kraft first covering to the package receiving station 286 of the box machine 287.

The box machine 287 includes the following main elements: a box loader ram (stuffer pad) 334 aforementioned which comprises a part of the above-described box loading apparatus and which stuffer pad 334 is reciprocably movable from right to left, as view in FIG. 2a, under the influence of the box loader ram or stuffer pad conveyor 335 thereby moving the package along the fourth path 474 into the box loading station 475.

Thus the box loader ram or stuffer pad 334 is normally positioned adjacent the receiving station 286 and in a location preparatory to urging the package into an empty corrugated cardboard box along such fourth path substantially perpendicular to the aforementioned third path.

Means 476 are provided (FIGS. 1b, 17–22, inclusive), for holding a stack 477 of box blanks 478.

The box blanks 478 are, as well shown in FIG. 1b, initially in a flattened condition above a box erecting station 479 (FIGS. 1b, 20 and 21) and which box erecting station is situated at the end of such fourth path 474.

Each of such box blanks, as is well shown in FIG. 22, have four side walls 480–483, inclusive, and at each end thereof four end flaps, the end flaps on the righthand extremity of the box blank, as viewed in FIGS. 2a and 23, being indicated at 484–487, inclusive, and the end flaps on the opposite end at 488–491, inclusive.

The side walls 480 and 482, as viewed in FIG. 22, comprise top and bottom walls whereas the side walls 481 and 483 front and rear side walls, respectively, in view of the direction of travel of the erected box along a fifth path 492 (FIG. 2a).

Each adjacent pair of such side walls is separated by a suitable fold or score line in a conventional manner.

As is well shown in FIG. 22, each initially flat box blank, such as blank 493, is adapted to be erected by urging together opposite edges 494 and 495 thereof.

The box blank stack holding means 476 is provided with a suitable escapement means operatively associated therewith for releasing the lowermost of said box blanks into the box erecting station 479 whereby it falls upon a box erecting plate 496 (FIG. 22), the latter comprising the lowermost surface of the station 479.

Means for erecting such an initially flat box blank 493 in the erecting station 479 are provided comprising a pair of box erecting or unfolding arms 497 which are parallel to one another and coaxially mounted upon a shaft 498 to which they are affixed for angular movement under the influence of a pneumatic power cylinder 499 (FIG. 22) which is operatively connected to a bell crank lever 500 also affixed to the shaft 498, such connection being via a piston rod 501 of the power cylinder 499. In FIG. 22 only one of such box erecting or unfolding arms is shown, it being understood that two are employed parallel to one another.

The box unfolding or erecting arms 497 are normally horizontal, as viewed in FIG. 22, and are brought into action after a box blank, such as 493, is dropped upon the erecting table 496 with one of the edges 494 along a limit-stop 502 which, in the form shown, comprises an angle iron of suitable dimension.

The upper extremity of the two box unfolding arms is of L-shaped configuration, as at 497a (FIG. 22), and thus adapted for engaging the edge 495 and urging same toward the aforementioned edge 494 which comes up against the limit-stop 502 thereby causing erection of the box.

For the purpose of holding down the lowermost or bottom side wall 482, thereby to facilitate the erecting of the box blank 493, a vacuum cup 503 is provided which is vertically reciprocable under the influence of a pneumatic power cylinder 504, the vacuum cup 503 normally being located a suitable distance below the erecting table 496 and out of engagement with the lowermost surface of a box blank located therein. However, by suitable means to appear more fully hereinafter, the vacuum cup 503 is lifted or urged upward until it engages the lowermost surface of the bottom side wall 482 thereby to hold such side wall in place while the erecting means 497 and 502 are actuated.

The vacuum cup 503 is in communication with a suitable vacuum pump 504 via a conduit 505, the vacuum pump being powered by a suitable electric motor, as at 506.

Further for the purpose of aiding in the erection of a box blank, as shown in FIG. 22, another vacuum cup 507 is provided and is located in such a manner that the box after being loaded can move away therefrom in the direction of arrow 507a when it is desired to move the loaded box along the aforementioned fifth path and out of the box machine.

Accordingly, the vacuum cup 507 is mounted upon a crank lever 508 which is in turn secured to a shaft 509 suitably journaled for angular movement about an axis below the bottom of the erected box blank 493. The actuation of the crank 508 is by means of a suitable power cylinder 510 which is controlled in a manner also to appear more fully hereinafter. Thus the vacuum cup 507 can be angularly shifted from an inactive position below the path of the box to the position shown in FIG. 22 where the vacuum cup 507 engages and adheres temporarily to the angularly shifting front side wall 481.

The coaction of the vacuum cups 503 and 507, together with the box erecting or unfolding means 497 and 494, accomplishes a positive and reliable erection of the box.

We have found it desirable to control the angular speed of the vacuum cup 507 about the axis of the shaft 509 such that it is somewhat faster than the angular speed of the erecting arms 497.

The vacuum cup 507 is in communication with said vacuum pump 504 via a conduit 511.

As shown in FIG. 23, box end flap closing means are provided which are positioned adjacent the righthand extremity of the erected box blank, as viewed in FIG. 2a, such box end flap closing means comprising suitable palm devices 512 and 513 which are mounted for angular movement upon shafts 514 and 515, respectively, the palm means 512 and 513 being adapted in a well known manner first to fold inwardly the end flaps 486 and 487 and thereafter to fold over the end flaps 484 and 485.

Such folding of the end flaps 486, 487 may be accomplished by fold plates 512a and 513a, respectively, and the folding of the end flaps 484 and 485 by means of the palm devices 512 and 513.

The end flaps 488–491 on the opposite end of the box (FIG. 24) are folded by virtue of coaction with suitable well known folding means against which the flaps 490, 488, 489 are urged as a result of the pushing of the box 493 out of the box loading station 475. The aftermost end flap 491 is preferably folded at the same time as is the flap 490 and prior to the folding of the flaps 488 and 489. The folding of the end flaps 491 can be accomplished by the mechanism shown in FIG. 24 and comprising an end flap folding arm 516 which is mounted for angular motion about the axis of a shaft 517 which is suitably mounted for such angular motion, this being accomplished under the influence of a power cylinder 518. The latter is under the influence of suitable control means which may be actuated by a box conveyor pusher pad 519 (FIG. 2a), the latter occurring in response to initial motion of such box conveyor pusher pad or alternatively by means of a cam device 520, as shown in FIG. 24, which is mounted upon a sprocket chain 521 (the latter mounting said conveyor pusher pad 519) and positioned for actuating a limit switch 522 through the intermediary of a lever 524, the limit switch 522 in turn controlling a valve 523 which controls the power cylinder 518 at least in one direction of motion thereof.

When a package is urged into the package receiving station 286 (FIG. 2a), it can actuate the aforementioned box loader ram 334 through the intermediary of a limit switch 525 which, as will appear more fully hereinafter, controls the loading motion of the box loader ram or stuffer pad 334. Thus a package in the station 286 is urged into an erected box in the box loading station 479, it being understood, of course, that suitable means are provided for preventing the actuation of the box loader ram 334 unless a box, such as 493 (FIG. 22) is in a fully erected condition in the box loading station 479. The latter can be accomplished by positioning a suitable limit switch, such as 526, in position to be actuated in response to the erection of a box blank 493.

Once the package of tape rolls is stuffed or loaded into the erected box, suitable means are actuated for energizing a box conveyor motor 527 (FIG. 2a). The actuation of the latter motor can be accomplished in response to a selected departure of the box loader ram 334 from its norm position as shown in FIG. 2a. Such actuation of the motor 527 thus causes the movement of the box, such as 493, out of the box loading station 475 through the intermediary of the conveyor pusher pad 519 which is mounted upon and moved by the endless sprocket chain 521.

As aforementioned, responsive to such movement of the box 493 the end flaps 490 and 491 are folded inwardly as are the end flaps 488 and 489 on the end of the box, as viewed in FIG. 24. Thus all of the end flaps of the box are closed and the latter is prepared for the final application of gummed tape over the adjacent margins of the flaps 484, 485 and 488, 489.

The conveyor pusher pad 519 thus urges the box with said end flaps folded past a fourth tape applicator 528 which applies a selected length of gummed tape to the end of the box, as shown in FIG. 24, and thence past a fifth tape applicator 529 which applies such a length of tape to the end, as viewed in FIG. 23, thereby completing the sealing of the box.

Referring now to FIG. 1b, it may be desired to provide an extra or protruding length of such gummed tape beyond the vertical edges of the box, examples of such protruding extra lengths being shown at 530 and 531 of the latter figure. Suitable means are provided for folding and urging against the box such extra lengths 530 and 531 comprising angularly shiftable flaps 532 and 533 for the lefthand side of the box (FIG. 1b) and 534 and 535 for the righthand side. Suitable pneumatically actuated power cylinders, such as 536, may be employed for this purpose and may be actuated in response to the movement of the box 493 past a selected position along the fifth path 492.

It is, of course, understood that the fourth and fifth tape applicators 528 and 529 are operated in suitably timed relationship with the box conveyor means 519 and 521 whereby the selected lengths of gummed tape are suitably applied to the end flaps passing adjacent thereto.

Referring now to FIGS. 18–21, inclusive, there will now be described the escapement mechanism which is designed for the purpose of permitting one of the box blanks 478 at a time to fall from the stack holding means 476 from the stack 472 and thence onto the box erecting table 496 where it is erected in the box erecting station 479, the initially flat blank being unfolded or erected in the manner described above in connection with FIG. 22.

The stack 472 of box blanks 478 is held in the stack holding means 476 by a pair of fingers along opposite bottom margins of the stack, such fingers being designated at 537 and 538 and being mounted for horizontal reciprocable movement toward and away from one another in a manner to be described more fully herebelow.

Figure 20:
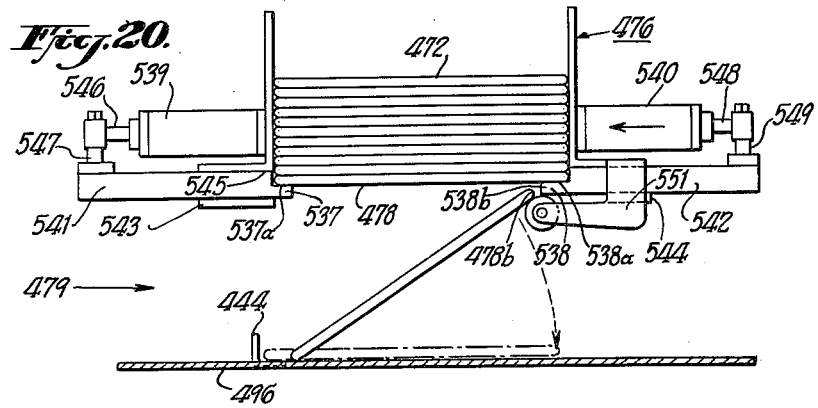

Referring to FIG. 20, the fingers 537 and 538 are in a normal initial position holding the stack 472 thereabove in the manner well shown in this figure.

The finger 437 is mounted for such horizontal reciprocable movement under the influence of a power cylinder 539 and the finger 538 in turn is horizontally reciprocably movable by means of a power cylinder 540, said power cylinders being operatively associated with the remainder of the system, particularly as will be shown and described in connection with FIG. 14.

The stack retaining finger 537, in the manner shown in FIG. 20, supports upon the upper surface 537a thereof the lowermost lefthand margin of the lowermost box blank 478, and analogously the finger 538 supports upon its uppermost surface 538a the opposite margin of the lowermost box blank 438. The fingers 537 and 538 preferably comprise integral parts of horizontally reciprocable arms 541 and 542, respectively, which are mounted for such horizontal reciprocable movement in bearings or sleeve members 543 and 544, respectively.

Adjacent and above the inner extremity of the upper surface 537a of the finger 537 is a shoulder 545 which will serve the purpose to be set forth herebelow.

Reference has been made above to FIG. 20 as indicating the position of the stack of blanks 472 at the outset of the operation of the escapement mechanism. The aforementioned power cylinders 539 and 540 are suitably connected to the arms 541 and 542 by means of the connection shown, for example, by means of piston 546 and post 547 for the power cylinder 539 and the piston 548 and post 549 for the power cylinder 540.

The sequence of operations of the power cylinders 539 and 540 and the effect thereof upon the stack of box blanks is as follows:

Referring to FIG. 18, the first step in the operation comprises a first movement of the piston 548 of the power cylinder 540 thereby to move the finger 538 from its initial or norm position (as in FIG. 20) to its leftmost extremity of motion, as in FIG. 18. This permits the righthand margin of the lowermost box blank 478 to fall and to rest upon a roller 550 which is supported upon a stationary arm 551, the latter in turn being secured to the framework of the box blank stack holding means 476. Thus the roller 550 is rotatable about its axis but otherwise relatively stationary.

Thereafter the lefthand finger 537, under the influence of the power cylinder 539, is urged to the right from its norm position of FIG. 20 to the position shown in FIG. 18 and the vertical surface 537b (between the shoulder 545 and upper surface 537a) engages the lefthand edge of the box blank 478 and shoves it to the right, as viewed in FIG. 18, thereby causing such lefthand edge 478a of the lowermost box blank to assume the position shown in FIG. 18 which is slightly removed from or spaced from the vertical surface 537b.

The righthand edge 478b (FIG. 18) of the box blank 478, as viewed in FIG. 18, is thus moved adjacent to and in contact with the vertical surface 538a of the finger 538.

Figure 19:
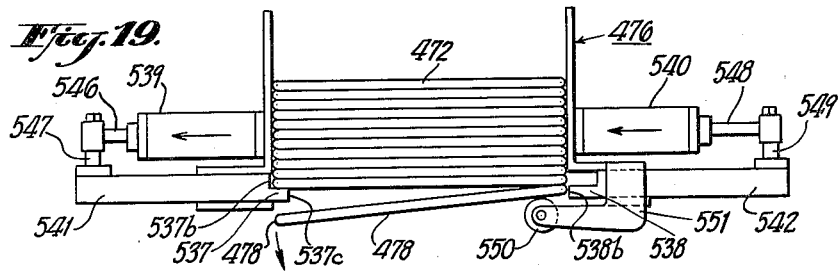

Thus the lefthand edge 478a (FIG. 18) of the lowermost box blank 478 is in a position to be released and dropped downwardly as a result of a reverse motion of the piston 546 of the power cylinder 539 and such release is brought about by a motion to the left of such piston 546 so that the vertical surface 537c is in the position shown in FIG. 19 and the leftmost edge 478a of the box blank is permitted to fall past the righthand extremity of the finger 537.

Following this the power cylinder 540 is again actuated to move to the left, as viewed in FIG. 19, whereby the vertical surface 538b of the finger 538 assumes the position shown in such FIG. 19 and thereby shoves to the left the aforementioned lowermost box blank. Such shoving to the left of the lowermost box blank 478 is facilitated by the action of the roller 550 over which the lowermost righthand margin of such box blank moves under the influence of the leftward moving finger 538.

The left hand edge 478a of said lowermost box blank 478 thus is caused to swing downwardly and the box blank moves in a counterclockwise direction in the direction of the arrow shown in FIG. 19.

The completion of the release of such lowermost box blank is shown in FIG. 20 and is caused by further leftward motion of the finger 538 still under the influence of the power cylinder 540 whereby the vertical outer surface 538b of the finger 538 pushes the lefthand extremity 478b of the box blank to the position shown in FIG. 20 from which it falls from the position shown in solid lines in such figure to the position shown in broken lines.

Thus in effect the escapement device of FIGS. 18–21 releases one box blank at a time in such a manner that that edge of the box blank first falls to the erecting table, which edge is "downstream" relative to the other box edge.

Figure 21:
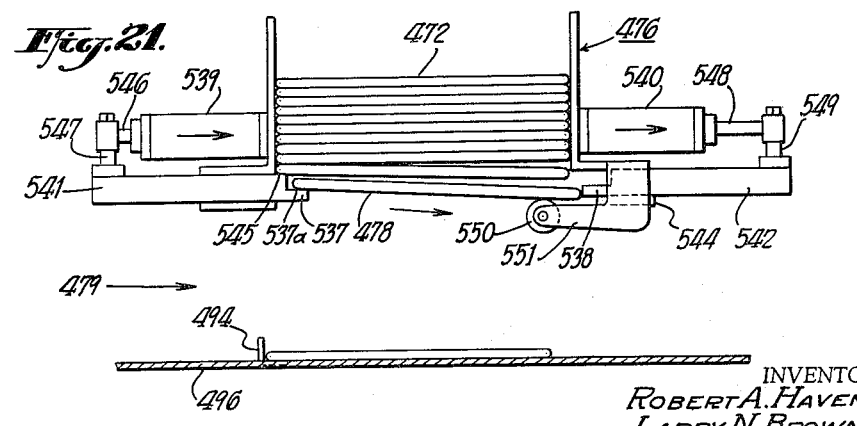

Referring to FIG. 21, it will be seen that after the box blank has fallen to the table, as shown in FIG. 20, the escapement finger 538 is moved to its rightmost extremity of motion by the power cylinder 540 in a sixth movement thereof and the other finger 537 is moved to the right in a seventh movement thereby to assume the positions shown in FIG. 18 preparatory to repeating the operation.

It will be noted that when the fingers 537 and 538 have moved to the position shown in FIG. 21, the lefthand margin of the next lowermost box blank rests upon the above-described shoulder 545 preparatory to said margin being allowed to drop onto the uppermost surface 537a in response to the finger 537 moving to the position shown in FIG. 19.

The operation of the box machine 287 will now be broadly described in connection with FIGS. 1b, 2a, 14, 22, 23 and 24.

As in FIG. 2a, a package 85 is conveyed along the third path 286 by means of the package conveyor 283 under the influence of the pusher pad 333 which is moved by the conveyor 283. The pusher pad 333 thus moves the package past the end folding means 281 and thus second and third tape applicators 284 and 285, as above described, tape being applied to the folded ends of the package in response to the dolly 262 (FIG. 2) actuating the limit switches 320 and 323, as above described, while moving a package along the second path 280a.

Such package moving along the third path 286 is delivered to the box machine 287, as aforementioned, in front of the box loader ram or stuffer pad 334 and actuates the box machine limit switch 525 thereby preparing the box loader ram to be actuated and this occurring providing an erected box is in erected condition in the box erecting station 479. When a box blank has been suitably erected it actuates the limit switch 526 and when the two limit switches 525 and 526 are actuated at the same time, a suitable circuit is completed to actuate the power means for moving the stuffer pad 334 to urge the package into the erected box.

Such coactuation of the limit switches 525 and 526 energizes a motor starter 552 which will be described in connection with FIG. 25 for the purpose of energizing a stuffer pad drive motor 553 thereby to push the package into the open and erected corrugated carton.

Referring now to FIG. 14, after a previous package, that is, a package ahead of the one under consideration, has entered an open box blank or carton and the conveyor 521 (FIGS. 2a and 24) is in operation and moving the box toward the end of the machine, an air switch 554 is actuated by the conveyor pusher pad 519 to actuate the escapement air cylinders 539 and 540 above described in such a manner that they follow the sequence of operations described in connection with FIGS. 18–21.

At the limit of outermost travel of the pistons of the power cylinders 539 and 540 an air switch 555 is actuated causing the reverse travel of the two escapement power cylinders.

The air switch 554 is operatively connected to a control valve 556, as shown in FIG. 14, to accomplish the aforementioned purpose as is the air switch 555.

The air switch 554 is also connected to an air valve 557 for the purpose of controlling a power cylinder 558 which is also shown in FIG. 23 and which is operatively connected to suitable flap closing means above described 512 and 513 for the purpose of closing the flaps on one end of a carton or box blank.

At the extreme retracted or reverse travel position of the carton escapement power cylinders 539 and 540 a further air switch 559 is actuated which is operatively connected to an air valve 560 which governs the above-described power cylinder 499 (FIG. 22) which in turn controls the carton unfolding or erecting arms 497.

When such carton unfolding or erecting arms 497 pass a selected position on their approach to a vertical position they actuate another air switch 561 which is also operatively connected to the air valve 557 for energizing the air power cylinder 558 to rotate the carton flap closing arms of FIG. 23.

The actuation of the air switch 559 not only influences the box unfolding or erecting power cylinder 499 via the air valve 560, but also influences the aforementioned lower vacuum cylinder 504 (FIG. 22) thereby to lift the vacuum cup 503 into contact with the underside of an unopened box blank resting upon the erecting table 496.

The air control valve 560 for the box unfolding or erecting power cylinder 499 is under the influence of the aforementioned air switch 559 as above described and the latter causes the power cylinder 499 to be actuated in one direction. The power cylinder 499 is actuated in the opposite direction under the influence of an air switch 559a which is also connected to the air control valve 560, the air switch 559a being actuated by the pusher pad 519 which is positioned to be actuated just before such pusher pad contacts an erected box.

Following the latter action, the power cylinder 510 (FIG. 22) which controls the lever 508 and the position of the upper vacuum cup 507 is actuated in response to the closing of a limit switch 562 (FIG. 14) which governs a solenoid 563 and thence an air valve 564 which is operatively connected to the aforementioned power cylinder 510.

The air valve 564 is under the influence of a spring 565 which causes the lever 508 (FIG. 22) to assume its retracted position below the path of the box, however, the actuation of the solenoid 563 via the limit switch 562 brings into play the power cylinder 510 which angularly shifts the lever 508 and moves the vacuum cup 507 to the position shown in FIG. 22.

The angular velocity or speed of the lever 508 is controlled by means of a suitable regulating valve 566 (FIG. 14) in such a manner that the vacuum cup 507 moves angularly, as aforementioned, at a slightly greater rate than the folding arms 497 (FIG. 22). All of such power cylinders of FIG. 14 are controlled by suitable air speed controls of well known design.

Reverting now to the parts of the fourth and fifth tape applicators, as shown in FIG. 14, it will be recalled that it was mentioned above that said tape applicators are constructed analogous to the previous tape applicators, such as 284 and 285, being provided with vacuum drums 567 and 568 (FIG. 2a), respectively, and also being provided with power cylinders 569 and 570, respectively, for shifting the carriages 571 and 572 thereby to urge the tape feeding rolls mounted upon such carriages into operative engagement with their respective vacuum drums thereby to initiate or terminate the feeding of the gummed tape to the applicator.

Power cylinders 573 and 574 are respectively associated with the tape wetting rolls 575 and 576 of said fourth and fifth tape applicators 528 and 529 and operate analogously to the wetting rolls 291 and 292.

The operative interconnection between said power cylinders 569, 570 and 573, 574 is well shown in FIG. 14, it being understood that such power cylinders are normally urged to the right, as viewed in FIG. 14, under the influence of spring pressure.

The power cylinders 536 (FIGS. 1b and 14) are normally urged to the right by suitable springs 536a (FIG. 14) and are operatively connected to the flap folding devices 532, 533 and 534, 535 in the manner shown in FIG. 1b. The pneumatic interconnection of said power cylinders 536, there being two thereof, is also shown in FIG. 14, said power cylinders being under the influence of a three-way control valve 577 which may be actuated as described below in connection with FIG. 25.

Note that the spring means shown in FIG. 14 for urging to the right the pistons of the power cylinders 569, 570 and 572, 574 are for the purpose of urging the devices secured thereto into an inactive position. For example, such spring means operatively associated with the power cylinders 569 and 570 for controlling the tape roll feed carriages 571 and 572 urge such carriages toward an inactive position thereby to prevent the feed of the tape. The actuation of the power cylinders overcomes such spring force to move the respective carriages and actuate the feeding mechanism. Analogously, the spring means associated with the power cylinder 573 and 574 urges their respective wetting rolls 575 and 576 out of the engagement with the respective vacuum drums 567 and 568.

Furthermore, the aforementioned springs 536a (FIG. 14) urge the foldover flaps 532–535, inclusive, into inactive condition as shown in FIG. 1b.

Referring now to FIG. 25, the operation of the box machine 287 will now be described with reference to its wiring diagram shown in such figure.

Power is supplied to the circuit shown in the wiring diagram of FIG. 25 via the electrical leads 578 and 579 which supply such power under the control of the relay 347 of the wrapping machine 231 (FIGS. 2 to 2a).

The electrical leads 578 and 579 in turn are electrically connected to the basic leads 580 and 581 of such wiring diagram. Connected across the leads 578 and 579 is a vacuum pump 582 which places under vacuum the vacuum cups 503 and 507 of the box machine 287.

A motor starter 583a also is connected across leads 578 and 579 for controlling a motor and vacuum blower 583b which places under vacuum the tape drums 567 and 568. Note that the other tape drums 287, 288 and 289 are placed under vacuum by a vacuum blower and motor 289a (FIG. 10) which is controlled by a motor starter 289b connected across terminals 89 and 90.

The vacuum pump 582 is under the influence of a motor starter 583 which is per se connected across the leads 578 and 579.

Many of the elements of the wiring diagram of FIG. 25 are connected in parallel with respect to the basic leads 580 and 581 as will be explained below.

The aforementioned motor starter 552 for the stuffer pad motor 553 is connected across the leads 580 and 581 via a lead 584 in which is interposed one part 525a of the above-mentioned limit switch 525, the latter including two parts, namely, 525a and 525b, the latter acting in a manner to be set forth below.

Also interposed in the lead 584 is the above-described limit switch 526 which appears in FIG. 22 and is actuated in response to the erection of an initially flat box blank. The switches 525a and 526 are normally open and hence in response to a package moving into the package receiving station 286, the limit switch 525a being actuated is closed and is no longer normally open, the same being true with respect to limit switch 526 which being normally opened is closed in response to the erection of a box in the box erecting station (FIG. 22).

It will be noted that the box machine 287 will not operate unless the wrapping machine 231 is energized. Also it will be noted that the vacuum pump 582 is energized at all times that the box machine is energized by virtue of the connection of the motor starter 583 across the leads 578, 579.

From the above it will be noted that when a package reaches the package receiving station 286 and actuates the limit switch 525a, the stuffer pad motor 553 will be energized providing a box is erected in the box erecting station 479 (FIGS. 20 and 21), the latter station coinciding with the box loading station 475 (FIG. 2a). Accordingly, the box loader ram or stuffer pad 334 is driven by the motor 553 to urge the package into the opened box. Such stuffer pad thus is caused to move to deactuate a limit switch 585 (FIG. 25) which also consists of two parts 585a and 585b which are operatively interconnected, the former being normally open and the latter normally closed. The former limit switch 585a is interposed in a lead 586 in series with the aforementioned limit switch 525b and the lead 586 is in turn connected to the terminal 407b of the wrapping and taping machine 231. Thus the limit switch 585 must be actuated before the conveyor 280 of the wrapping machine can operate.

The lead 586 is connected at terminal 587 to the basic lead 580.

Also interposed in the lead 584 is a terminal 588 which is in electrical communication with the lead 580 via another lead 589 in which is interposed the aforementioned limit switch 585b (normally closed) which is actuated by the motion of the stuffer pad 334.

When the limit switch 525a is closed, together with the limit switch 526, the motor starter 552 is energized which also energizes holding contacts 590 located in a lead 591 which interconnects a terminal 592 to a terminal 593, the latter in turn being connected in a lead 594 which interconnects the two basic leads 580, 581. There is interposed in the lead 594 a limit switch 595 which is under the influence of the conveyor pusher pad 519, as will appear below, and also there is interposed in such lead a motor starter 596 for the above-described box conveyor motor 527.

Thus a closing of the holding contacts 590 will energize the motor starter 596 and energize the box conveyor motor 527 to cause the box conveyor (for example, the conveyor pusher pad 519) to move off of the aforementioned limit switch 595 causing same to assume its normally closed condition and thereby to supply the motor starter 596 with electrical energy after the holding contacts 590 have opened.

It is to be noted that the pusher pad deactuating limit switch 585 maintains operation of the motor starter 552 (by virtue of closing of the switch 585b) after the limit switch 525 is deactuated in response to the departure of the package from the package receiving station 286.

In response to the actuation of the box conveyor motor 527, the box conveyor 521 is caused to move and actuates the limit switch 597 (normally open) thereby causing same to close and thus to energize a timer motor 598 which is operatively connected to a plurality of timer switches 599–603, inclusive, through the intermediary of a plurality of cam devices 604–608, inclusive, respectively, to produce the results to be described below.

The timer motor 598 is also operatively connected to a timer switch 609 (normally open) such connection being via a cam device 610. The switch 609 is located in a lead 611 which is connected in parallel to the aforementioned limit switch 597 being interconnected between a terminal 612 and another terminal 613 as shown in FIG. 25 and thus being connected in parallel to the limit switch 597. Thus the timer switch 609 acts as a holding switch and provides means for continuing the supply of electrical energy to the timer motor 598 after the limit switch 597 has returned to its normally open condition.

The timer motor 598 controls the aforementioned cams 604–608, inclusive, to control in selected timed relationship their respective switches and in turn to control in suitable timed relationship the tape feeder and wetting devices of the fourth and fifth tape applicators 528 and 529, respectively, and also to control in suitable timed relationship the flap folding power cylinders 536 described above in connection with FIG. 14.

Accordingly, the timer switch 599 which is actuated by the cam 604 controls the energization of a solenoid 614 which is connected to an air valve 615 controlling the power cylinder 569 (FIGS. 14 and 25). The timer switch 599 is interposed in a lead 616 electrically connected across the aforementioned basic leads 580 and 581, the solenoid 614 being similarly interposed.

Analogously the timer switches 600–603 are interposed in electrical leads 617–620, inclusive, respectively.

The timer switch 600 under the influence of its cam controls a solenoid switch 621 which in turn governs an air control valve 622 governing the power cylinder 573 of the wetting device for the No. 4 tape applicator.

The timer switch 601 analogously controls power cylinder 570 via a solenoid 623 and an air control valve 624 and the timer switch 602 also analogously controls the power cylinder 574 for the wetting roll of the No. 5 tape applicator via a solenoid 625 and an air control valve 626.

The timer switch 603, by controlling a solenoid 627, which governs the three-way control valve 577 analogously controls the power cylinders 536.

It is, of course, understood that the power cylinders 569 and 570 and the analogous power cylinders of the other tape applicators not only control the feeding of the tape but also the shearing thereof, the shearing occurring in response to retractile motion of the respective carriages moved by such power cylinders.

If desired, the box blank stack holding means may be vibrated by a suitable pneumatically operable vibrator connected to the pneumatic pressure line 464 of FIG. 14.

What is claimed is:

1. In apparatus of the class described the combination comprising: a roll separator device including: a plurality of tubes mounted upon mounting means for holding same substantially parallel and in selected spaced positions about a common axis, such mounting means being angularly shiftable to move such tubes angularly simultaneously, each of such tubes being movable to a loading station for receiving a plurality of coaxial rolls consecutively adhered together, such mounting means being angularly shiftable to move each of such tubes from such loading station to a roll discharge station, roll separator means located at a roll pull-off station at one end of a tube in such discharge station, such separator means grasping the endmost roll of such plurality of rolls, separating same from the others and releasing same, means for receiving and conveying such separated rolls, a selected number thereof being collected in a package group collection station, a wrapping and taping device for such selected number of rolls so separated, said device including: primary ram means movable relative to the package group collection station, such ram means including a pusher plate and power means for moving said plate, paper curtain holding means including means for holding such curtain in substantially vertical attitude, said curtain being releasably clamped by clamping means at its lower end and connected to a paper roll at its upper end; such primary ram means being positioned for moving the package group of rolls along a first path relative to the curtain of paper so releasably held by said paper curtain holding means and thence onto an adjacent dolly for receiving the package group with the paper partially wrapped thereabout, the dolly being located at a package wrapping station, such relative movement causing such curtain of paper to wrap around such package group, means for severing the curtain, wrapping foldover means mounted adjacent said paper curtain holding means and operatively connected to said primary ram means for acting in timed relation therewith for folding the end margins of such curtain over one another into overlapping relation thereby as aforementioned partially wrapping said package group, but leaving unclosed the opposite ends of the wrapping which are formed by the side portions of such paper curtain, a first tape applicator, conveyor means for moving said dolly along a second path perpendicular to the first path and relative to said first tape applicator while holding together said curtain end margins, means for actuating said tape applicator in timed relation with said dolly conveyor means thereby to apply tape to such overlapping end margins, such tape having adhesive on one side thereof thereby to hold said margins closed; said dolly conveyor means moving said dolly and package group now partially wrapped to an intermediate station adjacent a secondary ram means positioned for moving the package group in the direction of a third path substantially perpendicular to the second path, second and third tape applicators positioned on opposite sides of said third path, end folding means for such wrapping and positioned on opposite sides of such third path and interposed between such intermediate station and said second and third tape applicators for folding over the aforementioned respective opposite ends of the package wrapping thereby to form side and end flaps at each end of such wrapping preparatory to the application of tape thereto by said second and third tape applicators, said secondary ram means being positioned for delivering when actuated said package group of rolls to a package pickup station located intermediate the aforementioned end folding means which are positioned on opposite sides of the third path, a package in such pickup station being positioned for engagement by a package conveyor which is mounted for moving such package further along the third path past said second and third tape applicators and to a package receiving station of a box machine, operating means for said second and third tape applicators actuatable in timed relation with the movement of the package past said tape applicators thereby causing said folded side and end flaps on each end of the package to be taped closed, said package conveyor as aforementioned thereafter delivering the package to such package receiving station of the box machine; the latter machine including: a box loader ram normally positioned adjacent said receiving station of the box machine and in a location preparatory to urging the package into an empty box along a fourth path substantially perpendicular to such third path, means for holding a stack of box blanks in initially flattened condition above a box erecting station positioned in such fourth path, such box blanks having four side walls, and at each end thereof four end flaps, each adjacent pair of side walls being separated by a fold line, such initially flat box blanks being adapted to be erected by urging together opposite edges thereof, box blank escapement means operatively associated with said box blank stack holding means for releasing consecutively the lowermost of said box blanks onto such box erecting station therebeneath, such releasing occurring in response to the departure from such station of a previously erected box, means for erecting an initially flat box blank in such erecting station including box unfolding means positioned at opposite side edges of such station and the flattened blank and mounted for relative movement to engage such opposite side edges of the blank to urge same together thereby to erect the blank in a position centered with respect to the aforementioned fourth path and thus adapted to receive the wrapped group of rolls, box end flap closing means positioned adjacent one end of said erected box blank with respect to the aforementioned package receiving station, means for actuating such end flap closing means in response to movement of said unfolding means to a selected position thereby to close such end of the box, means for actuating said box loader ram in response to receipt of such package in the package receiving station and in response to the erection of a box blank in such box erecting station, thereby to urge the wrapped package of rolls into the erected box with one end thereof closed thereby to fill the box, box conveyor means operable in response to the filling of the box to move same along a fifth path and out of such erecting station, and means for closing the end flaps on the unclosed end of the box responsive to the filling of the box with such a package.

2. In apparatus of the class described, the combination comprising: a roll separator device including: a plurality of tubes mounted upon mounting means for holding same substantially parallel and in selected spaced positions about a common axis, such mounting means being angularly shiftable to move such tubes angularly simultaneously, each of said tubes being adapted to receive at a loading station a plurality (or cut) of coaxial rolls consecutively adhered together, such mounting means being angularly shiftable to move each of such tubes from such loading station to a cut compression station and thence to a roll discharge station, means positioned at said compression station for compressing such plurality of rolls between parallel flat surfaces by exerting pressure thereon in the direction of the common axis thereof, roll separator means located at a roll (or part) pull-off station at one end of a tube in such discharge station, such separator means being adapted for grasping the endmost roll of such plurality of rolls, separating same from the others and releasing same, chute means positioned beneath said roll separator means for receiving each such separated roll and guiding same to an individual roll compression station, compression means at the latter station for compressing each individual roll between parallel flat surfaces also by exerting pressure thereon in the direction of the axis thereof, gate means for releasing an individual roll from such last-mentioned compression station in response to completion of the application of pressure thereon at such station; a wrapping and taping device for a selected number of such rolls so separated, such selected number comprising a package group and said device including: primary ram means movable relative to a package group collection station, such ram means including a pusher plate and power means for moving said plate, such primary ram means being positioned for moving the package group of rolls along a first path relative to a curtain of paper releasably held by paper curtain holding means and thence onto an adjacent dolly for receiving the package group with the paper partially wrapped thereabout, the dolly being located at a package wrapping station, such relative movement causing such curtain of paper to wrap around such package group, wrapping foldover means mounted adjacent said paper curtain holding means and operatively connected to said primary ram means for acting in timed relation therewith for folding the end margins of such curtain over one another into overlapping relation thereby as aforementioned partially wrapping said package group, but leaving unclosed the opposite ends of the wrapping which are formed by the side portions of such paper curtain, a first tape applicator, conveyor means for moving said dolly along a second path perpendicular to the first path and relative to said first tape applicator while holding together said curtain end margins, means for actuating said tape applicator in timed relation with said dolly conveyor means thereby to apply tape to such overlaping end margins, such tape having adhesive on one side thereof thereby to hold said margins closed; said dolly conveyor means moving said dolly and package group now partially wrapped to an intermediate station adjacent a secondary ram means positioned for moving the package group in the direction of a third path substantially perpendicular to the second path, second and third tape applicators positioned on opposite sides of said third path, end folding means for such wrapping and positioned on opposite sides of such third path and interposed between such intermediate station and said second and third tape applicators for folding over the aforementioned respective opposite ends of the package wrapping thereby to form side and end flaps at each end of such wrapping preparatory to the application of tape thereto by said second and third tape applicators, said secondary ram means being positioned for delivering when actuated said package group of rolls to a package pickup station located intermediate the aforementioned end folding means which are positioned on opposite sides of the third path, a package in such pickup station being positioned for engagement by a package conveyor which is mounted for moving such package further along the third path past said second and third tape applicators and to a package receiving station of a box machine, means for operating said second and third tape applicators in timed relation with the movement of the package past same, said tape applicators thereby causing said folded side and end flaps on each end of the package to be taped closed, said package conveyor as aforementioned thereafter delivering the package to such package receiving station of the box machine; the latter machine including: a box loader ram normally positioned adjacent said receiving station of the box machine and in a location preparatory to urging the package into an empty box along a fourth path substantially perpendicular to such third path, means for holding a stack of box blanks in initially flattened condition above a box erecting station positioned in such fourth path, such box blanks having four side walls, and at each end thereof four end flaps, each adjacent pair of side walls being separated by a fold line, such initially flat box blanks being adapted to be erected by urging together opposite edges thereof, box blank escapement means operatively associated with said box blank stack holding means for releasing seriatim the lowermost of said box blanks onto such box erecting station therebeneath, means for erecting an initially flat box blank in such erecting station including box unfolding means positioned at opposite side edges of such station and flattened blank and mounted for relative movement to engage such opposite side edges of the blank to urge same together thereby to erect the blank in a position centered with respect to the aforementioned fourth path and thus adapted to receive the wrapped group of rolls, box end flap closing means positioned adjacent one end of an erected box blank with respect to the aforementioned package receiving station, means for actuating such end flap closing means in response to said unfolding means reaching a selected position thereby to close such end of the box, means for actuating said box loader ram in response to receipt of such package in the package receiving station and in response to the erection of a box blank in such box erecting station, thereby to urge the wrapped package of rolls into the erected box with one end thereof closed thereby to fill the box, a box conveyor, means effective responsive to the filling of the box to actuate same along a fifth path substantially perpendicular to the fourth path, such means being responsive to the motion of such box loader ram, means for closing the end flaps on the unclosed end of the box responsive to the filling of the box with such a package, fourth and fifth tape applicators positioned on opposite sides of said fifth path for applying selected lengths of adhesive tape to the closed end flaps of said box being moved by said box conveyor, and means for operating said tape applicator in timed relationship with the operation of the box conveyor.

3. In a roll separator device the combination comprising: a plurality of tubes each for containing a group of consecutively adhered and coaxial rolls of sheet material, means for mounting said plurality of tubes in substantially parallel relation and in selected spaced positions about a common axis, such mounting means being angularly shiftable to move such tubes angularly about such axis, means for angularly shifting said mounting means and tubes mounted thereon through a preselected angular increment thereby to shift a tube from a loading station to a discharge station, roll separator means located at such discharge station, such roll separator means including means for grasping the endmost roll of the plurality of coaxial rolls in such discharge station and separating same from the other rolls, means for controlling such roll grasping means for so engaging the endmost roll and thereafter releasing same, and means for urging the rolls in such discharge station toward said roll grasping means.

4. In a roll separator device the combination comprising: a plurality of tubes each for containing a group of consecuetively adhered and coaxial rolls of sheet material, means for mounting said plurality of tubes in selected spaced positions about a common axis, such mounting means being angularly shiftable to move such tubes about such axis, means for angularly shifting said mounting means and tubes mounted thereby to shift a tube from a loading station to a discharge station, roll separator means located at such discharge station, such roll separator means including means for grasping the endmost roll of the plurality of coaxial rolls in such discharge station and separating same from the other rolls, means for controlling such roll grasping means for so engaging the endmost roll and thereafter releasing same, and means for urging the rolls in such discharge station toward said roll grasping means.

5. In apparatus of the class described the combination comprising: a roll separator device including: a plurality of tubes mounted upon mounting means for holding same substantially parallel and in selected spaced positions about a common axis, such mounting means being angularly shiftable to move such tubes angularly together, and to move each of such tubes successively into: a roll loading station, a roll compression station, and a roll discharge station, each of said tubes when in such loading station being positioned for receiving a load comprising a plurality of coaxial rolls of gummed tape consecutively adhered in close engagement with one another, means positioned at said compression station for compressing such plurality of rolls between parallel flat surfaces by exerting pressure thereon in the direction of the common axis thereof, roll separator means located at a roll pull-off station at one end of a tube in such discharge station, such separator means grasping the endmost roll of such plurality of rolls, separating same from the others and releasing same, chute means positioned beneath said roll separator means for receiving the separated roll and guiding same to an individual roll compression station, compression means for exerting pressure on opposite sides of such individual roll at such last-mentioned compression station thereby to compress the opposite parallel sides of such roll between parallel flat surfaces, and gate means for releasing an individual roll from such last-mentioned compression station in response to completion of the application of pressure thereon at such station.

6. In apparatus of the class described, a wrapping and taping device for a selected number of separated rolls, such selected number comprising a package group and said device including: primary ram means movable relative to the package group collection station, such ram means including a pusher plate and power means for moving said plate, means for holding a curtain of sheet wrapping material in substantially vertical attitude, curtain clamping means for releasably clamping the lower end of such curtain, the upper end thereof being connected to a source of sheet material, such primary ram means being positioned for moving the package group of rolls along a first path relative to the curtain of paper so releasably held by said paper curtain holding means and thence onto an adjacent dolly for receiving the package group with the paper partially wrapped thereabout, the dolly being located at a package wrapping station, such relative movement causing such curtain of paper to wrap around such package group, means for severing the curtain wrapping foldover means mounted adjacent said paper curtain holding means and operatively connected to said primary ram means for acting in timed relation therewith for folding the end margins of such curtain over one another thereby as aforementioned partially wrapping said package group, but leaving unclosed the opposite ends of the wrapping which are formed by the side portions of such paper curtain, means operable in timed relation with said foldover means for actuating said clamping means to clamp the severed end of said sheet material, a first tape applicator, conveyor means for moving said dolly along a second path perpendicular to the first path and relative to said first tape applicator while holding together said curtain end margins, means for actuating said tape applicator in timed relation with said dolly conveyor means thereby to apply tape to such overlapping end margins, such tape having adhesive on one side thereof thereby to hold said margins closed.

7. Apparatus in accordance with claim 8, wherein said dolly conveyor means move said dolly and package group now partially wrapped to an intermediate station adjacent a secondary ram means positioned for moving the package group in the direction of a third path substantially perpendicular to the second path, second and third tape applicators positioned on opposite sides of said third path, end folding means for such wrapping and positioned on opposite sides of such third path and interposed between such intermediate station and said second and third tape applicators for folding over the aforementioned respective opposite ends of the package wrapping thereby to form side and end flaps at each end of such wrapping preparatory to the application of tape thereto by said second and third tape applicators, said secondary ram means being positioned for delivering said package group of rolls to a package pickup station located intermediate the aforementioned end folding means which are positioned on opposite sides of the third path, a package in such pickup station being positioned for engagement by a package conveyor which is mounted for moving such package further along the third path past said second and third tape applicators and to a package receiving station, and operating means for said second and third tape applicators actuable in timed relation with the movement of the package past said tape applicators causing said folded side and end flaps on each end of the package to be taped closed, said package conveyor as aforementioned thereafter delivering the package to such package receiving station.

8. In apparatus for wrapping and taping an article, the combination comprising: means for mounting a roll of sheet material in which the article is to be wrapped, means for holding an end portion of a web from such roll in a substantially vertical curtain-like attitude, such latter means including means for releasably holding the extremity of the web adjacent a wrapping table, a substantially horizontal web guide spaced above said wrapping table and parallel thereto, the distance of said web guide above said wrapping table being not less than the vertical dimension of the article to be wrapped, ram means positioned for urging the article along a first path on such wrapping table relative to the curtain of sheet material so releasably held and thence onto an adjacent dolly comprising a portion of such table and positioned for receiving the article with the sheet material partially wrapped thereabout, the dolly being located at a package wrapping station, such relative movement of the article and sheet material causing the latter to wrap around the article, means for severing the web of such sheet material in timed relation with the movement of said primary ram means whereby such web is severed following the thrusting of the article into the curtain of sheet material whereby the latter is so partially wrapped thereabout, wrapping foldover means also acting in timed relation with said severing means and primary ram means for folding the end margins of the sheet material over one another in overlapping relation thereby partially wrapping the article, but leaving unclosed the opposite ends of the wrapping which are formed by the side portions of the sheet material; a first tape applicator, means for moving said dolly along a second path and relative to said first tape applicator, means for actuating said first tape applicator in timed relation with said dolly conveyor means thereby to apply tape to said overlapping end margins, said tape having adhesive on one side thereby to hold closed said margins; secondary ram means positioned adjacent the second path at an intermediate station for moving the partially wrapped article in the direction of a third path substantially perpendicular to the second path, second and third tape applicators positioned on opposite sides of said third path, end folding means positioned on opposite sides of said third path for folding over the aforementioned respective opposite ends of the partially wrapped article thereby to form side and end flaps at each end of such wrapping preparatory to the application of tape by said second and third tape applicators, and a package conveyor, said secondary ram means being positioned for delivering the partially wrapped package to a pickup station located intermediate the aforementioned end folding means which are positioned on opposite sides of the third path, a package in such pickup station being positioned for engagement by said package conveyor which is mounted for moving same further along a third path past said second and third tape applicators to a package receiving station, means for actuating said second and third tape applicators in timed relation with the movement of the package past same, said second and third tape applicators applying tape to the folded side and end flaps on each end of the package thereby taping same closed.

9. In a device for wrapping and taping an article, the combination comprising: means for holding in a substantially vertical attitude a curtain of sheet material, a wrapping surface positioned horizontally relative to the sheet material held by such means, a sheet material guide positioned above and substantially parallel to said wrapping surface whereby an article to be wrapped urged against the sheet material in vertical curtain-like attitude is partially enveloped by the sheet material, the latter being of sufficient length to accommodate such partial wrapping around of the article, means for engaging a side of such article and urging same against the curtain of sheet material, such means for holding the sheet material in curtain-like attitude including gripper means for holding the end of the sheet material during the operation of said article urging means, a cutting device for severing the sheet material following the urging of the article against the sheet material curtain and the partial wrapping around thereof by such material, such cutting device being positioned for severing the sheet material so wrapped around the article at the region thereof opposite to the end gripped by the gripper means, means for releasing said gripper means, means for folding over one another the end margins of such severed curtain of sheet material along the aforementioned side of such article, and means for applying tape to said folded over margins.

10. Apparatus in accordance with claim 9 including: end folding means positioned for folding over the respective opposite ends of the package wrapping thereby to form side and end flaps at each end of such wrapping, means for folding said side and end flaps thereby to close opposite ends of the package, and means for applying tape thereto.

11. A box machine including in combination: a box loader ram normally positioned adjacent a package receiving station of the machine and in a location preparatory to urging a package into an empty box along a selected path; box blank stack holding means for holding a stack of box blanks in initially flat condition above a box erecting station positioned in such selected path; such stack holding means being adapted to hold box blanks of the type having four side walls, and at each end thereof end flaps and with each adjacent pair of side walls separated by a fold line, two of such fold lines when each box blank is in a flattened condition comprising opposite edges thereof, such initially flat box blanks being erectable in response to urging together such opposite side edges thereof; box blank escapement means operatively associated with said stack holding means for releasing the lowermost of said box blanks onto the aforementioned box erecting station therebeneath, there being a box erecting surface upon which each box blank falls from such stack holding means when it is so released and on which surface the box blank is erected, two of the side walls of such box blank engaging said box erecting surface when the blank falls thereupon; vacuum means for engaging one of said sides to hold same temporarily during the erecting operation thereof; means for erecting an initially flat box blank in such erecting station including stationary limit-stop means against which one edge of the box blank is urged, such limit-stop means being adjacent said box erecting surface; box unfolding arm means positioned for engaging the opposite edge of the flattened box blank in such station and mounted for urging such edge toward said stationary limit-stop thereby to erect the box blank with the assistance of the aforementioned vacuum means which engages one of the lowermost surfaces of the sides of such box blank, the coaction of said box erecting arm means and limit-stop means angularly shifting two parallel side walls of the box blank; second vacuum means mounted for angular motion and adapted for engaging the upper surface of one of said angularly shifting side walls thereby to aid in the erecting of the box; and end flap closing means for acting upon the end flaps upon at least one end of said box blank in response to the erecting of the box blank.

12. Apparatus in accordance with claim 11 wherein means are provided for controlling the speed of angular motion of said second vacuum cup means to operate at an angular speed slightly in excess of that of the box unfolding arm means.

13. Apparatus in accordance with claim 11 wherein means are provided for actuating the end flap closing means in response to movement of the unfolding arm means to a selected position; and means for actuating the box loader ram in response to receipt of the package in the package receiving station and further in response to the erection of a box blank in such box erecting station, thereby to urge the wrapped package of rolls into the erected box, the latter having one end thereof closed thereby to fill the box; and means for closing the end flaps on the unclosed end of the box in response to the filling of the box with such package.

14. A box machine, including in combination: a box loader ram positioned in a location preparatory to urging a package into an empty box along a selected path; means for erecting an initially flat box blank in an erecting station positioned along such selected path; such box erecting means including means for urging together opposite edges of an initially flat box blank resting upon a box erecting table at such box erecting station; vacuum means for engaging the underside of one of the side walls of the box blank while undergoing such erection; vacuum means for engaging one of the other side walls of the box blank and urging same upwardly during the erecting of the box; box end flap closing means positioned adjacent one end of the erected box blank; means for actuating such end flap closing means responsive to movement of such means for urging the box side edges together whereby such means are moved to a selected position; and means for actuating said box loader ram in response to movement of a package into a selected position with respect to such box loader ram and also in response to the erection of the box blank in the box erecting station.

15. A box machine including in combination: a box loader ram normally positioned adjacent a package receiving station of the machine and in a location preparatory to urging a package into an empty box along a selected path, means for holding a stack of box blanks in initially flattened condition above a box erecting station positioned in such path, such box blanks having four side walls, and at each end thereof four end flaps, each adjacent pair of side walls being separated by a fold line, such initially flat box blanks being adapted to be erected by urging together opposite edges thereof, box blank escapement means operatively associated with said box blank stack holding means for releasing seriatim the lowermost of said box blanks onto such box erecting station therebeneath, means for erecting an initially flat box blank in such erecting station including box unfolding means for acting upon opposite side edges of a flattened blank in such station and mounted for movement to engage such opposite side edges to urge same together thereby to erect the blank in a position centered with respect to the aforementioned path and thus adapted to receive the wrapped group of rolls, box end flap closing means positioned adjacent one end of the erected box blank, means for actuating such end flap closing means in response to movement of said unfolding means to a selected position thereby to close such end of the box, means for actuating said box loader ram in response to receipt of such package in the package receiving station and in response to the erection of a box blank in such box erecting station, thereby to urge the wrapped package of rolls into the erected box, the latter having one end thereof closed thereby to fill the box, and means for closing the end flaps on the unclosed end of the box responsive to the filling of the box with such a package.

References Cited in the file of this patent

UNITED STATES PATENTS

| | | |
|---|---|---|
| 1,468,333 | Thom | Sept. 18, 1923 |
| 1,873,059 | Smith | Aug. 23, 1932 |
| 2,078,619 | Van Buren | Apr. 27, 1937 |
| 2,247,871 | Chalmers | July 1, 1941 |
| 2,537,464 | Holmberg | Jan. 9, 1951 |
| 2,587,050 | Levkoff | Feb. 26, 1952 |
| 2,592,793 | Coon | Apr. 15, 1952 |
| 2,609,646 | Total | Sept. 9, 1952 |
| 2,612,823 | Woelfer | Oct. 7, 1952 |
| 2,651,898 | Kimball | Sept. 15, 1953 |
| 2,742,965 | Drummond | Apr. 24, 1956 |
| 2,769,376 | Chidsey et al. | Nov. 6, 1956 |
| 2,860,466 | Ingram | Nov. 18, 1958 |
| 2,894,363 | Voogd | July 14, 1959 |
| 2,906,075 | Vogel | Sept. 29, 1959 |